US009044692B2

(12) United States Patent
Rock

(10) Patent No.: US 9,044,692 B2
(45) Date of Patent: *Jun. 2, 2015

(54) SYSTEMS AND METHODS FOR WATER DESALINIZATION

(75) Inventor: Kelly P. Rock, Vienna, VA (US)

(73) Assignee: Micronic Technologies, Inc., Wise, VA (US)

( * ) Notice: Subject to any disclaimer, the term of this patent is extended or adjusted under 35 U.S.C. 154(b) by 588 days.

This patent is subject to a terminal disclaimer.

(21) Appl. No.: 13/217,720

(22) Filed: Aug. 25, 2011

(65) Prior Publication Data
US 2011/0309162 A1 Dec. 22, 2011

Related U.S. Application Data

(63) Continuation-in-part of application No. 12/636,527, filed on Dec. 11, 2009, now Pat. No. 8,273,165.

(51) Int. Cl.
*B01D 53/14* (2006.01)
*B01D 1/14* (2006.01)
*B01D 1/16* (2006.01)
*B01D 1/20* (2006.01)
*B01D 1/30* (2006.01)
*B01D 5/00* (2006.01)
*C02F 1/04* (2006.01)
*C02F 1/12* (2006.01)
*C02F 103/08* (2006.01)

(52) U.S. Cl.
CPC .. *B01D 1/14* (2013.01); *B01D 1/16* (2013.01); *B01D 1/20* (2013.01); *B01D 1/30* (2013.01); *B01D 5/0003* (2013.01); *B01D 5/006* (2013.01); *C02F 1/04* (2013.01); *C02F 1/12* (2013.01); *C02F 2103/08* (2013.01)

(58) Field of Classification Search
CPC ............ B01D 1/14; B01D 1/30; B01D 5/006; B01D 1/20; B01D 1/16; B01D 5/0003; C02F 1/04; C02F 2103/08; C02F 1/12
USPC ........... 55/345, 343, 346, 347, 459.1; 96/208, 96/209, 351, 352; 210/180, 221.2, 188, 210/218, 220, 512.1; 261/78.2, 79.2, 116
See application file for complete search history.

(56) References Cited

U.S. PATENT DOCUMENTS 3,649,468 A 3/1972 Bechard et al.
3,837,491 A 9/1974 Humiston et al.
(Continued)

FOREIGN PATENT DOCUMENTS

WO WO 2007/133771 A2 11/2007

*Primary Examiner* — Dung H Bui
(74) *Attorney, Agent, or Firm* — Cooley LLP

(57) ABSTRACT

An apparatus includes a set of atomizers, a housing and a separator. Each atomizer includes an inlet portion that receives an inlet flow of a solution and an outlet portion that produces an atomized flow of the solution. The housing defines a flow path. Each atomizer is disposed at least partially within the housing such that the outlet portion of each atomizer is in fluid communication with the flow path. The housing is configured such that a gas flowing within the flow path can be sequentially mixed with the atomized flow of the solution produced by the outlet portion of each atomizer to produce a mixture of the gas and the solution. The separator produces a first outlet flow including a portion of the gas and a vaporized portion of a solvent, and a second outlet flow including a liquid portion of the solvent and a solute.

11 Claims, 47 Drawing Sheets

(56) References Cited

U.S. PATENT DOCUMENTS

| | | |
|---|---|---|
| 4,176,779 A | 12/1979 | Kirk et al. |
| 4,515,734 A | 5/1985 | Rock et al. |
| 4,568,500 A | 2/1986 | Rock et al. |
| 4,595,459 A | 6/1986 | Kusakawa et al. |
| 5,078,880 A | 1/1992 | Barry |
| 5,176,799 A | 1/1993 | Roe et al. |
| 5,472,645 A | 12/1995 | Rock et al. |
| 5,534,118 A | 7/1996 | McCutchen |
| 5,620,561 A | 4/1997 | Kuhn et al. |
| 5,672,187 A | 9/1997 | Rock et al. |
| 5,744,008 A | 4/1998 | Craven |
| 6,110,368 A | 8/2000 | Hopkins et al. |
| 6,113,078 A | 9/2000 | Rock |
| 6,234,459 B1 | 5/2001 | Rock |
| 6,244,573 B1 | 6/2001 | Rock |
| 6,293,121 B1 | 9/2001 | Labrador |
| 6,347,789 B1 | 2/2002 | Rock |
| 6,500,216 B1 | 12/2002 | Takayasu |
| 6,648,306 B2 | 11/2003 | Rock |
| 6,669,176 B2 | 12/2003 | Rock |
| 6,811,690 B2 | 11/2004 | Arnaud |
| 6,973,792 B2 | 12/2005 | Hicks |
| 7,681,569 B2 | 3/2010 | Rock |
| 7,897,019 B2 | 3/2011 | Akers |
| 8,273,165 B2 | 9/2012 | Rock |
| 2007/0169773 A1* | 7/2007 | Rock .................. 128/200.14 |
| 2007/0204839 A1 | 9/2007 | Rock et al. |
| 2008/0083605 A1 | 4/2008 | Holtzapple et al. |
| 2010/0038229 A1 | 2/2010 | Nadeau, Jr. et al. |
| 2010/0065510 A1 | 3/2010 | Krichtafovitch et al. |
| 2011/0139697 A1* | 6/2011 | Rock ........................... 210/180 |
| 2013/0174988 A1 | 7/2013 | Rock |
| 2014/0034478 A1 | 2/2014 | Rock |

\* cited by examiner

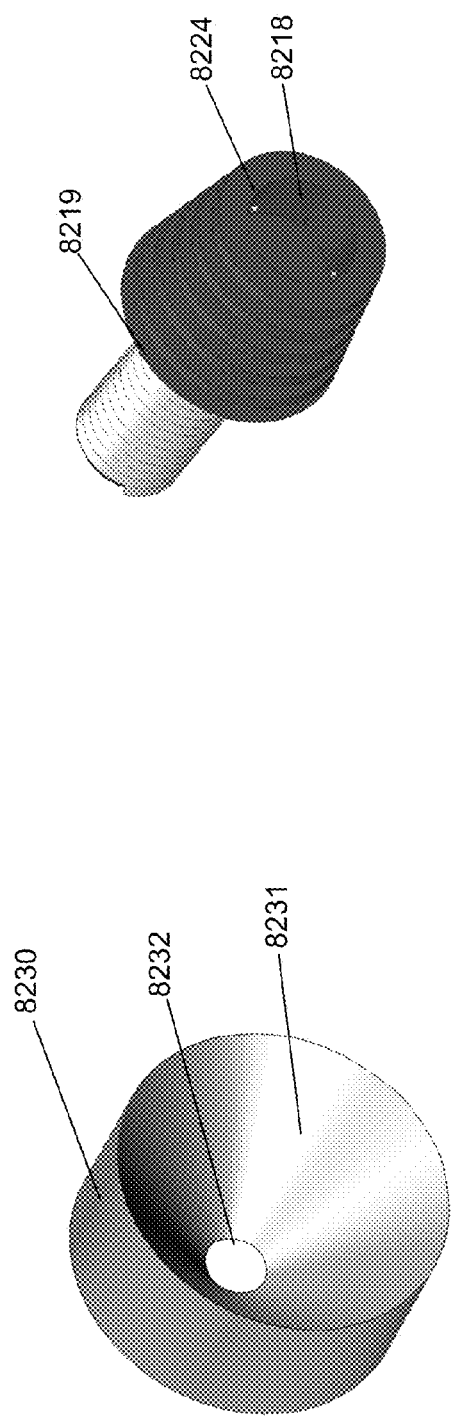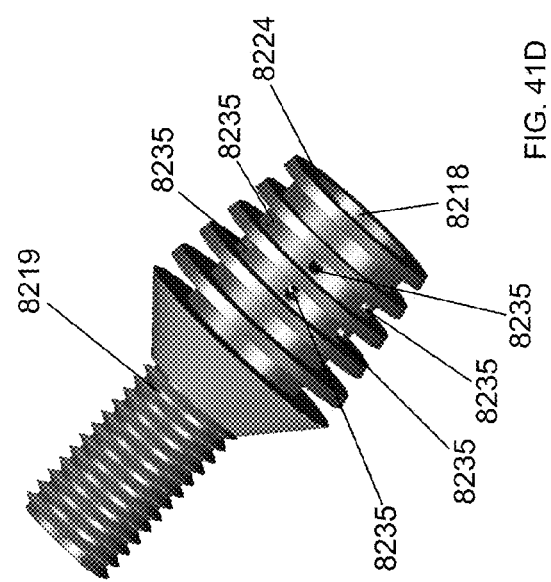

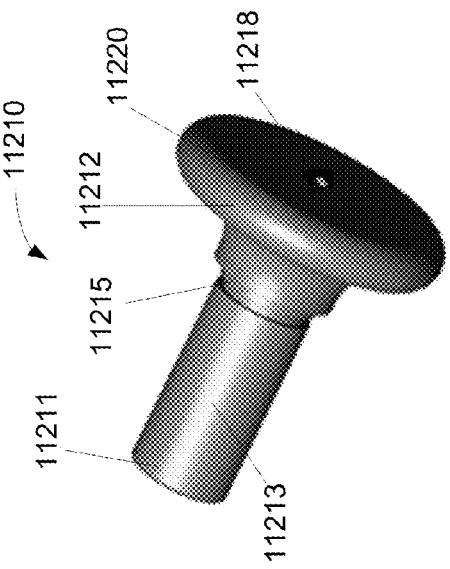
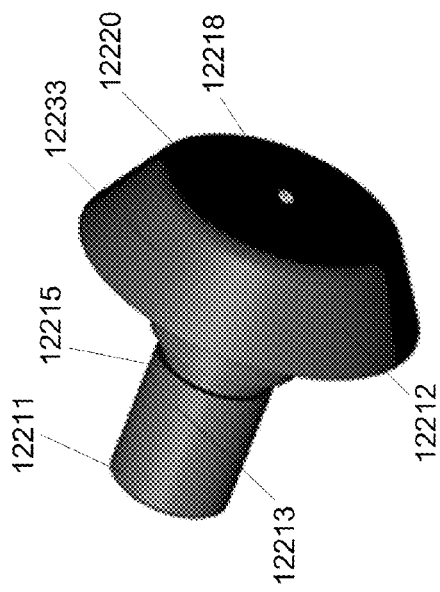
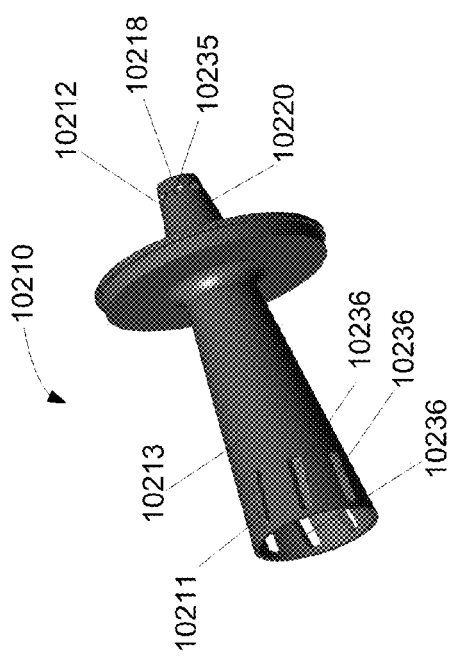

SYSTEMS AND METHODS FOR WATER DESALINIZATION

CROSS-REFERENCE TO RELATED APPLICATIONS

This application is a continuation-in-part of U.S. patent application Ser. No. 12/636,527, entitled "Compacted Air Flow Rapid Fluid Evaporation System," filed Dec. 11, 2009, which is incorporated herein by reference in its entirety.

BACKGROUND

The embodiments described herein relate to systems and methods for removing a solute from a solution. More particularly, the embodiments described herein relate to systems and methods for water desalinization.

Known water desalinization systems are used to produce potable water from seawater and/or other sources of salt or brackish water. Some known water desalinization systems include filtration systems to remove the solute within the source water, such as, for example, reverse osmosis filtering. Known reverse osmosis desalinization systems produce filtered water by pressurizing the source water to produce the "reverse osmosis" flow (i.e., the flow across a specialized membrane from the area of high solute concentration to the area of low solute concentration). In some known systems, the pressure of the source water can be between 800 and 1000 psi, thus resulting in high-energy consumption during operation. The specialized membranes and/or filters also require periodic replacement and/or maintenance, thereby adding to the cost and complexity of operation. Moreover, some known reverse osmosis desalinization systems have recovery ratios (i.e., the ratio between the flow rate of filtered water to the flow rate of source water) of as low as ten percent.

Other known water desalinization systems produce potable water by distilling the source water. For example, multi-stage flash desalinization systems boil the source water to produce a vapor in multiple stages of operation. The vapor is then condensed to produce the desalinized water. Although the multiple stages are arranged such that the cool inlet water is heated by the vapor as the vapor is condensed, known multi-stage flash desalinization systems consume large amounts of energy to produce the vapor. The boilers of known multi-stage flash desalinization systems also require periodic cleaning and/or maintenance, thereby adding to the cost and complexity of operation.

Yet other known water desalinization systems vaporize the seawater for subsequent condensation and recovery by atomizing the inlet water into ambient air. Such known systems often pressurize the inlet water (for example, to pressures of 100 psi or higher) and/or heat the ambient air, thus resulting in high-energy consumption during operation. Moreover, such known systems often include a long flow path (e.g., similar to a cooling tower flow path) within which the atomized inlet water is evaporated, which increases the size and complexity of the system.

Thus, a need exists for improved systems and methods for water desalinization.

SUMMARY

Systems and methods for water desalinization are described herein. In some embodiments, an apparatus includes a set of atomizers, a housing, and a separator. Each atomizer includes an inlet portion configured to receive an inlet flow of a solution and an outlet portion configured to produce an atomized flow of the solution. The housing has an inlet portion and an outlet portion, and defines a flow path between the inlet portion and the outlet portion. Each atomizer is disposed at least partially within the housing such that the outlet portion of each atomizer is in fluid communication with the flow path. The housing is configured such that a gas flowing within the flow path can be sequentially mixed with the atomized flow of the solution produced by the outlet portion of each atomizer to produce a mixture of the gas and the solution. The separator is configured to be fluidically coupled to the outlet portion of the housing. The separator is configured to receive the mixture of the gas and the solution, and produce a first outlet flow and a second outlet flow. The first outlet flow includes a portion of the gas and a vaporized portion of a solvent from the solution. The second outlet flow includes a liquid portion of the solvent from the solution and a solute from the solution.

BRIEF DESCRIPTION OF THE DRAWINGS

FIG. 41B is a zoomed perspective view of a mixing insert included in the atomizer of FIG. 41A.

FIG. 41C is a first zoomed perspective view of an injector insert included in the atomizer of FIG. 41A.

FIG. 41D is a second zoomed perspective view of the injector insert included in the atomizer of FIG. 41A.

FIG. 43 is a perspective view of a portion of an atomizer assembly according to an embodiment.

FIG. 44 is a perspective view of an injector according to an embodiment.

FIG. 45 is a perspective view of an injector according to an embodiment.

DETAILED DESCRIPTION

Figure 1:
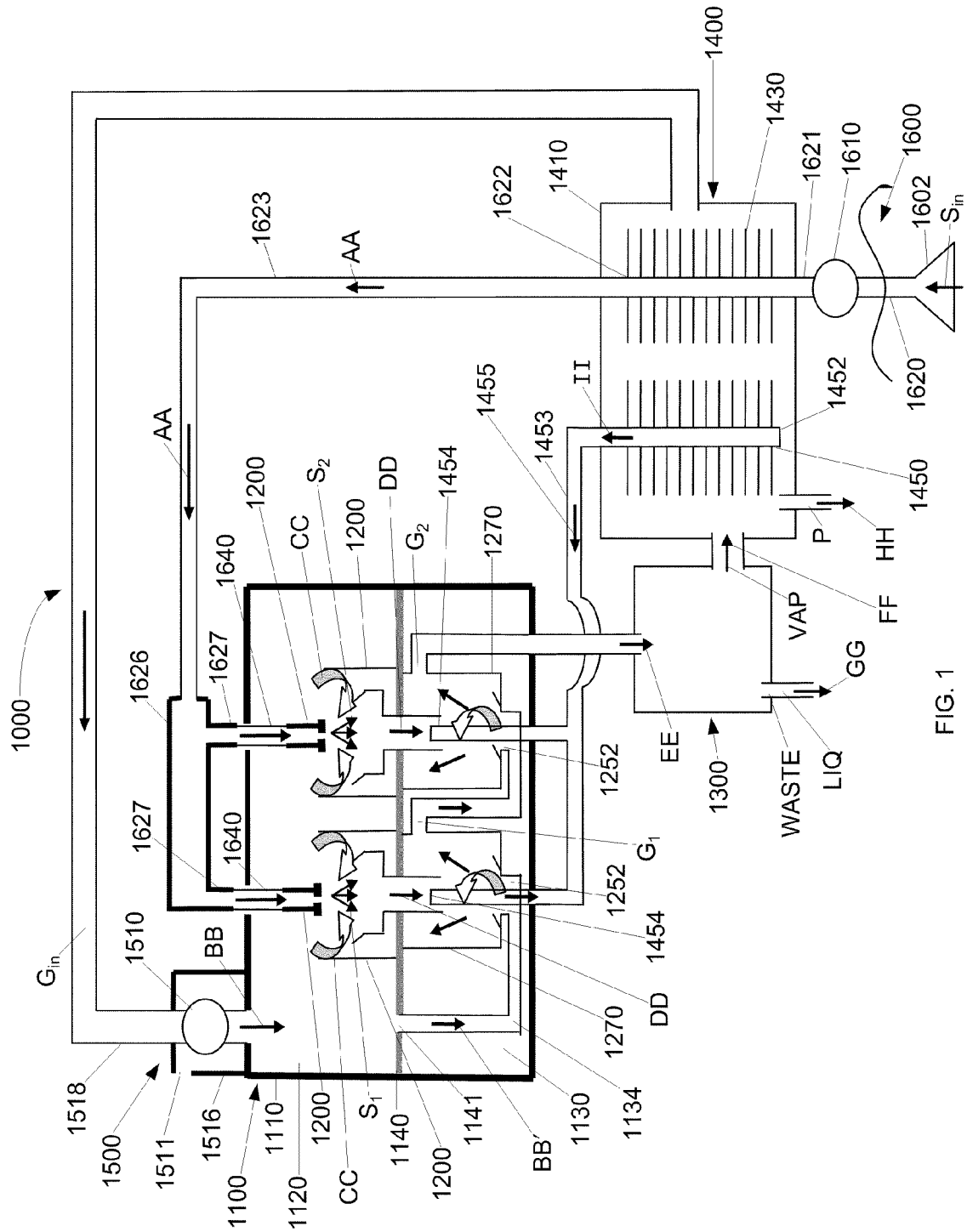
FIG. 1 is schematic illustrations of a water desalinization system according to an embodiment.
Figure 2:
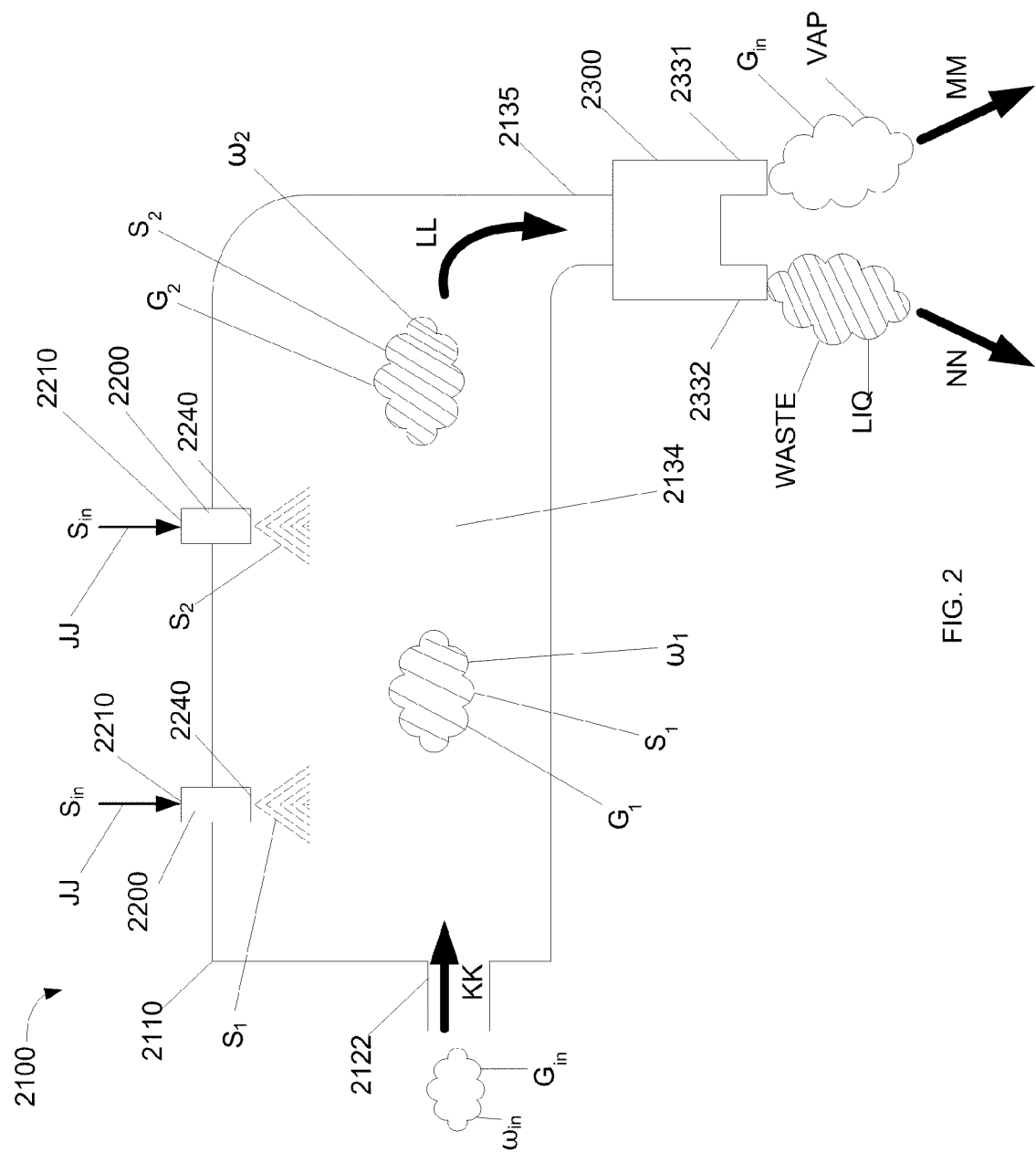
FIG. 2 is a schematic illustration of a processor system according to an embodiment.

Systems and methods for water desalinization are described herein. In some embodiments, an apparatus includes a set of atomizers, a housing and a separator. Each atomizer includes an inlet portion configured to receive an inlet flow of a solution and an outlet portion configured to produce an atomized flow of the solution. The housing has an inlet portion and an outlet portion, and defines a flow path between the inlet portion and the outlet portion. Each atomizer is disposed at least partially within the housing such that the outlet portion of each atomizer is in fluid communication with the flow path. The housing is configured such that a gas flowing within the flow path can be sequentially mixed with the atomized flow of the solution produced by the outlet portion of each atomizer to produce a mixture of the gas and the solution. The separator is configured to be fluidically coupled to the outlet portion of the housing. The separator is configured to receive the mixture of the gas and the solution, and produce a first outlet flow and a second outlet flow. The first outlet flow includes a portion of the gas and a vaporized portion of a solvent from the solution. The second outlet flow includes a liquid portion of the solvent from the solution and a solute from the solution.

In some embodiments, an apparatus includes a set of atomizers, a housing and a separator. Each atomizer includes an inlet portion configured to receive an inlet flow of a solution and an outlet portion configured to produce an atomized flow of the solution. The housing has an inlet portion and an outlet portion, and defines a flow path between the inlet portion and the outlet portion. Each atomizer is disposed at least partially within the housing such that the outlet portion of each atomizer is in fluid communication with the flow path. The housing is configured such that a gas flowing at a first location within the flow path has an axial velocity component having a first direction and the gas flowing at a second location within the flow path has an axial velocity component having a second direction substantially opposite the first direction. The separator is configured to receive a mixture of the gas and the solution and produce a first outlet flow and a second outlet flow. The first outlet flow includes a portion of the gas and a vaporized portion of a solvent from the solution. The second outlet flow includes a liquid portion of the solvent from the solution and a solute from the solution.

In some embodiments, an atomizer can be configured to mix a portion of an inlet solution with a portion of a gas flow. For example, in some embodiments, an apparatus includes an atomizer, a housing and a separator. The atomizer defines a liquid flow path and a gas flow path. The liquid flow path is fluidically coupled to a source of a solution such that a portion of the solution from the source of the solution can be conveyed to the atomizer via the liquid flow path. The gas flow path is fluidically coupled to a source of inlet gas such that a first portion of an inlet gas from the source of inlet gas can be conveyed to the atomizer via the gas flow path. The atomizer is configured to mix the portion of the solution and the first portion of the inlet gas to produce an atomized mixture of the solution and the first portion of the inlet gas. The housing has an inlet portion and an outlet portion, and defines a flow path between the inlet portion and the outlet portion. The inlet portion of the housing is fluidically coupled to the source of inlet gas such that a second portion of the inlet gas from the source of inlet gas can be conveyed into the flow path via the inlet portion of the housing. The atomizer is disposed at least partially within the housing such that the second portion of the inlet gas can be mixed with the atomized mixture. The separator is configured to receive the mixture of the second portion of the inlet gas and the atomized mixture and produce a first outlet flow and a second outlet flow. The first outlet flow includes a vaporized portion of a solvent from the solution. The second outlet flow includes a liquid portion of the solvent from the solution and a solute from the solution.

In some embodiments, an apparatus includes an atomizer assembly including an injection member and an outlet nozzle. The atomizer assembly is configured to mix an inlet flow of a solution and an inlet gas to produce an atomized mixture of the solution and the inlet gas. The injection member is configured to receive an inlet flow of a solution, which can be, for example, source water. The injection member defines a liquid flow path and a mixing volume. The injection member is configured such that a portion of the solution is conveyed to the mixing volume via the liquid flow path. At least a portion of the outlet nozzle is spaced apart from the injection member such that the outlet nozzle and the injection member collectively define a gas flow path. The inlet gas is conveyed to the mixing volume via the gas flow path.

In some embodiments, an apparatus includes an atomizer configured to mix an inlet flow of a solution and an inlet gas to produce an atomized mixture of the solution and the inlet gas. The injection member is configured to receive an inlet flow of a solution, which can be, for example, source water. An inner surface of the atomizer defines a liquid flow path through which at least a portion of the solution flows. An outer surface of the atomizer defines at least a portion of a gas flow path. In some embodiments, the outer surface includes a flow member configured to change a direction of flow of the gas.

The term “atomize” is used herein to describe the process of reducing a liquid or solution into a series of tiny particles, droplets and/or a fine spray. For example, as used herein, a device or component configured to atomize a liquid and/or produce and atomized flow of a liquid can be any suitable device or component that reduces and/or “breaks” the liquid into a series of tiny particles and/or a fine spray.

FIG. 1 is a schematic illustration of a water desalinization system 1000 according to an embodiment. The system 1000 includes a water processor 1100, a separator 1300, a condenser assembly 1400, an air-processing subsystem 1500 and a water inlet assembly 1600. As described in more detail herein, the system 1000 is configured to receive an inlet flow of water containing a solute (e.g., seawater) and produce a flow of water substantially free of the solute (e.g., desalinated water, or water that is free other dissolved solids). In particular, inlet seawater $S_{in}$ and inlet air $G_{in}$ are mixed by the water processor 1100 to form a mixture of air, water vapor and concentrated brine solution (the mixture is identified by the reference character $G_2$ in FIG. 1). The mixture $G_2$ is then separated by the separator 1300 to produce a gaseous flow of water vapor VAP (i.e., substantially saturated air) and a flow of waste products WASTE, including the solute, dissolved solids, and/or brine. The water vapor VAP is condensed within the condenser assembly 1400 to produce a flow of water substantially free of the solute (e.g., desalinated water; identified as process water P in FIG. 1). The waste products WASTE (e.g., the brine) is discharged in near solid form for disposal. As discussed below, the desalinization system 1000 is configured to recycle the thermal energy resulting from the condensation of the water vapor VAP to improve the efficiency of the system.

The water inlet assembly 1600 includes a pump 1610, a supply manifold 1626, inlet pipe 1620, and a set of supply lines 1640. The water inlet assembly 1600 also includes the associated plumbing within which the inlet (or feed) water $S_{in}$ is conveyed. As shown in FIG. 1, the water inlet assembly 1600 includes a strainer 1602 that can be submerged within a source of the inlet feed water $S_{in}$. The strainer 1602 can be any suitable strainer or filter for removing particles or large debris from the inlet feed water $S_{in}$. The water is conveyed from the source of the inlet water to the pump 1610 via the inlet piping 1620.

The pump 1610 can be any suitable fluid machine for producing a flow of the inlet feed water $S_{in}$ within the inlet piping 1620 and into the processor 1100. Similarly stated, the pump 1610 produces a flow of inlet feed water $S_{in}$ to the condenser assembly 1400 via the portion of the inlet piping 1621. In some embodiments, the source of inlet feed water $S_{in}$ can include a reservoir (not shown in FIG. 1) within which the pump 1610, the inlet piping 1620 and/or the strainer 1602 are, at least partially, disposed. Similarly stated, in some embodiments, the pump 1610 can be disposed beneath the surface of the inlet feed water $S_{in}$.

In some embodiments, the pump 1610 can be a centrifugal pump that produces a flow of the inlet feed water $S_{in}$ having a flow rate of between 0.05 gallons per minute and 2 gallons per minute and a pressure of between 2 p.s.i. and 10 p.s.i. Although the water inlet assembly 1600 is shown in FIG. 1 as including only one pump 1610, in other embodiments, the water inlet assembly 1600 can include any number of pumps. For example, in some embodiments, a water inlet assembly 1600 can include a first pump located within the source of the inlet feed water $S_{in}$ (e.g., a lift pump) and a second pump located adjacent the processor 1100, which produces a high pressure flow to the processor 1100. In other embodiments, the water inlet assembly 1600 can include a series of pumps that provide a flow of inlet water to different portions of the water processor 1100 in parallel. For example, in some embodiments, the pump 1620 can be a multichannel peristaltic metering pump configured to supply a flow of inlet water to a different atomizer and/or injection port within the water processor 1100.

In some embodiments, the water inlet assembly 1600 can include a controller (not shown in FIG. 1) that can adjust the flow rate produced by the pump 1610. In such embodiments, the controller can be adjusted manually (i.e., directly via human intervention). In other embodiments, the controller can be an automatic controller that is adjusted, for example, based upon feedback and/or measurements taken from other portions of the water desalinization system 1000. In some embodiments, for example, a controller can be configured to adjust the flow rate produced by the pump 1610 to ensure that the flow of waste products WASTE has sufficient liquidity to be conveyed from the system 1000.

As shown in FIG. 1, the inlet feed water $S_{in}$ is conveyed from the pump 1610 to the condenser 1400 via the portion of inlet piping 1621. A portion of the inlet piping 1622 is disposed within the condenser 1400 such that thermal energy can be transferred from the gas flow within the condenser 1400

(i.e., the gaseous flow of water vapor VAP) to the inlet feed water $S_{in}$ when the inlet feed water $S_{in}$ flows through the portion of the inlet piping 1622. Similarly stated, the portion of the inlet piping 1622 is disposed within the condenser 1400 such that the heat removed from the gaseous flow VAP is transferred into the inlet feed water $S_{in}$, thereby raising the temperature of the inlet feed water $S_{in}$ above an ambient temperature. The portion of the inlet piping 1622 can be coupled to or cooperatively function with any suitable structure and/or mechanism to enhance the condensation of the gaseous flow VAP and/or the heat transfer into the inlet feed water $S_{in}$. For example, in some embodiments, the portion of the inlet piping 1622 can be coupled to a series of heat transfer fins. In other embodiments, the portion of the inlet piping 1622 can be configured with a series of bends to increase the length of travel of the inlet feed water $S_{in}$ within the condenser 1400.

The inlet feed water $S_{in}$ is conveyed from the condenser 1400 to the supply manifold 1626 via a portion of the inlet piping 1623, as shown by the arrows AA in FIG. 1. The supply manifold 1626 includes a series of outlet ports 1627, each of which is in fluid communication with a corresponding atomizer 1200 of the water processor 1100 via a supply tube 1640. In some embodiments, the water inlet assembly 1600 can include one or more controllers and/or valves (not shown in FIG. 1) to adjust the pressure and/or flow rate of the inlet feed water $S_{in}$ to the water processor 1100 and/or each of the atomizers 1200.

In some embodiments, the supply manifold 1626 can include any suitable mechanism for conditioning or further processing the inlet feed water $S_{in}$. For example, in some embodiments, the water inlet assembly 1600 can include a pump or other device for producing pressure within the supply manifold 1626 such that the pressure and/or flow of the inlet feed water $S_{in}$, supplied to each of the atomizers is within a predetermined range. In some embodiments, the supply manifold 1626 can include an accumulator or movable member configured to accumulate, dampen and/or store pressure energy within the inlet feed water $S_{in}$, thereby producing a constant flow and/or pressure to the water processor 1100. In other embodiments, the supply manifold 1626 can include a heater (not shown in FIG. 1) to further heat the inlet feed water $S_{in}$.

The air processing subsystem 1500 is configured to circulate air within the water desalinization system 1000. As described herein, a first portion of the inlet air $G_{in}$, which is substantially dry (i.e., substantially free of moisture content), is conveyed into the atomizer plenum 1120 of the water processor 1100 where it is mixed with the flow of inlet feed water $S_{in}$ from the first and second atomizers 1200 to produce an atomized flow of the inlet feed water $S_{in}$. The atomized flow of the inlet feed water $S_{in}$ is identified in FIG. 1 as the flow $S_1$ and $S_2$, produced by the first and second atomizers 1200, respectively. A second portion of the inlet air $G_{in}$ is conveyed into the evaporation plenum 1130 of the water processor 1100 where it is mixed with the atomized flow S1 and S2 such that inlet feed water $S_{in}$ is evaporated into the inlet air $G_{in}$. In this manner, a mixture of air, water vapor and concentrated brine solution (the mixture is identified by the reference character $G_2$ in FIG. 1) is produced. In this manner, the inlet air $G_{in}$ absorbs the inlet feed water $S_{in}$ and conveys the inlet feed water $S_{in}$ through the system 1000.

The air processing subsystem 1500 includes an air pump 1510, an air inlet plenum 1516 (which includes an external air inlet port 1511), and an air return plenum 1518. The air pump 1510 can be any suitable fluid machine for producing a pressure and/or flow of air through the system 1000, as described herein. More particularly, the air pump 1510 compresses the inlet air $G_{in}$ from external air inlet port 1511 and/or air return plenum 1518 such that the inlet air $G_{in}$ is conveyed into the water processor 1100, as shown by the arrow BB in FIG. 1. In some embodiments, the air pump 1510 is a centrifugal pump or blower that produces a flow of the inlet air $G_{in}$ having a flow rate of between 30 cubic feet per minute and 3000 cubic feet per minute and a pressure of between 3 p.s.i. and 10 p.s.i. In some embodiments, the air pump 1510 can produce a pressurized airflow within the plenum 1516 having a pressure of approximately 5 p.s.i. at a flow rate of approximately 300 cubic feet per minute. The air pump 1510 can be any suitable pump, such as for example, a Rotex C30-74 supercharger. Although the air pump 1510 is shown and described as producing a pressure of less than 10 p.s.i., in other embodiments, the air pump 1510 can produce any desired range of pressure.

The air pump 1510 can be driven by any suitable mechanism, such as, for example, by an electric motor (not shown in FIG. 1). In other embodiments, the air pump 1510 can be driven by a fluid machine (e.g., a turbine powered by shop air or the like).

The air circuit is a substantially closed system to conserve kinetic energy and reduce the noise level associated with the air pump 1510 and the flow of the inlet air $G_{in}$ throughout the system. The air inlet plenum 1516, however, includes an external air inlet port 1511, from which external air (e.g., "make-up air") can be drawn. In other embodiments, however, the air processing subsystem 1500 can include an external inlet port in any suitable location.

The water processor 1100 includes a housing 1110 (or other suitable structure that defines one or more enclosures), a series of atomizers 1200, and a series of vaporizers (or evaporators) 1270. A baffle 1140 is disposed within the housing 1110 to divide the housing 1110 into the atomizer plenum 1120 and the evaporation plenum 1130.

Each of the atomizers 1200 is disposed, at least partially, within the atomizer plenum 1120. The atomizers 1200 are configured to receive a portion of the inlet feed water $S_{in}$ and a portion of the inlet air $G_{in}$ to produce an atomized flow of the inlet feed water $S_1$ and $S_2$. More particularly, each atomizer 1200 receives heated inlet feed water $S_{in}$ from the water inlet assembly 1600, as described above. Each atomizer 1200 also receives a portion of the inlet air $G_{in}$ from the air processing subassembly 1500, as described above. The atomizers 1200 are configured to mix the inlet feed water $S_{in}$ and the inlet air $G_{in}$, as shown by the arrow CC in FIG. 1, to produce an atomized flow and/or fine spray of the inlet feed water $S_1$ and $S_2$. In this manner, the atomizers 1200 produce a flow of small water droplets and water vapor suspended in the process air. The small water droplets have a greater ratio of surface area to volume, which facilitates evaporation, as described below. The atomized flow $S_1$ and $S_2$ from each of the atomizers 1200 is conveyed into the evaporation plenum 1130 through an opening and/or nozzle, as shown by the arrows DD. Although the atomizers 1200 are shown and described as being configured to mix the inlet solution $S_{in}$ with a portion of the inlet air $G_{in}$ supplied by the air processing subsystem 1500, in other embodiments, the atomizers 1200 can be configured to atomize the inlet feed water $S_{in}$ without mixing the inlet feed water $S_{in}$ with a portion of the inlet air $G_{in}$. For example, in some embodiments, the atomizers 1200 can be configured to produce an atomized spray of the inlet feed water $S_{in}$ by high-pressure injection.

Each of the vaporizers 1270 is disposed, at least partially, within the evaporation plenum 1130. The vaporizers 1270 are configured to receive the atomized flow of the inlet feed water $S_1$ and $S_2$ and mix the atomized flow $S_1$ and $S_2$ with the second portion of the inlet air $G_{in}$ to produce the substantially vaporized mixture $G_2$. The vaporizers 1270 can include any suitable structure and/or mechanisms to promote vaporization of the atomized flow $S_1$ and $S_2$. For example, in some embodiments, the vaporizers 1270 can include a circulation flow path to allow the atomized flow $S_1$ and $S_2$ sufficient time and/or length of travel to mix with the inlet air $G_{in}$. In other embodiments, the vaporizers 1270 can include a heater to promote vaporization of the atomized flow $S_1$ and $S_2$.

The evaporation plenum 1130 defines, at least in part, a flow path 1134 within which the inlet air $G_{in}$ and/or the atomized flow $S_1$ and $S_2$ from each of the atomizers 1200 can flow to each of the vaporizers 1270. Moreover, the vaporizers 1270 and the evaporation plenum 1130 can be configured such that the flow path 1134 flows through and/or includes each of the vaporizers 1270. Moreover, each atomizer 1200 is disposed, at least partially, within the baffle 1140 such that the outlet portion of each atomizer 1200 is in fluid communication with the flow path 1134 and/or the corresponding vaporizer 1270.

In use, the evaporation plenum 1130 receives a portion of the inlet air $G_{in}$ provided by the air processing subassembly 1500 via an opening 1141 defined by the baffle 1140, as shown by the arrow BB'. The inlet solution $S_1$ is mixed with the substantially dry inlet air $G_{in}$ provided by the air processing subsystem 1500, as described above. The inlet solution S2 is then mixed with the mixture $G_1$ of the inlet air $G_{in}$ and the inlet solution $S_1$. Thus, the evaporation plenum 1130 of the housing 1110 is configured such the inlet air $G_{in}$ flowing within the flow path 1134 is sequentially mixed with the atomized flow of the solution produced by each atomizer 1200 to produce a substantially vaporized mixture of the air and the solution $G_2$.

The separator 1300 is fluidically coupled to the outlet portion of the processor 1100 such that the substantially vaporized mixture $G_2$ flows from the processor 1100 into the separator 1300, as indicated by arrow EE. The separator produces a first outlet flow and a second outlet flow. The first outlet flow includes a portion of the air $G_{in}$ and the vaporized portion VAP of the solvent (e.g., water) from the inlet feed water $S_{in}$. The first outlet flow VAP is then conveyed to a condenser assembly 1400, as indicated by arrow FF. The second outlet flow includes a liquid portion LIQ of the solvent from the solution and the solute WASTE from the solution. The second outlet flow is then conveyed to a volume substantially outside the system, as indicated by arrow GG. In this manner, the separator 1300 separates the solute from the solution.

The separator 1300 can include any structure and/or mechanism to separate the vaporized portion VAP of the solvent and the solute WASTE. In some embodiments, for example, the separator 1300 can include a series of structures and/or define a tortuous path to separate the heavier solute from the vapor. In other embodiments, the separator 1300 can include a centrifugal separation mechanism to separate the heavier solute from the vapor.

The condenser assembly 1400 includes a housing 1410, a condenser element 1430 (disposed within the housing 1410), and a heat pipe 1450. As described above, housing 1410 defines an interior volume that receives the first outlet flow VAP, as indicated by arrow FF. The condenser 1400 includes any structure and or mechanisms to transfer thermal energy between the relatively hot first outlet flow VAP and the relatively cool ambient conditions (e.g., the inlet feed water $S_{in}$). Similarly stated, the condenser element 1430 condenses the vaporized portion VAP of the solvent to produce the flow of process water P (indicated by arrow HH in FIG. 1) that is substantially free of the solute. As described above, a portion of the inlet piping 1622 of the water inlet assembly 1600 is disposed within the housing 1410 and/or the condenser element 1430 such that heat is transferred from the first outlet flow VAP to the inlet feed water $S_{in}$. In addition to removing heat from the condenser assembly 1400 and/or condenser element 1430, warming the inlet feed water $S_{in}$ also allows for a more rapid absorption of the atomized flow $S_1$ and $S_2$ respectively.

As shown in FIG. 1, the condenser element 1430 is configured to interact with the heat pipe 1450. The heat pipe 1450 can be any suitable heat pipe of known configuration that transfers heat between the condenser assembly 1400 and the processor assembly 1100, and more particularly the evaporation plenum 1130 of the processor assembly 1100. The heat pipe 1450 can be, for example, a gravity action heat pipe, a capillary action heat pipe or the like. The heat pipe 1450 has a first end portion 1452 and a second end portion 1454, and a substantially adiabatic section 1453 there between. The heat pipe 1450 contains a working fluid 1455, such as for example, water, acetone, ammonia, ethanol, and/or any other suitable fluid. The first end portion 1452 (i.e., the condenser end) is disposed within the condenser assembly 1400 and/or is coupled to the condenser element 1430. The second end portion 1454 (i.e., the evaporator end) is disposed within the evaporation plenum 1130.

In use, the first outlet flow VAP is conveyed to the condenser element 1430 of the condenser assembly 1400 and, either directly or indirectly, to the first end portion 1452 of the heat pipe 1450. When the first outlet flow VAP flows across the evaporator end 1452 of the heat pipe 1450, heat is transferred from the first outlet flow VAP to the evaporator end 1452 of the heat pipe 1450 (and subsequently the heat pipe working fluid 1455) and/or the condenser element 1430. The heat transfer causes the heat pipe working fluid 1455 to boil and liquid process water P to form, as mentioned above. The heat pipe working fluid 1455 boils at the temperature of first outlet flow VAP because the heat pipe 1450 is sealed and evacuated below atmospheric pressure. When the heat pipe working fluid 1455 is in the vapor phase, the vapor flows through a substantially adiabatic section 1453 of the heat pipe 1450 to the condenser end 1454, as shown by the arrow II. When the vaporized heat pipe working fluid 1455 is in the condenser end 1454, heat is transferred from the vaporized heat pipe working fluid 1455 to the body of the heat pipe 1450 and subsequently to the fluid (e.g., the inlet air Gin and/or the mixture $G_2$) within the processor 1100. This transfer of heat increases the temperature of the fluid flowing within the processor assembly 1100 (thereby increasing the amount of the flow $S_1$ and $S_2$ that can be absorbed into the air $G_{in}$ and/or $G_1$, respectively) and condenses the heat pipe working fluid 1455 back into a substantially liquid phase. The heat pipe working fluid 1455 then returns to heat pipe evaporator end 1452.

Thus, the heat pipe 1450 enhances the efficiency of the condenser 1400 and the vaporization process within the processing assembly 1100. Although the second end portion 1454 is shown and described as conveying heat to the evaporation plenum 1130, in other embodiments, the heat pipe 1450 can be configured to transfer heat to the atomizer plenum 1120, and/or the air processing subsystem 1500. Furthermore, the heat pipe 1450 can be configured as a loop style heat pipe, allowing the heat pipe working fluid 1455 to flow continuously between the various zones of high and low temperatures.

In some embodiments, the water desalinization system 1000 can include a control system (not shown in FIG. 1) to control the flow of air and or water within certain portions of the system. For example, the control system can include a set of components such as pressure sensors and adjustable valves to monitor and/or control the flow rate and pressure of air through the air pump 1510. Similarly, the flow rate, pressure, and/or saturation of the solution entering or exiting the atomizers 1200 and/or vaporizers 1270 can be controlled. In this manner, the saturation level of the mixture $G_2$ can be monitored and controlled either manually (i.e., direct user control) or via feedback using the control system.

FIG. 2 is a schematic illustration of a processor system 2100 according to an embodiment. As described herein, the processor system 2100 is configured to produce a mixture of a solution $S_{in}$ and an inlet air $G_{in}$ (the mixture is identified in FIG. 2 as mixture $G_1$ or mixture $G_2$). The processor system 2100 is further configured to produce a gaseous flow of vapor VAP (i.e., air that is substantially saturated with the liquid portion of the solution $S_{in}$) and a flow of waste products (identified in FIG. 2 as WASTE). The processor system 2100 can be included within any suitable liquid purification system of the types shown and described herein, such as, for example, the water desalinization system 1000 shown and described above.

The processor system 2100 includes a housing 2110, a series of atomizers 2200 and a separator 2300. Each atomizer 2200 has an inlet portion 2210 and an outlet portion 2240. The inlet portion 2210 of each atomizer 2200 is configured to receive an inlet flow of a solution $S_{in}$ as shown by the arrows JJ. The inlet flow of solution $S_{in}$ can be conveyed to the atomizers 2200 via any suitable mechanism, such as for example, by a series of supply lines (each of which corresponds to one of the atomizers 2200), an inlet manifold, or the like. The solution $S_{in}$ can be any suitable solution of a solvent containing a solute. In some embodiments, for example, the solution can be a solution of water (the solvent) and salt, dissolved solids or the like (the solute). Similarly stated, in some embodiments, the solution can be seawater, brackish water or the like.

The outlet portion 2240 of each atomizer 2200 is configured to produce an atomized flow of the solution $S_{in}$. Similarly stated, the atomizer 2200 and/or outlet portion 2240 is configured to produce a spray including small particles of the solution $S_{in}$. In particular, the atomized portion of the solution $S_{in}$ produced by the outlet portion 2240 of the first atomizer is identified as $S_1$ and the atomized portion of the solution $S_{in}$ produced by the outlet portion 2240 of the second atomizer is identified as $S_2$. The atomizer 2200 can atomize the solution $S_{in}$ using any suitable mechanism. For example, in some embodiments, the atomizer 2200 can include and/or define an orifice and/or a nozzle through which the solution $S_{in}$ flows in a manner to produce a spray including small particles of the solution $S_{in}$. In some embodiments, the atomizer 2200 can convert the pressure energy of the inlet flow of the solution $S_{in}$ to facilitate the atomization process. Such “pressure-driven” configurations can operate at any suitable pressure level, such as, for example a solution pressure of greater than 20 psi, greater than 50 psi, greater than 100 p.s.i. and/or greater than 200 p.s.i. In other embodiments, the atomizer 2200 can be an “air-assisted” atomizer that mixes the inlet flow of the solution $S_{in}$ with an airflow to facilitate the atomization process. Although FIG. 2 is shown as having a pair of atomizers, in other embodiments, the processor system 2100 can have any suitable number of atomizers 2200.

The housing 2110 includes an inlet portion 2122 that receives a gas $G_{in}$, and an outlet portion 2135. The housing 2110 defines a flow path 2134 between the inlet portion 2122 and the outlet portion 2135. As shown in FIG. 2, each atomizer 2200 is disposed, at least partially, within the housing 2110 such that the outlet portion 2240 of each atomizer 2200 is in fluid communication with the flow path 2134. This arrangement permits the gas $G_{in}$ flowing within the flow path 2134 to be sequentially mixed with the atomized flow of the solution $S_{in}$ produced by each of the atomizers 2200.

More particularly, in use the housing 2110 receives an inlet gas $G_{in}$, having an initial humidity ratio of $\omega_{in}$ via the inlet portion 2122, as indicated by arrow KK. The inlet gas $G_{in}$ flows within the flow path 2134 and is mixed with the atomized flow of solution $S_1$ produced by the first atomizer 2200. A mixture of the gas $G_{in}$ and the portion of the solution $S_1$ (identified as the mixture $G_1$) is produced, having a humidity ratio $\omega_1$ that is greater than the initial humidity ratio $\omega_{in}$. The gas mixture $G_1$ is then mixed with the atomized flow of the solution $S_2$ produced by the second atomizer 2200 to produce a mixture that includes the portion of the solution $S_2$ (identified as the mixture $G_2$) having a humidity ratio $\omega_2$ that is greater than the initial humidity ratio $\omega_{in}$ and the humidity ratio $\omega_1$. Said a different way, the housing 2110 and the atomizers 2200 are collectively configured to sequentially mix the inlet gas $G_{in}$ with atomized flow produced by each atomizer 2200 in series (i.e., at a different time and/or a different spatial location within the flow path 2134) such that the humidity ratio $\omega$ increases as the gas solution mixture flows past each successive atomizer 2200. In this manner, the inlet solution $S_{in}$ is mixed with and/or atomized into the inlet gas $G_{in}$ flow to produce a mixture having a desired humidity ratio that is subsequently conveyed into the separator 2300, as described below.

The separator 2300 is fluidically coupled to the outlet portion 2135 of the housing 2110 such that the separator 2300 receives the mixture of the gas and solution from the outlet portion 2135 as indicated in FIG. 2 by arrow LL. The separator 2300, which has a first outlet portion 2331 and second outlet portion 2332, is configured to produce a first outlet flow and a second outlet flow. More particularly, the first outlet flow includes a portion of the gas $G_{in}$ and a vaporized portion VAP of the solvent. The second outlet flow includes a liquid portion LIQ of the solvent and the solute WASTE (i.e., the solid waste) from the solution. As shown in FIG. 2, the first outlet flow, including a portion of the gas $G_{in}$ and the vaporized portion VAP of the solvent, can be conveyed, via the first outlet portion 2331, to any suitable condenser (not shown in FIG. 2) as shown by the arrow MM. The second outlet flow, including the liquid portion LIQ of the solvent and the solute WASTE, can be conveyed, via the second outlet portion 2332, to a volume substantially outside the system, as indicated by arrow NN in FIG. A1. In this manner, the separator 2300 separates the solute from the solution. Similarly stated, in embodiments in which the solution is seawater, the separator 2300 separates the salt and/or total dissolved solids from the water, thereby producing a substantially purified water vapor. The separator 2300 can use any suitable mechanism for separating the solute from the solution, such as a tortuous path, a filter, a rotating member, an electrically charged member and/or the like.

FIG. 3 is a schematic illustration of a processor system 3100 according to an embodiment. As described herein, the processor system 3100 is configured to produce a mixture of a solution $S_{in}$ and a gas $G_{in}$ (the mixture is identified in FIG. 3 as mixture $G_1$, $G_2$, $G_3$, and/or $G_4$). The processor system 3100 is further configured to produce a gaseous flow of vapor VAP (i.e., air that is substantially saturated with the liquid portion of the solution $S_{in}$) and a flow of waste products (identified in FIG. 3 as WASTE). The processor system 3100 can be included within any suitable liquid purification system of the types shown and described herein.

The processor system 3100 includes a housing 3110, a series of atomizers 3200, and a separator 3300. Each atomizer 3200 has an inlet portion 3210 and an outlet portion 3240. The inlet portion 3210 of each atomizer is configured to receive an inlet flow of a solution $S_{in}$, as shown by the arrows RR. The solution $S_{in}$ can be any suitable solution of a solvent containing a solute. In some embodiments, for example, the solution can be of water (the solvent) and salt, dissolved solids or the like (the solute). The inlet portion 3210 receives the solution $S_{in}$ using any suitable mechanism described herein.

The outlet portion 3240 of each atomizer 3200 is configured to produce an atomized flow of the solution $S_{in}$. Similarly stated, the atomizer 3200 and/or outlet portion 3240 is configured to produce a spray including small particles of the solution $S_{in}$. In particular, the atomized portion of the solution $S_{in}$ produced by the outlet portion 3240 of the first atomizer is identified as $S_1$, the atomized portion of the solution $S_{in}$ produced by the outlet portion 3240 of the second atomizer is identified as $S_2$, the atomized portion of the solution $S_{in}$ produced by the outlet portion 3240 of the third atomizer is identified as $S_3$ and the atomized portion of the solution $S_{in}$ produced by the outlet portion 3240 of the fourth atomizer is identified as $S_4$. The atomizers 3200 can atomize the solution $S_{in}$ using any suitable mechanism. For example, in some embodiments, the atomizers 3200 can include and/or define an orifice and/or a nozzle through which the solution $S_{in}$ flows in a manner to produce a spray including small particles of the solution $S_{in}$. In some embodiments, the atomizers 3200 can convert the pressure energy of the inlet flow of the solution $S_{in}$ to facilitate the atomization process. Although FIG. 3 is shown as having four atomizers, in other embodiments, the processor system 3100 can have any suitable number of atomizers 3200.

The housing 3110 includes an inlet portion 3122 that receives a gas $G_{in}$ and an outlet portion 3135. The housing 3110 defines a flow path 3134 between the inlet portion 3122 and the outlet portion 3135. As shown in FIG. 3, each atomizer 3200 is disposed, at least partially, within the housing 3110 such that the outlet portion 3240 of the atomizer 3200 is in fluid communication with the flow path 3134. This arrangement permits the gas $G_{in}$ flowing within the flow path 3134 to be sequentially mixed with the atomized flow of the solution $S_{in}$ produced by each of the atomizers 3200.

Figure 3:
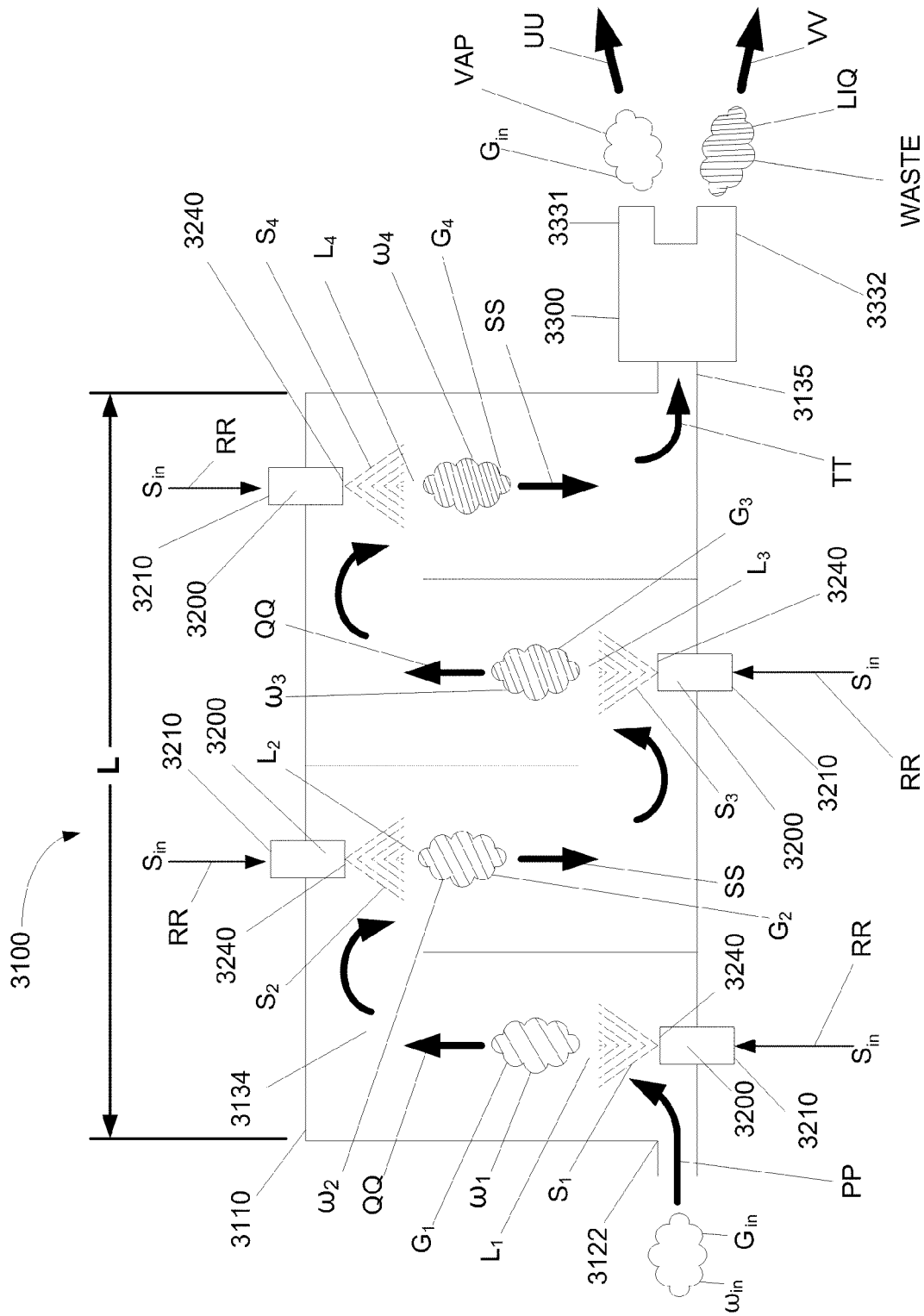
FIG. 3 is a schematic illustration of a processor system according to an embodiment.

The housing 3110 is configured such that the inlet portion 3210 receives an inlet gas $G_{in}$ having an initial humidity ratio of $\omega_{in}$, as indicated by arrow PP in FIG. 3. The housing 3110 directs the inlet gas $G_{in}$ to flow within the flow path 3134 toward a first mixing location $L_1$. The inlet gas $G_{in}$ is first mixed with the atomized flow of solution $S_1$ produced by the first atomizer 3200. A first mixture of the gas $G_{in}$ and the atomized portion of the solution $S_1$ (identified as mixture $G_1$) is produced, having a humidity ratio $\omega_1$, that is greater than the humidity ratio $\omega_{in}$, and having an axial velocity component in a first direction QQ. The first atomizer 3200 is disposed in the housing 3110 such that the atomized portion of the solution $S_1$ flows in the first direction QQ. Similarly stated, the flow of the solution $S_1$ and the flow of the gas $G_{in}$ in the flow path 3134 are in substantially the same direction at a first mixing location $L_1$. The mixture $G_1$ then flows within the flow path 3134 toward a second mixing location $L_2$. The housing 3110 is configured such that the flow of the mixture at the second mixing location $L_2$ (indicated by the arrow SS) has a flow direction that is substantially opposite the first direction QQ. The gas $G_1$ is mixed, at the second mixing location $L_2$, with the atomized flow of solution $S_2$ produced by the second atomizer 3200 to produce a second mixture of the gas $G_1$ and the atomized portion of the solution $S_2$ (identified as mixture $G_2$), having a humidity ratio $\omega_2$, that is greater than the humidity ratio $\omega_1$, and having an axial velocity component in a second direction SS. The mixture $G_2$ then flows within the flow path 3134 toward a third mixing location $L_3$. The housing 3110 is configured such that the flow of the mixture at the third mixing location $L_3$ is in the first direction (as indicated by the arrow QQ). The gas $G_2$ is mixed, at the third mixing location $L_3$, with the atomized flow of the solution $S_3$ produced by the third atomizer 3200 to produce a third mixture of the gas $G_2$ and the atomized portion of the solution $S_3$ (identified as mixture $G_3$), having a humidity ratio $\omega_3$, that is greater than the humidity ratio $\omega_2$, and having an axial velocity component in the first direction QQ. The mixture $G_3$ then flows within the flow path 3134 toward a fourth mixing location $L_4$. The housing 3110 is configured such that the flow of the mixture at the fourth mixing location $L_4$ is in the second direction (as indicated by the arrow SS). The gas $G_3$ is mixed, at the fourth mixing location $L_4$, with the atomized flow of the solution $S_4$ produced by the fourth atomizer 3200 to produce a fourth mixture of the gas $G_3$ and the atomized portion of the solution $S_4$ (identified as mixture $G_4$), having a humidity ratio $\omega_4$, that is greater than the humidity ratio $\omega_3$, and having an axial velocity component in the first direction QQ. Said a different way, the atomizers 3200 are positioned in the housing 3110 such that the flow of the atomized portion of the solution $S_1$, $S_2$, $S_3$, and $S_4$, respectively, is in the same direction of the flow path 3134 at each mixing location, $L_1$, $L_2$, $L_3$, $L_4$ respectively, as shown in FIG. 3.

The housing 3110 is configured such that the flow path 3134 produces a flow therein that alternates between the first direction QQ and the second direction SS, changing directions before each subsequent mixture. Similarly stated, the gas $G_{in}$ enters the inlet portion 3122 and flows within the flow path 3134 to the first mixing location $L_1$ where the gas $G_{in}$ and/or the mixture $G_1$ flows in the first direction QQ. The housing 3110 is configured to direct the flow path 3134 in the second direction SS, substantially opposite of the first direction QQ, before the flow path 3134 reaches the second mixing location $L_2$. The housing 3110 is configured such that the mixture $G_2$ flows in the first direction QQ before the flow path 3134 reaches the third mixing location $L_3$.

Although FIG. 3 shows the flow paths in parallel and opposite directions, in other embodiments the housing 3110 can be configured to direct the fluid flow therein in any suitable manner that will reduce the length L of the housing 3110 while maintaining the efficiency of the mixing and/or vaporization of the inlet as $G_{in}$ and the solution $S_{in}$. In some embodiments, the housing 3110 can be configured such that two or more atomizers 3200 are disposed, at least partially, within the housing 3110 in the same direction of the flow path 3134 at a given location (i.e., $L_1$, $L_2$, $L_3$ $L_4$). In this arrangement the inlet gas $G_{in}$ can be mixed with more than one atomized flow of the solution $S_{in}$. Furthermore, while FIG. 3 shows the processor system 3100 having four atomizers 3200, in other embodiments, the processor system 3100 can have any suitable number of atomizers 3200 and the housing 3110 can be configured to change the direction of the flow before each of the respective atomizers 3200.

The separator 3300 is fluidically coupled to the outlet portion 3135 of the housing 3110 such that the separator 3300 receives the mixture of the gas and solution from the outlet portion 3135 as indicated in FIG. 3 by arrow TT. The separator 3300, which has a first outlet portion 3331 and a second outlet portion 3332, is configured to produce a first outlet flow and a second outlet flow. More particularly, the first outlet flow includes a portion of the gas $G_{in}$ and a vaporized portion VAP of the solvent. The second outlet flow includes a liquid portion LIQ of the solvent and the solute WASTE (i.e., the solid waste) from the solution. As shown in FIG. 3, the first outlet flow, including a portion of the gas $G_{in}$ and the vaporized portion VAP of the solvent, can be conveyed, via the first outlet portion 3331, to any suitable condenser (not shown in FIG. 3) as shown by the arrow UU. The second outlet flow, including the liquid portion LIQ of the solvent and the solute WASTE, can be conveyed, via the second outlet portion 3332, to a volume substantially outside the system, as indicated by arrow VV. In this manner, the separator 3300 separates the solute from the solution. Similarly stated, in embodiments in which the solution is seawater, the separator 3300 separates the salt and/or total dissolved solids from the water, thereby producing a substantially purified water vapor. The separator 3300 can use any suitable mechanism for separating the solute from the solution, such as a tortuous path, a filter, a rotating member, an electrically charged member and/or the like.

Figure 4:
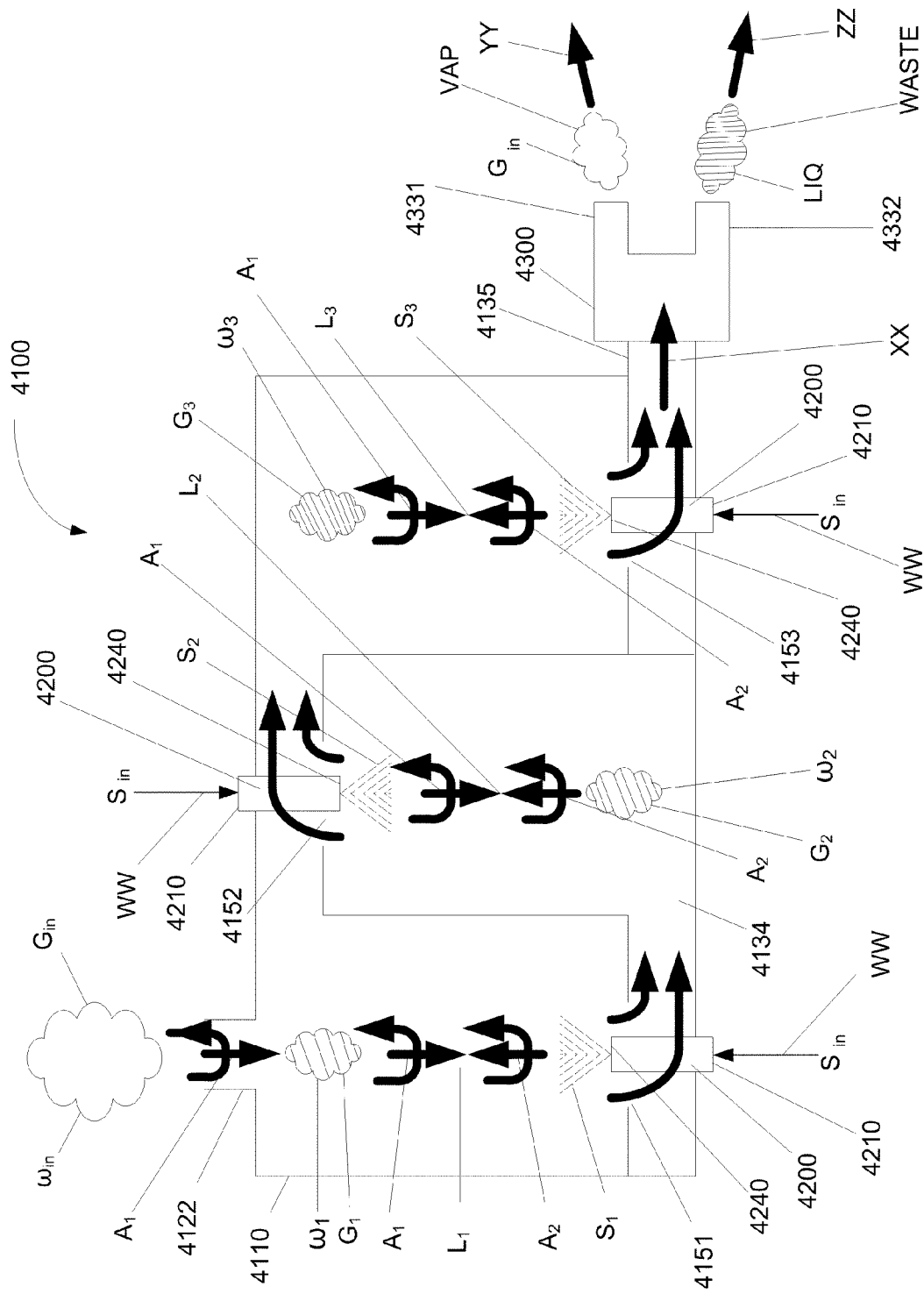
FIG. 4 is a schematic illustration of a processor system according to an embodiment.

FIG. 4 is a schematic illustration of a processor system 4100 according to an embodiment. As described herein, the processor system 4100 is configured to produce a mixture of a solution $S_{in}$ and a gas $G_{in}$ (the mixture is identified in FIG. 4 as mixture $G_1$, $G_2$, and/or $G_3$). The processor system 4100 is further configured to produce a gaseous flow of vapor VAP (i.e., air that is substantially saturated with the liquid portion of the solution $S_{in}$) and a flow of waste products (identified in FIG. 4 as WASTE). The processor system 4100 can be included within any suitable liquid purification system of the types shown and described herein.

The processor system 4100 includes a housing 4110, a series of atomizers 4200, and a separator 4300. Each atomizer 4200 has an inlet portion 4210 and an outlet portion 4240. The inlet portion 4210 of each atomizer is configured to receive an inlet flow of a solution $S_{in}$, as shown by the arrows WW. The solution $S_{in}$ can be any suitable solution of a solvent containing a solute. In some embodiments, for example, the solution can be of water (the solvent) and salt, dissolved solids or the like (the solute). The inlet portion 4210 receives the solution $S_{in}$ using any suitable mechanism described herein.

The outlet portion 4240 of each atomizer 4200 is configured to produce an atomized flow of the solution $S_{in}$. Similarly stated, the atomizer 4200 and/or outlet portion 4240 is configured to produce a spray including small particles of the solution $S_{in}$. In particular, the atomized portion of the solution $S_{in}$ produced by the outlet portion 4240 of the first atomizer is identified as $S_1$, the atomized portion of the solution $S_{in}$ produced by the outlet portion 4240 of the second atomizer is identified as $S_2$ and the atomized portion of the solution $S_{in}$ produced by the outlet portion 4240 of the third atomizer is identified as $S_3$. The atomizer 4200 can atomize the solution $S_{in}$ using any suitable mechanism. For example, in some embodiments, the atomizer 4200 can include and/or define an orifice and/or a nozzle through which the solution $S_{in}$ flows in a manner to produce a spray including small particles of the solution $S_{in}$. In some embodiments, the atomizer 4200 can convert the pressure energy of the inlet flow of the solution $S_{in}$ to facilitate the atomization process. In other embodiments, the atomizer 4200 can be an "air-assisted" atomizer that mixes the inlet flow of the solution $S_{in}$ with an airflow to facilitate the atomization process. Although FIG. 4 is shown as having three atomizers, in other embodiments, the processor system 4100 can have any suitable number of atomizers 4200.

The housing 4110 includes an inlet portion 4122 that receives a gas $G_{in}$ and an outlet portion 4135. The housing 4110 defines a flow path 4134 between the inlet portion 4122 and the outlet portion 4135. As shown in FIG. 4, each atomizer 4200 is disposed, at least partially, within the housing 4110 such that the outlet portion 4240 of the atomizer 4200 is in fluid communication with the flow path 4134. This arrangement permits the gas $G_{in}$ flowing within the flow path 4134 to be sequentially mixed with the atomized flow of the solution $S_{in}$ produced by each of the atomizers 4200.

The housing 4110 is configured such that the inlet portion 4122 receives a flow of gas $G_{in}$ having an initial humidity ratio of $\omega_{in}$ and characterized by a first axial flow direction and rotational flow direction, collectively indicated by arrow $A_1$ in FIG. 4. More specifically, the gas $G_{in}$ flowing within the inlet portion 4122 includes an axial velocity component and a rotational velocity component (about the axis defining the axial velocity component) that are collectively identified as the first axial and rotational direction $A_1$. The rotational direction can be in a counterclockwise direction, as shown in FIG. 4, or a clockwise direction according to some embodiments. Furthermore, the first axial and rotational direction $A_1$ can be inherent to the flow of the inlet gas $G_{in}$ before the inlet gas $G_{in}$ enters the housing 4110 (i.e., produced by a gas source not shown in FIG. 4), or can be produced by the inlet portion 4122 via a nozzle, turbine, orifice, channel, stator, set of vanes and/or the like.

The housing 4110 directs the inlet gas $G_{in}$ to flow within the flow path 4134 toward a first mixing location $L_1$. The inlet gas $G_{in}$ is first mixed with the atomized flow of solution $S_1$ produced by the first atomizer 4200. A first mixture of the gas $G_{in}$ and the atomized portion of the solution $S_1$ is produced (identified as $G_1$ in FIG. 4), having a humidity ratio $\omega_1$, that is greater than the humidity ratio $\omega_{in}$, and having the first axial and rotational direction $A_1$. The first atomizer 4200 is disposed in the housing 4110 such that the atomized portion of the solution $S_1$ flows with a second axial and rotational direction, as indicated by the arrow $A_2$. More specifically, the axial component of the second axial and rotational direction $A_2$, is in a substantially opposite axial direction to the first axial and rotational direction $A_1$, but has the same rotational direction. Similarly stated, the flow of $S_1$ and the flow of the inlet gas in the flow path 4134 are in an opposite axial direction at a first mixing location $L_1$, but are characterized by a substantially similar rotational direction.

The housing 4110 directs the flow path 4134 with the first axial and rotational direction $A_1$ through a first channel 4151 defined by the housing 4110, as shown in FIG. 4, toward a second mixing location $L_2$, where the gas $G_1$ mixes with the atomized flow of solution $S_2$ produced by the second atomizer 4200. The housing 4110 is configured such that the flow of gas $G_1$ flowing towards the second mixing location $L_2$ is characterized by the second axial flow direction and the rotational flow direction, collectively indicated by arrow $A_2$. Thus, the axial flow direction of the gas flow at the second mixing location $L_2$ is substantially opposite the axial flow direction of the gas flow at the first mixing location $L_1$. A second mixture of the gas $G_1$ and the atomized portion of the solution $S_2$ is produced (identified as $G_2$ in FIG. 4) at the second mixing location $L_2$, having a humidity ratio $\omega_2$, that is greater than the humidity ratio $\omega_1$, and having an axial and rotational direction $A_2$. The second atomizer 4200 is disposed in the housing 4110 such that the atomized portion of the solution $S_2$ flows with the first axial and rotational direction $A_1$. Thus, the axial velocity component of the gas flow at the second mixing location $L_2$ is substantially opposite the axial velocity component of the solution $S_2$, and the rotational velocity component of the gas flow at the second mixing location $L_2$ is substantially the same as the rotational velocity component of the solution $S_2$.

The housing 4110 directs the flow path 4134 with the second axial and rotational direction $A_2$ through a second channel 4152 defined by the housing 4110 toward a third mixing location $L_3$, where the gas $G_2$ mixes with the atomized flow of solution $S_3$ produced by the third atomizer 4200. The housing 4110 is configured such that the flow of the gas $G_2$ flowing towards the third mixing location $L_3$ is characterized by the first axial flow direction and the rotational direction, collectively indicated by arrow $A_1$. Thus, the axial flow direction of the gas flow at the third mixing location $L_3$ is substantially opposite the axial flow direction of the gas flow at the second mixing location $L_2$ and substantially similar to the axial flow direction of the gas flow at the first mixing location $L_1$. A third mixture of the gas $G_2$ and the atomized portion of the solution $S_3$ is produced (identified as $G_3$ in FIG. 4) at the third mixing location $L_3$, having a humidity ratio $\omega_3$ that is greater than the humidity ratio $\omega_2$, and having an axial and rotational direction $A_1$. The third atomizer 4200 is disposed in the housing 4110 such that the atomized portion of the solution $S_3$ flows with the second axial and rotational direction $A_2$. Thus, the axial velocity component of the gas flow at the third mixing location $L_3$ is substantially opposite the axial velocity component of the solution $S_3$, and the rotational velocity component of the gas flow at the third mixing location $L_3$ is substantially the same as the rotational velocity component of the solution $S_3$. Said a different way, the atomizers 4200 are positioned in the housing 4110 such that the flow of the atomized portion of the solution $S_{in}$ is in an opposite axial direction of the flow path 4134 at each mixing location, $L_1$, $L_2$, $L_3$ respectively. Having mixed with the flow of the gas $G_{in}$, the mixture sequentially flows through the channels 4151 and 4152, respectively, to the next mixing location. The third mixture $G_3$ flows through a third channel 4153 toward the outlet portion 4135 of the housing 4110 as described below.

The separator 4300 is fluidically coupled to the outlet portion 4135 of the housing 4110 such that the separator 4300 receives the mixture of the gas and solution from the outlet portion 4135 as indicated in FIG. 4 by arrow XX. The separator 4300, which has a first outlet portion 4331, is configured to produce a first outlet flow and a second outlet flow. More particularly, the first outlet flow includes a portion of the gas $G_{in}$ and a vaporized portion VAP of the solvent. The second outlet flow includes a liquid portion LIQ of the solvent and the solute WASTE (i.e., solid waste) from the solution. As shown in FIG. 4, the first outlet flow, including a portion of the gas $G_{in}$ and the vaporized portion VAP of the solvent, can be conveyed, via the first outlet potion, to any suitable condenser (not shown in FIG. 4) as shown by the arrow YY. The second outlet flow, including the liquid portion LIQ of the solvent and the solute WASTE, can be conveyed, via the second outlet portion 4332, to a volume substantially outside the system, as indicated by arrow ZZ. In this manner, the separator 4300 separates the solute from the solution. Similarly stated, in embodiments in which the solution is seawater, the separator 4300 separates the salt and/or total dissolved solids from the water, thereby producing a substantially purified water vapor. The separator 4300 can use any suitable mechanism for separating the solute from the solution, such as a tortuous path, a filter, a rotating member, an electrically charged member and/or the like.

Figure 5:
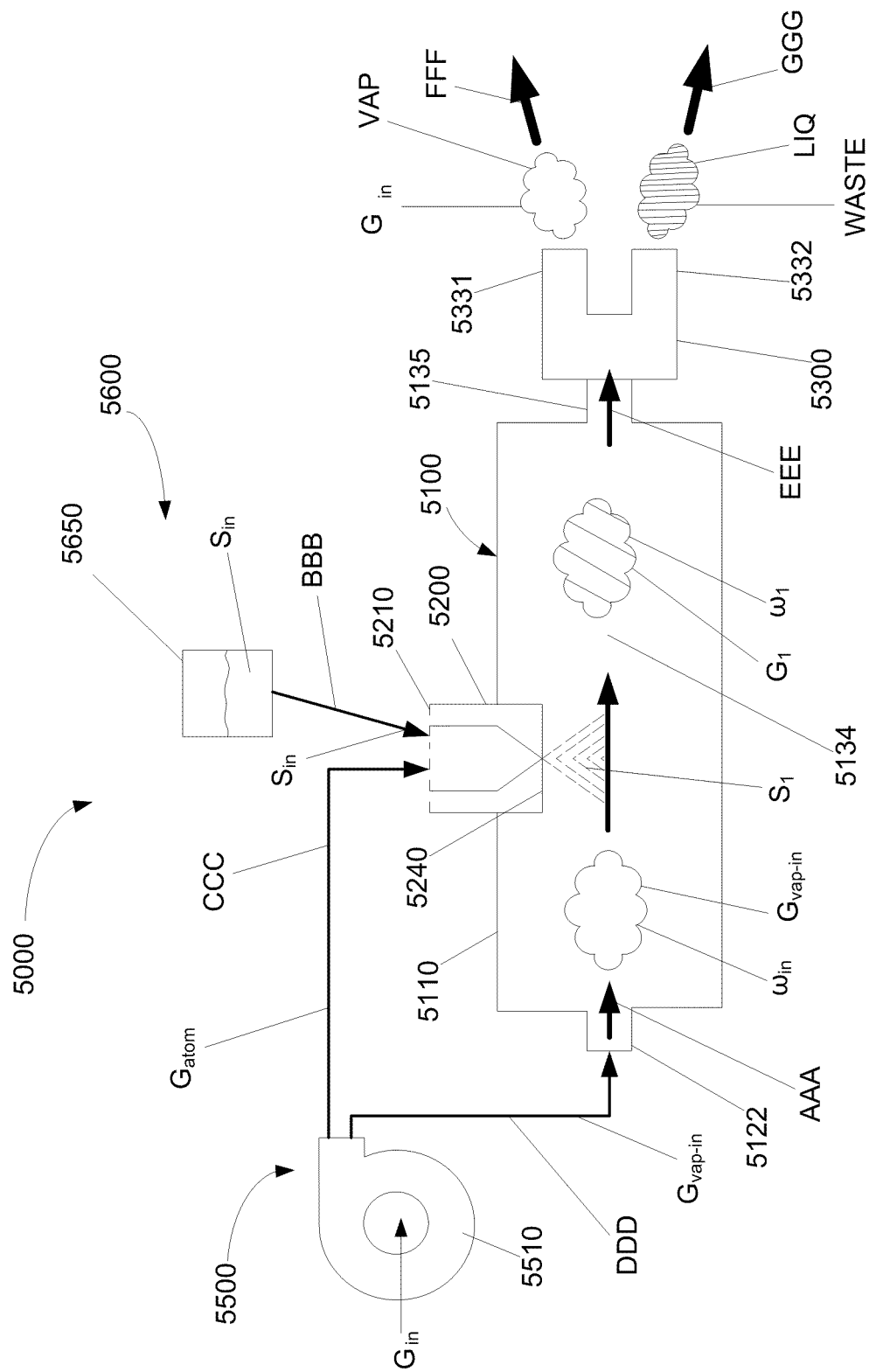
FIG. 5 is a schematic illustration of a processor system according to an embodiment.

FIG. 5 is a schematic illustration of a water desalinization system 5000 according to an embodiment. The water desalinization system 5000 includes a processor 5100, a gas processing system 5500, and a water inlet system 5600. The system 5000 is configured to receive an inlet flow of water containing a solute and produce a flow of water substantially free of the solute as described herein. In particular, an inlet solution $S_{in}$ and an inlet air $G_{in}$ are mixed by a processor 5100 to form a mixture of air, water vapor and concentrated brine solution (identified as $G_1$ in FIG. 5). The mixture $G_1$ is then separated by the separator 5300 to produce a gaseous flow of water vapor VAP (i.e., substantially saturated air) and a flow of waste products WASTE. The water vapor VAP is conveyed to a condenser (not shown in FIG. 5) to produce a flow of water substantially free of the solute. The waste product WASTE (e.g., the brine) is discharged in near solid form for disposal.

The water inlet system 5600, of FIG. 5, includes a water supply member 5650, containing a solution $S_{in}$. The water supply member 5650 can be of any suitable shape and/or size, and can be constructed from any suitable material. In some embodiments, the water supply member 5650 can be constructed from any applicable plastic, composite, metal, glass, and/or the like, configured to store the solution $S_{in}$. Furthermore, the water supply system 5650 can have a fixed inlet portion with any appropriate coupling system and/or a removable fill system such as a screw on lid, plug, and/or cap to receive the solution. The solution $S_{in}$ can be any suitable solution of a solvent containing a solute. In some embodiments, for example, the solution can be a solution of water (the solvent) and salt, dissolved solids or the like (the solute). Similarly stated, in some embodiments, the solution can be seawater, brackish water or the like.

The water supply member 5650 is fluidically coupled to an inlet portion 5210 of the atomizer 5200. The inlet flow of solution $S_{in}$ can be conveyed to the atomizer 5200 (as indicated by arrow BBB in FIG. 5) via any suitable mechanism, such as for example, by a series of supply lines (each of which corresponds to one of the atomizers 2200), an inlet manifold, or the like. More particularly, the inlet flow of the solution $S_{in}$ can be delivered using a gravity fed method, a pump, a suction system or any other suitable method. In some embodiments, the supply lines can be configured to interact with other subsystems to produce desired properties. For example, in some embodiments the supply lines can interact with a condenser (not shown in FIG. 5) to increase the temperature of the inlet solution $S_{in}$, similar to the arrangement shown and described above with reference to FIG. 1.

The air processing system 5500 includes an air source 5510 configured to receive an inlet flow of gas Gin and deliver a first portion of the inlet gas $G_{atom}$ to the inlet portion 5210 of the atomizer 5200 and a second portion gas $G_{vap-in}$ to an inlet portion 5122 of the processor 5100. The gas $G_{atom}$ can be conveyed to the atomizer 5200 (as shown by arrow CCC in FIG. 5) via any suitable mechanism, such as for example, a plenum, a pipe, an inlet manifold, or the like. Similarly, the gas $G_{vap-in}$ can be conveyed to the processor 5100 (as shown by arrow DDD in FIG. 5) via any suitable mechanism, such as for example, a plenum, a pipe, an inlet manifold, or the like. In particular, the gas processor system 5500 delivers the gas $G_{atom}$ and the gas $G_{vap-in}$ to the atomizer 5200 and the processor 5100 in parallel. Similarly stated, the flow paths of the gas $G_{atom}$ and the gas $G_{vap-in}$ can be delivered to the respective inlets simultaneously and/or the process of delivery occurs concurrently. The gas source 5510 can be any suitable gas source (e.g., a Rotex C30-74 supercharger) and can produce any suitable pressure (e.g., 3 p.s.i. to 10 p.s.i.).

The processor 5100 includes the housing 5110 with the inlet portion 5122 and an outlet portion 5135, the atomizer 5200 with the inlet portion 5210 and an outlet portion 5240, and a separator 5300. The inlet portion 5210 of the atomizer 5200 is configured to receive the inlet flow of solution $S_{in}$, and the gas $G_{atom}$, as described above. The outlet portion 5240 of each atomizer 5200 is configured to produce an atomized flow of the solution $S_{in}$. Similarly stated, the atomizer 5200 and/or the outlet portion 5240 is configured to produce a spray including small particles of the solution $S_{in}$. More particularly, the atomizer 5200 is a "gas-assisted" atomizer that mixes the inlet flow of the solution $S_{in}$ with the gas flow $G_{atom}$ to facilitate the atomization process. The atomized portion of the solution $S_{in}$ produced by the outlet portion 5240 of the first atomizer 5200 is identified as $S_1$. Although FIG. 5 is shown as having one atomizer 5200, in other embodiments, the processor system 5100 can have any suitable number of atomizers 5200.

The housing 5110 includes the inlet portion 5122, that receives a gas $G_{vap-in}$, (which has an initial humidity ratio $\omega_{in}$) and an outlet portion 5135. The housing 5110 defines a flow path 5134 between the inlet portion 5122 and the outlet portion 5135. As shown in FIG. 5, the atomizer 5200 is disposed, at least partially, within the housing 5110 such that the outlet portion 5240 of the atomizer 5200 is in fluid communication with the flow path 5134. This arrangement permits the gas $G_{vap-in}$, flowing within the flow path 5134, to be mixed with the atomized flow of the solution $S_{in}$ produced by the atomizer 5200. More particularly, the housing 5110 receives an inlet gas $G_{vap-in}$, having an initial humidity ratio of $\omega_{in}$ via the inlet portion 5122, as indicated by arrow AAA. The inlet gas $G_{vap-in}$ flows within the flow path 5134 and is mixed with the atomized flow of solution $S_1$ produced by the atomizer 5200 to produce a mixture of the gas $G_{vap-in}$ and the atomized portion of the solution $S_1$ (identified as $G_1$ in FIG. 5) having a humidity ratio $\omega_1$ that is greater than the humidity ratio $\omega_{in}$. Although FIG. 5 is shown as having one atomizer 5200, in other embodiments, the processor system 5100 can have any suitable number of atomizers 5200. In this instance, the housing 5110 and the atomizers 5200 can be collectively configured to sequentially mix the inlet gas $G_{in}$ with atomized flow produced by each atomizer 5200 in series (i.e., at a different time and/or a different spatial location within the flow path 5134) such that the humidity ratio $\omega$ increases as the gas solution mixture flows past each successive atomizer 5200. In this manner, the inlet solution $S_{in}$ can be mixed with and/or atomized into the inlet gas $G_{in}$ flow to produce a mixture having a desired humidity ratio that is subsequently conveyed into the separator 5300, as described below.

The separator 5300 is fluidically coupled to the outlet portion 5135 of the housing 5110 such that the separator 5300 receives the mixture of the gas and solution from the outlet portion 5135 as indicated in FIG. 5 by arrow EEE. The separator 5300, which has a first outlet portion 5331 and a second outlet portion 5332, is configured to produce a first outlet flow and a second outlet flow. More particularly, the first outlet flow includes a portion of the gas $G_{in}$ and a vaporized portion VAP of the solvent. The second outlet flow includes a liquid portion LIQ of the solvent and the solute WASTE (i.e., the solid waste) from the solution. As shown in FIG. 5, the first outlet flow, including a portion of the gas $G_{in}$ and the vaporized portion VAP of the solvent, can be conveyed, via the first outlet portion 5331, to any suitable condenser (not shown in FIG. 5) as shown by the arrow FFF. The second outlet flow, including the liquid portion LIQ of the solvent and the solute WASTE, can be conveyed, via the second outlet portion 5332, to a volume substantially outside the system, as indicated by arrow GGG. In this manner, the separator 5300 separates the solute from the solution. Similarly stated, in embodiments in which the solution is seawater, the separator 5300 separates the salt and/or total dissolved solids from the water, thereby producing a substantially purified water vapor. The separator 5300 can use any suitable mechanism for separating the solute from the solution, such as a tortuous path, a filter, a rotating member, an electrically charged member and/or the like.

Figure 6:
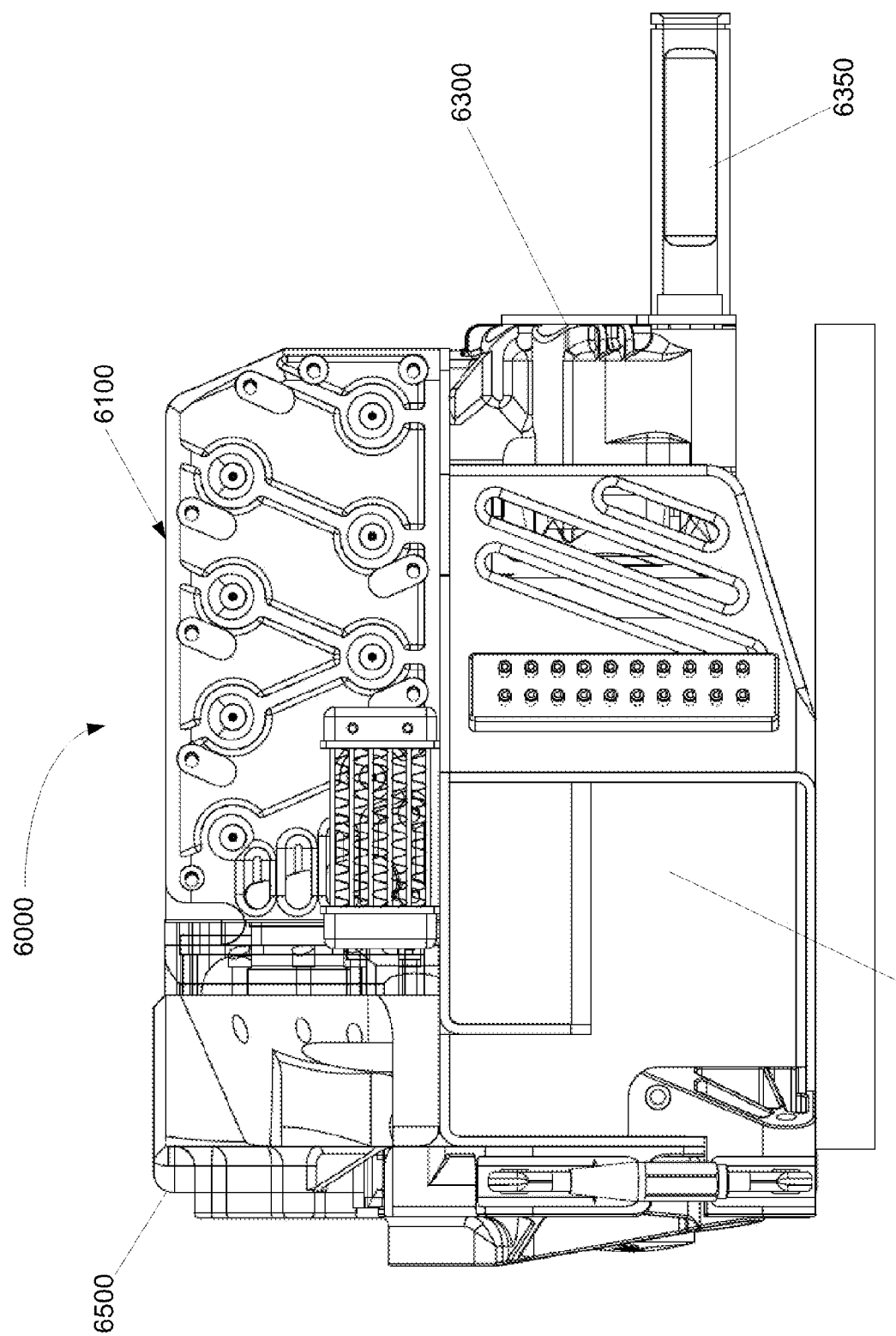
FIG. 6 is a right side view of a water desalinization system according to an embodiment.
Figure 7:
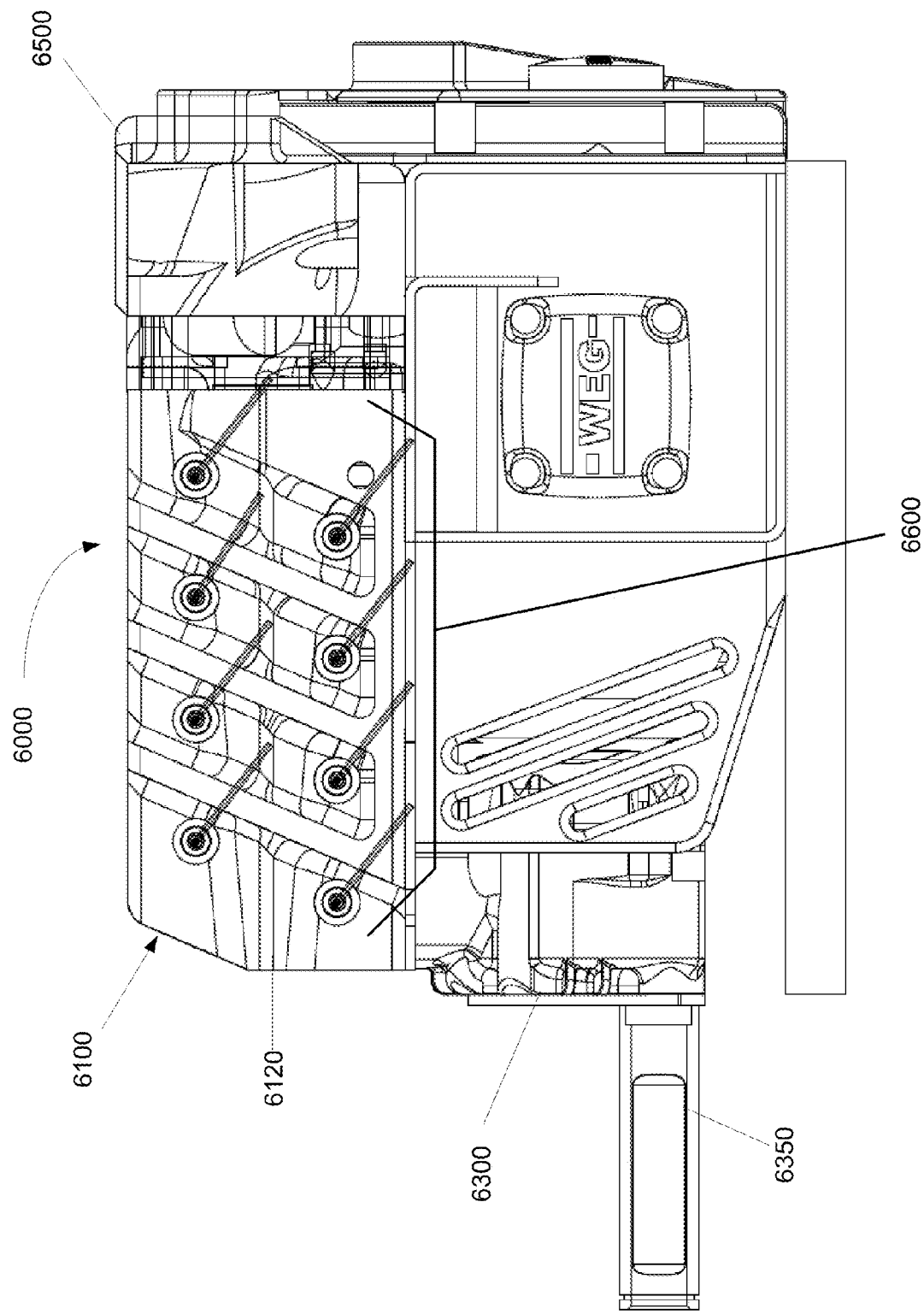
FIG. 7 is a left side view of the water desalinization system of FIG. 6.

FIGS. 6-9 are views of a water desalinization system 6000 according to an embodiment. FIGS. 6 and 7 are a right side view and a left side view, respectively, of the water desalinization system 6000 that includes a processor 6100, a separator 6300, a condenser assembly (not shown in FIGS. 6 through 9), an air processing subsystem 6500, a water inlet assembly 6600, and a control assembly (not shown in FIGS. 6 through 9). As described in more detail herein, the system 6000 is configured to receive an inlet flow of a solution containing a solute (e.g., seawater) and produce a flow of water substantially free of the solute (e.g., desalinated water, or water that is free of dissolved solids). In particular, inlet seawater and inlet air are mixed by the processor 6100 to form a mixture of air, water vapor and concentrated brine solution. The mixture is then conveyed to the separator 6300 to produce a gaseous flow of water vapor (i.e., substantially saturated air) and a flow of waste products, including the solute, dissolved solids, and/or brine. The water vapor is condensed within the condenser assembly (not shown in FIGS. 6 through 9) to produce a flow of water substantially free of the solute desalinated water. The waste products (e.g., the brine) is discharged in near solid form for disposal.

Figure 8:
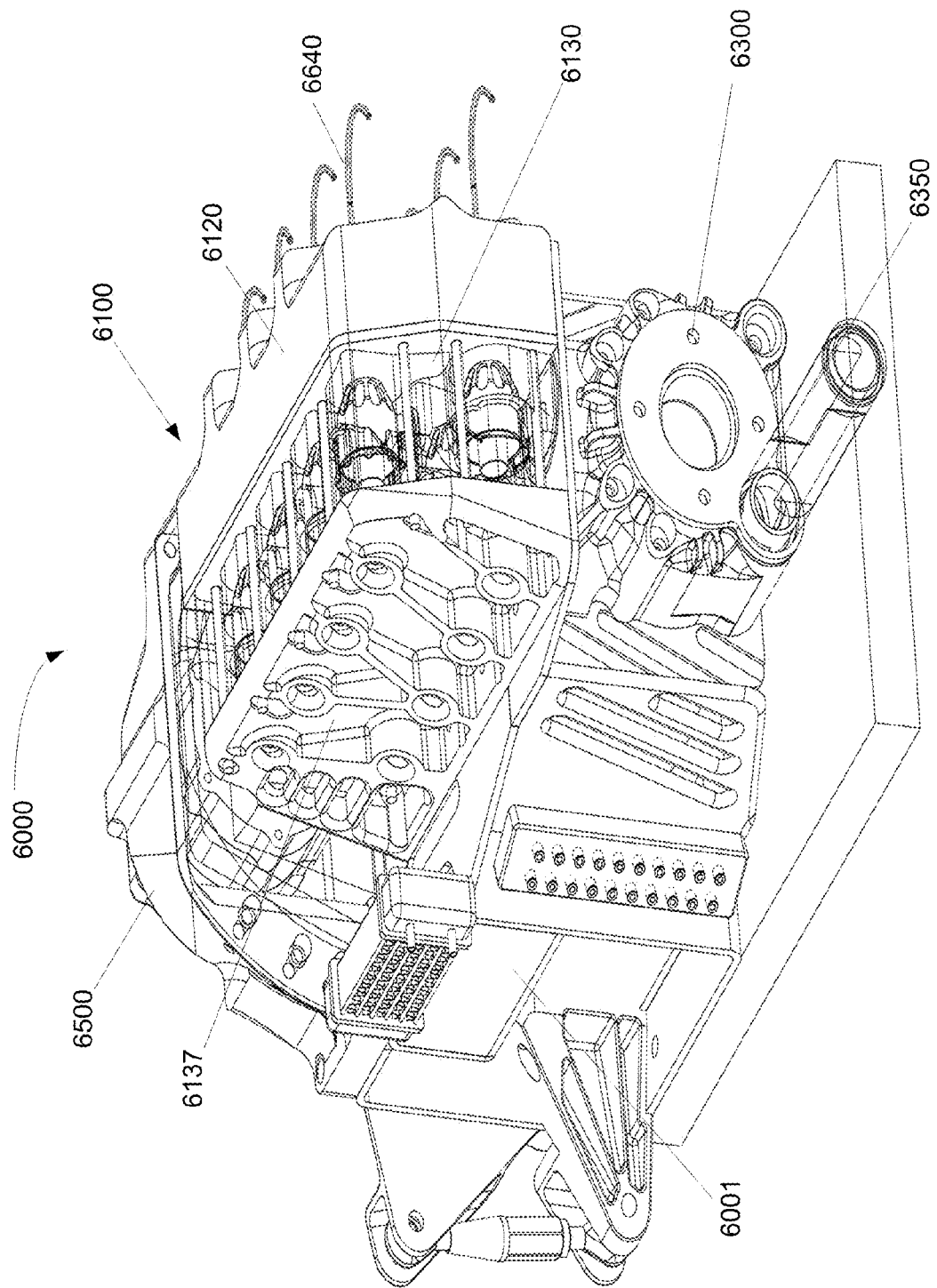
FIG. 8 is a front perspective view of the water desalinization system of FIG. 6.
Figure 9:
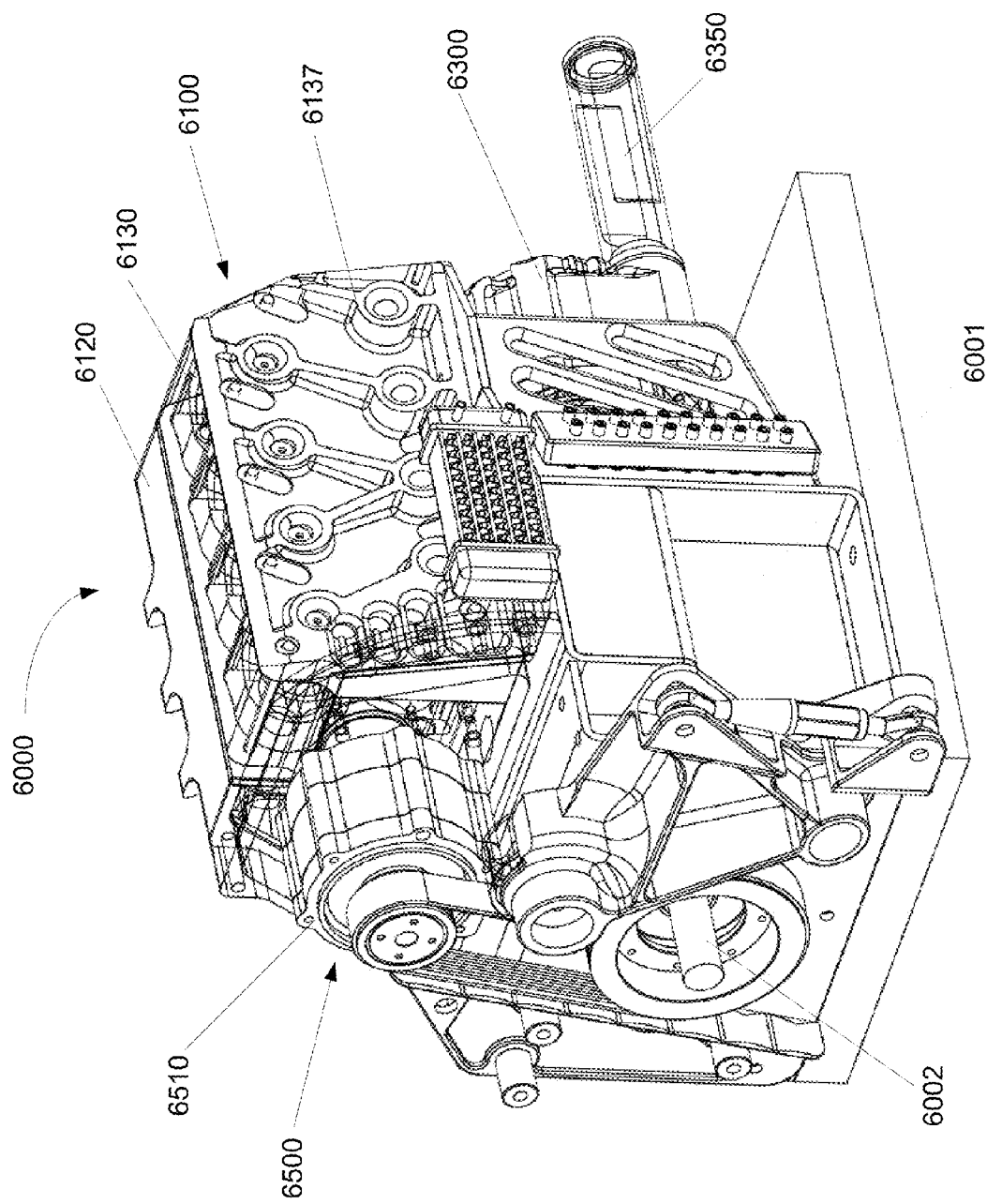
FIG. 9 is a rear perspective view of the water desalinization system of FIG. 6.
Figure 10:
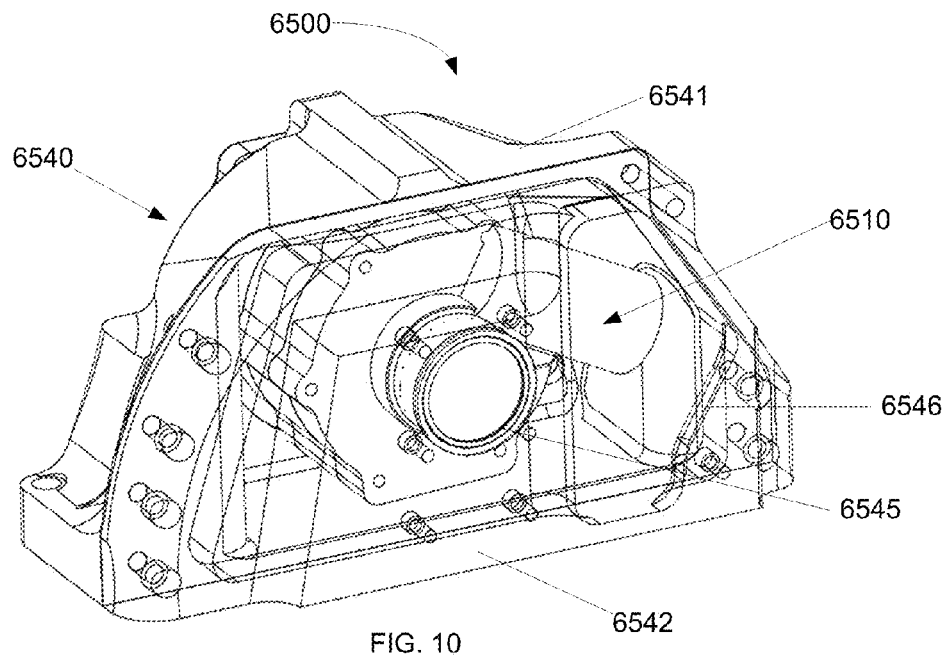
FIG. 10 is a front perspective view of an air processing subsystem according to the embodiment of FIG. 6.

The desalinization system 6000 is coupled to a frame 6001 (FIG. 8) configured to provide support to the system 6000. The frame 6001, as shown in FIGS. 8 and 9, encloses, at least partially, a motor (not shown) such that a drive shaft 6002 extends from the rear of the frame 6001. The drive shaft 6002 is coupled to a pulley configured to form a belt drive for an air pump 6510, as shown in FIG. 9. Certain components of the desalinization system 6000, such as, for example, the housing 6540, are not shown in FIG. 9 to more clearly show the components of the frame 6001 and/or the mounting assembly of the system. The frame 6001 can contain various protrusions, tensioners, extrusions, and/or bolt-on components, which are not described in detail herein, to facilitate the interaction and/or interconnection of the components of the desalinization system 6000 as described herein. Furthermore, any existing shape, size, form, material, and/or the like can be modified to tune the system. The use of the word "tune" used herein relates to the changing of system parameters such that a desired effect is achieved in the functioning, appearance, weight, efficiency, and/or the like. For example, the shape, size, and position of the tensioner can be modified, resulting in overall weight reduction of the system, thereby increasing portability.

Figure 11:
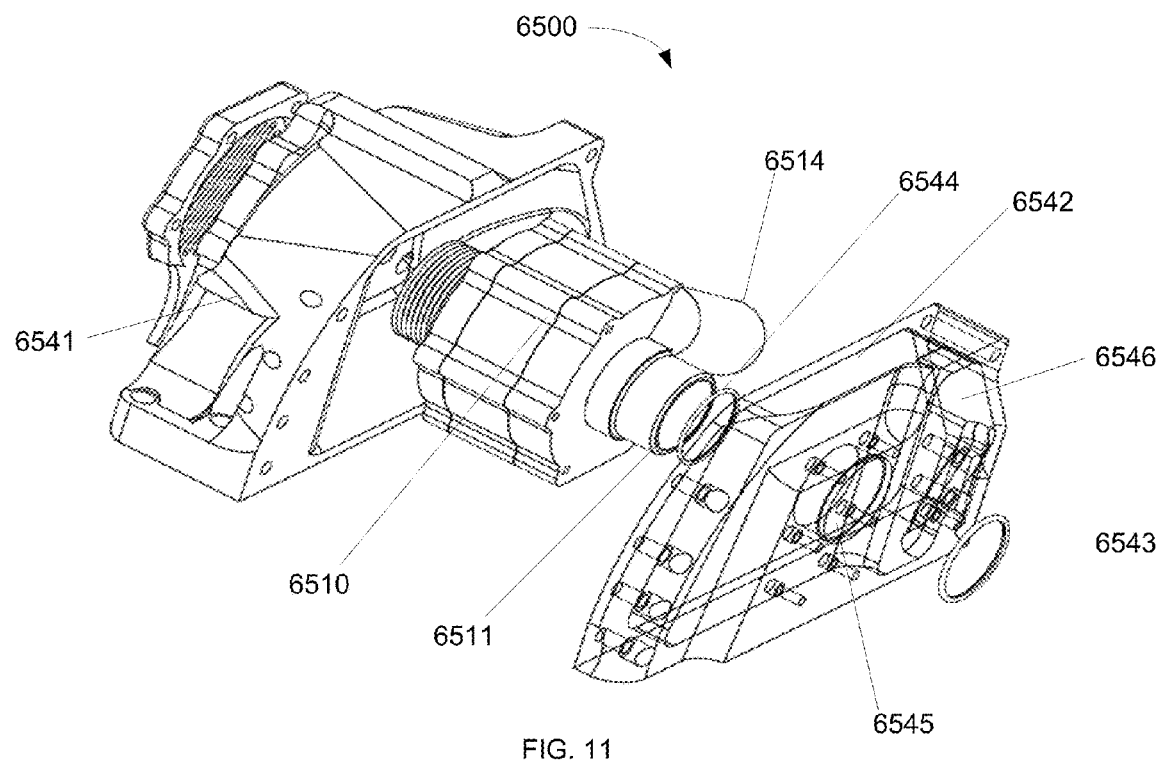
FIG. 11 is an exploded view of the air processing subsystem of FIG. 10.
Figure 12:
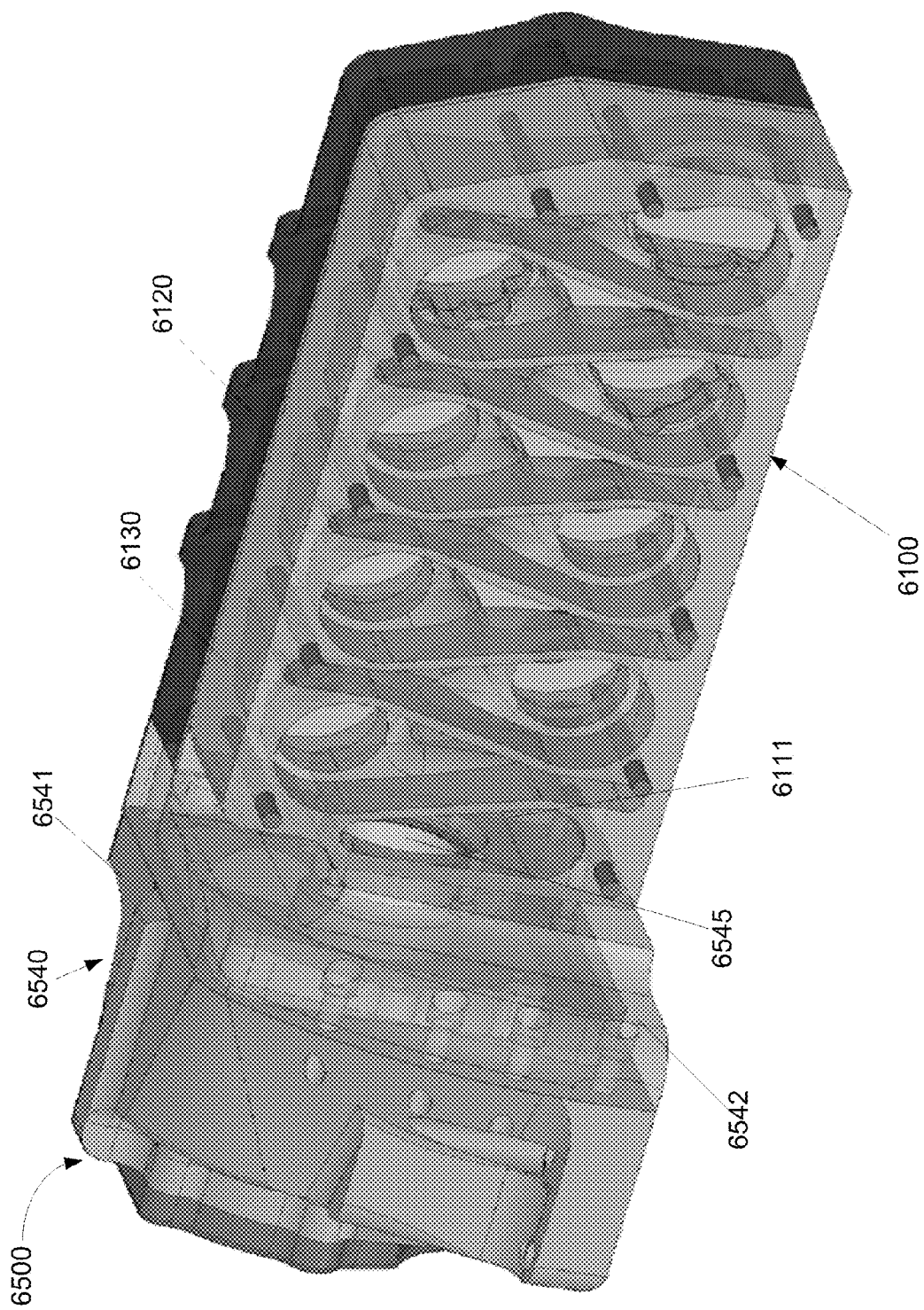
FIG. 12 is a front perspective view of a portion of the water desalinization system of FIG. 6.

The air processing subsystem 6500 is configured to circulate air within the water desalinization system 6000. The air processing subsystem 6500 includes the air pump 6510 and a housing 6540. The housing 6540 includes a back section 6541 and a front section 6542, and encases, at least partially, the air pump 6510, as shown in FIGS. 11 and 12. The front section 6542 of the housing 6540 includes an inlet portion 6545 and an outlet portion 6546. The motor used to drive the air pump 6510 can be any suitable motor. For example, the motor can be various sizes with differing power outputs.

Figure 13:
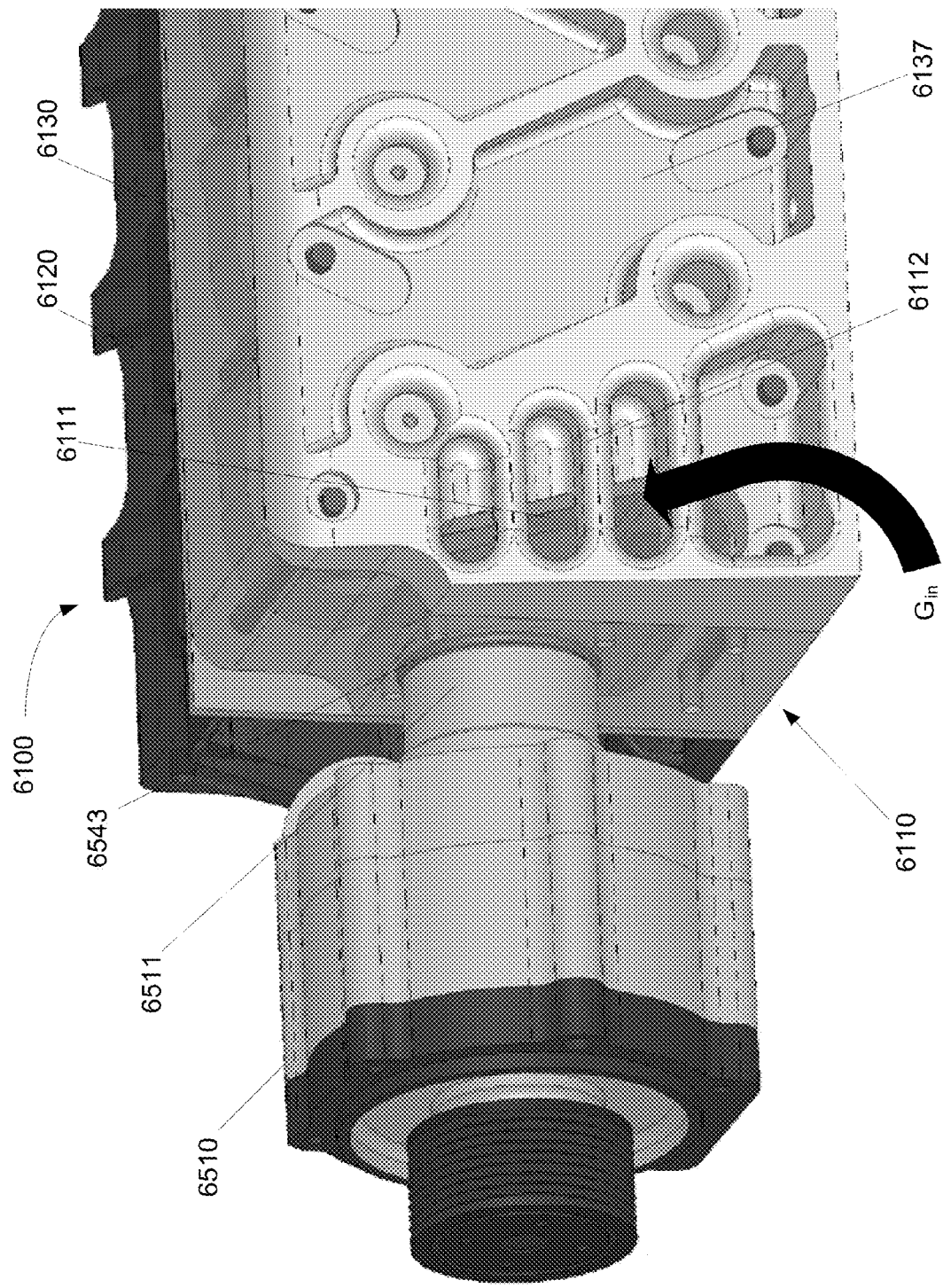
FIG. 13 is rear perspective view of a portion of the water desalinization system of FIG. 6.

The air pump 6510, as shown in FIGS. 11 and 13, includes an inlet portion 6511 and an outlet portion 6514, and is coupled within the back section 6541 and front section 6542 of the housing 6540. The air pump 6510 can be any suitable air pump that produces the desired pressure and flow for the desalinization system 6000. In some embodiments, the air pump 6510 is a Rotex C30-74 supercharger that is driven by the motor, as mentioned above. Furthermore, the air pump

6510 can produce a flow rate between 30 cubic feet per minute and 3000 cubic feet per minute and a pressure between 3 p.s.i. and 10 p.s.i.

More particularly, the air pump 6510 is mechanically fastened (e.g., using bolting hardware) to the housing 6540. An O-ring 6544 is used to form an airtight seal between the inlet portion 6511 of the air pump 6510 and the front side 6542 of the housing 6540. Similarly, the housing 6540, is coupled to the processor 6100 using mechanical fasteners and an O-ring 6543 is used to form an air-tight seal between the air processing subsystem 6500 and the processor 6100, as shown in FIG. 11. The air processing subsystem 6500 is coupled to the processor 6100 such that the inlet portion 6545 of the housing 6540 is adjacent to an inlet portion 6111 of the processor 6100. As described in more detail below, the processor 6100 includes a housing 6110 that defines a set of inlet openings 6112. The air pump 6510 is configured to draw a portion of air $G_{in}$, shown in FIG. 13, through the set of openings 6112 and convey the air $G_{in}$ to portions of the processor 6100, as described in detail herein.

Figure 14:
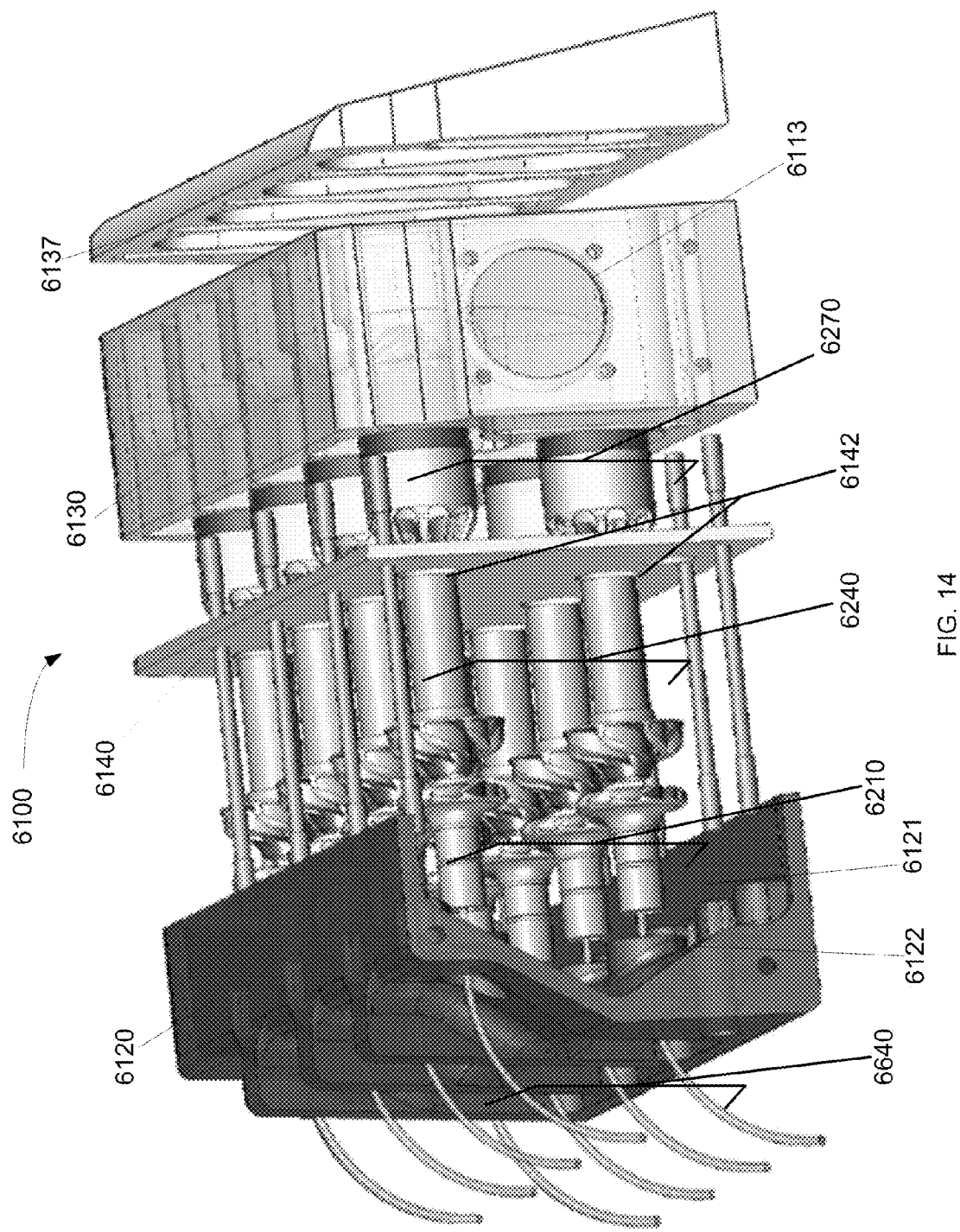
FIG. 14 is an exploded view of a processor system according to the embodiment of FIG. 6.
Figure 15:
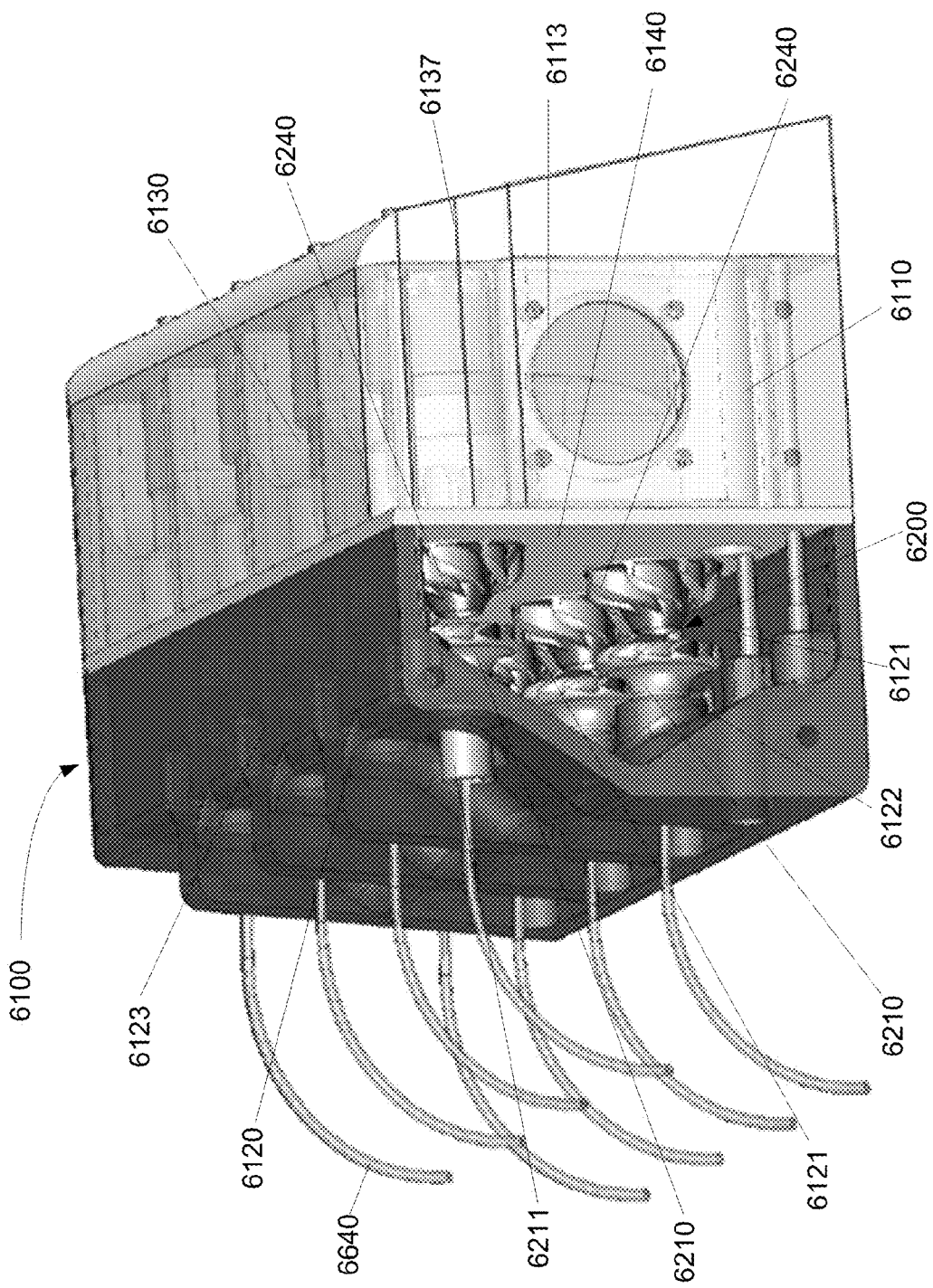
FIG. 15 is a perspective view of the processor system of FIG. 14.
Figure 18:
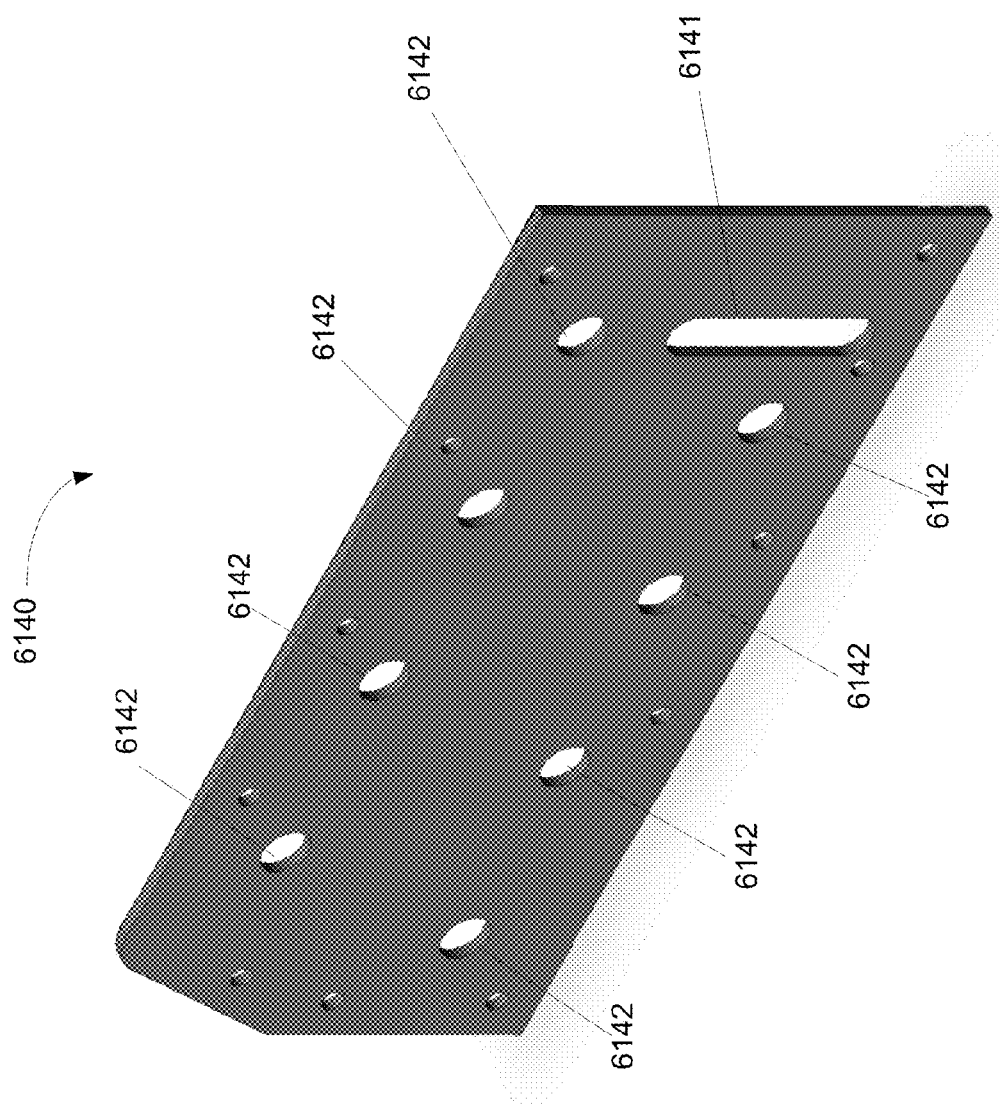
FIG. 18 is a perspective view of a bulkhead included in the processor system of FIG. 14.
Figure 19:
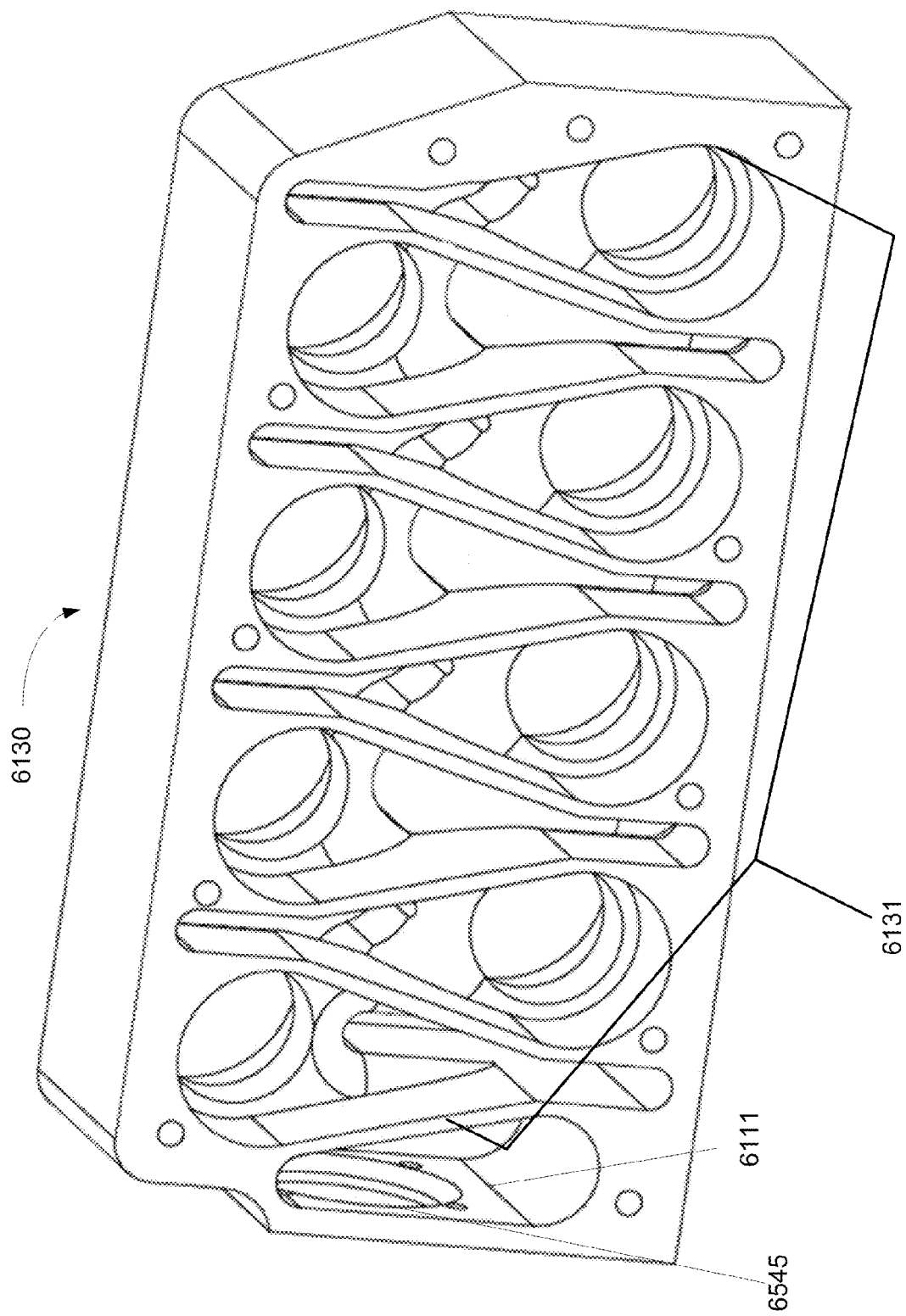
FIG. 19 is a perspective view of a second portion of a housing according to the processor system of FIG. 14.

The processor 6100 includes the housing 6110, a series of atomizers 6200 (also referred to as atomizer assemblies) and a series of vaporizers 6270, as shown in FIG. 14. The housing 6110 includes a first portion 6120, a second portion 6130, and a bulkhead 6140 disposed between the first portion 6120 and the second portion 6130. As shown in FIGS. 14 and 15, the first portion 6120 defines an interior volume 6121 between an exterior wall 6123 and the bulkhead 6140. Additionally, the exterior wall 6123 and the bulkhead 6140 collectively form an inlet portion 6122 to which the outlet portion 6546 of the air processor subsystem 6500 is coupled. The first portion 6120 of the processor 6100 is configured to house, at least partially within the interior volume 6121, the series of atomizers 6200. In particular, as shown in FIG. 18, the bulkhead 6140 defines a set of openings 6142 within which the nozzle portion 6240 of each atomizers 6200 is mounted. Although shown in FIGS. 14 and 15 as including eight atomizers 6200, in other embodiments the processor 6100 can include more or less than eight atomizers 6200.

Figure 20:
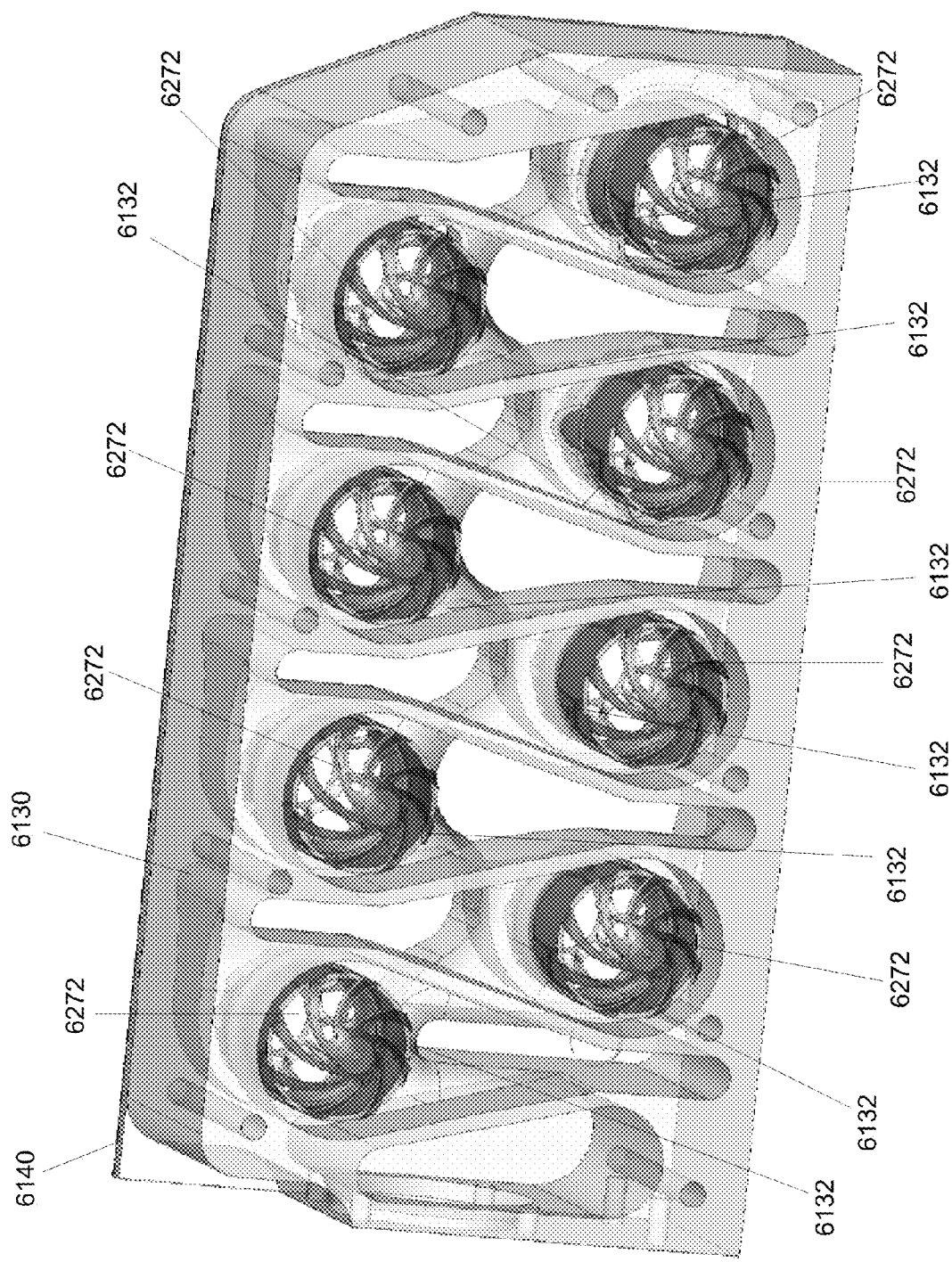
FIG. 20 is a right side of the second portion of the housing and a set of vaporizers according to the processor system of FIG. 14.
Figure 21:
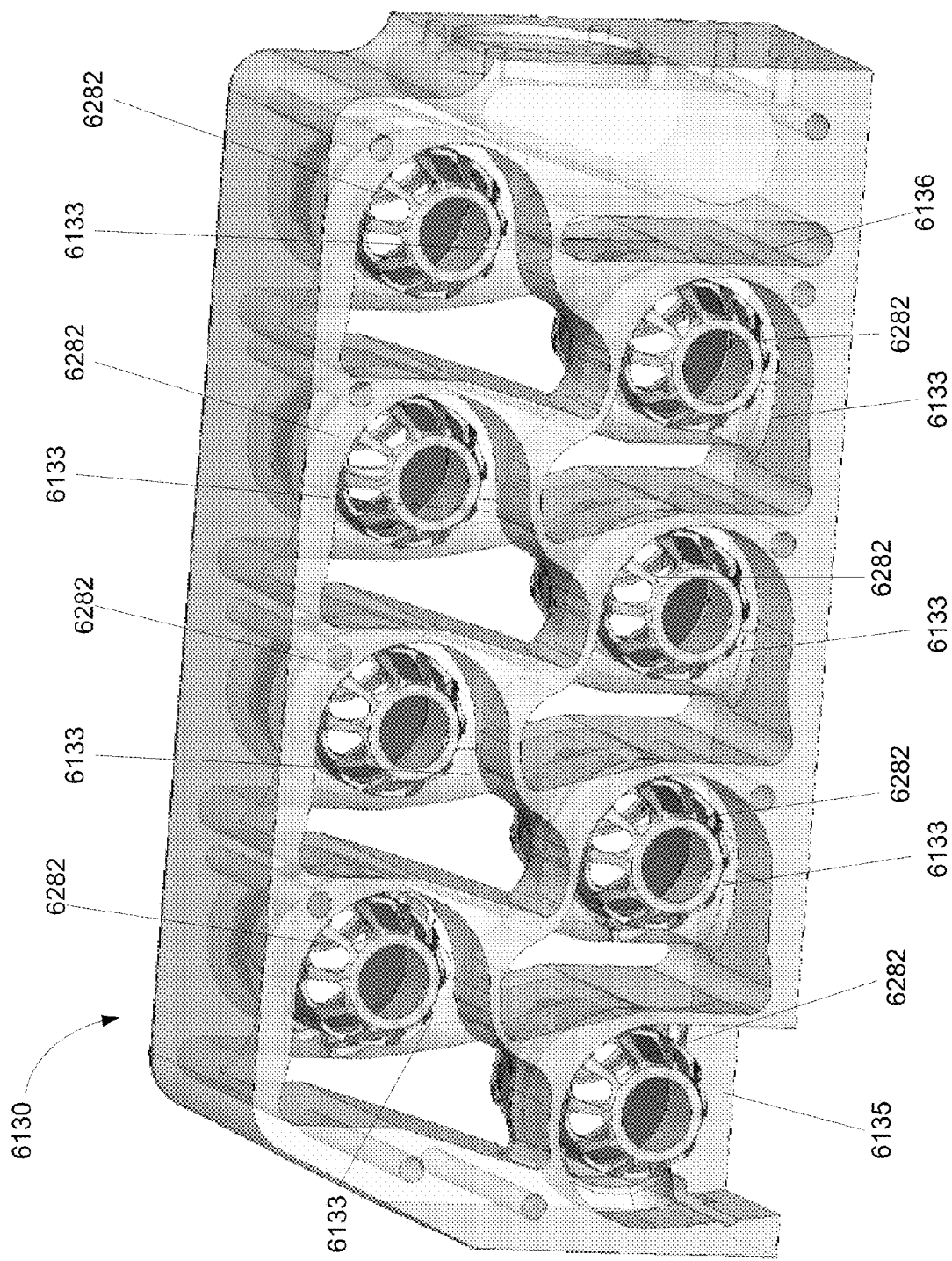
FIG. 21 is a left side of the second portion of the housing and a set of vaporizers according to the processor system of FIG. 14.
Figure 22:
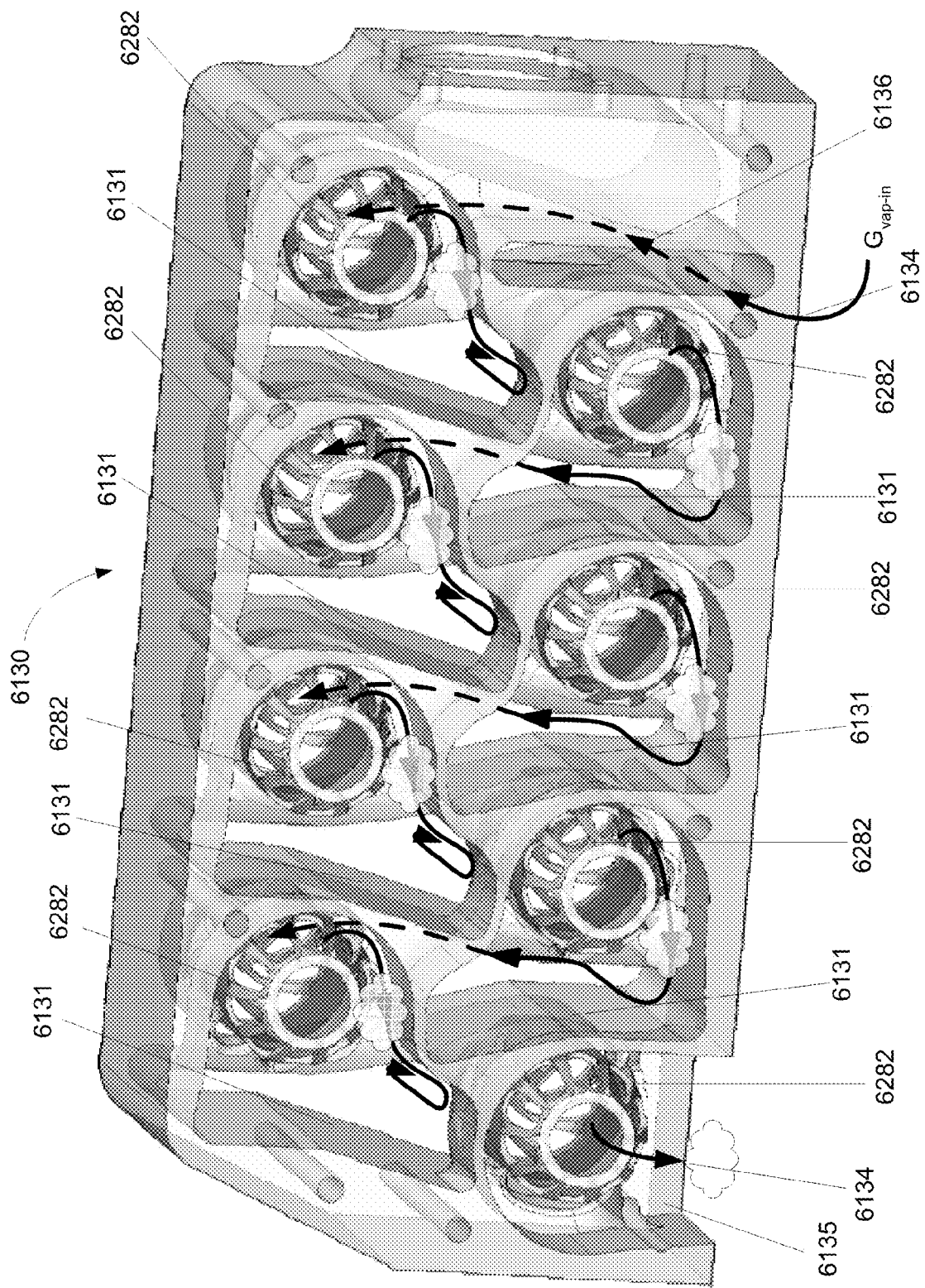
FIG. 22 is a left side view of the second portion of the housing showing a flow path defined by the second portion of the housing according to the processor system of FIG. 14.

The second portion 6130 of the processor 6100 includes a series of interior walls 6131 (see FIGS. 19-22) and a cover 6137, as shown in FIGS. 14 and 15. As shown in FIGS. 21 and 22, the second portion 6130 further defines an inlet opening 6136 and an outlet opening 6135. The second portion 6130 of the processor 6100 is configured to house at least a portion of the atomizers 6200 (e.g., the nozzle portion 6240) and the vaporizers 6270. More particularly, the interior walls 6131 define a first interior volume 6132 around the inlet portion 6272 of the vaporizers 6270 (see FIG. 20, which shows the second portion 6130 when viewed from the right side of the desalinization system 6000) and a second interior volume 6133 around the outlet portion 6282 of the vaporizers 6270 (see FIG. 21, which shows the second portion 6130 when viewed from the left side of the desalinization system 6000). The interior walls 6131 define a flow path 6134 between the inlet opening 6136 of the second portion 6130, where the air $G_{vap-in}$ enters the second portion 6130 of the processor 6100, and the outlet opening 6135 of the second portion 6130, where the air $G_{vap-out}$ exits the second portion 6130 of the processor 6100 and enters the separator 6300.

Figure 16:
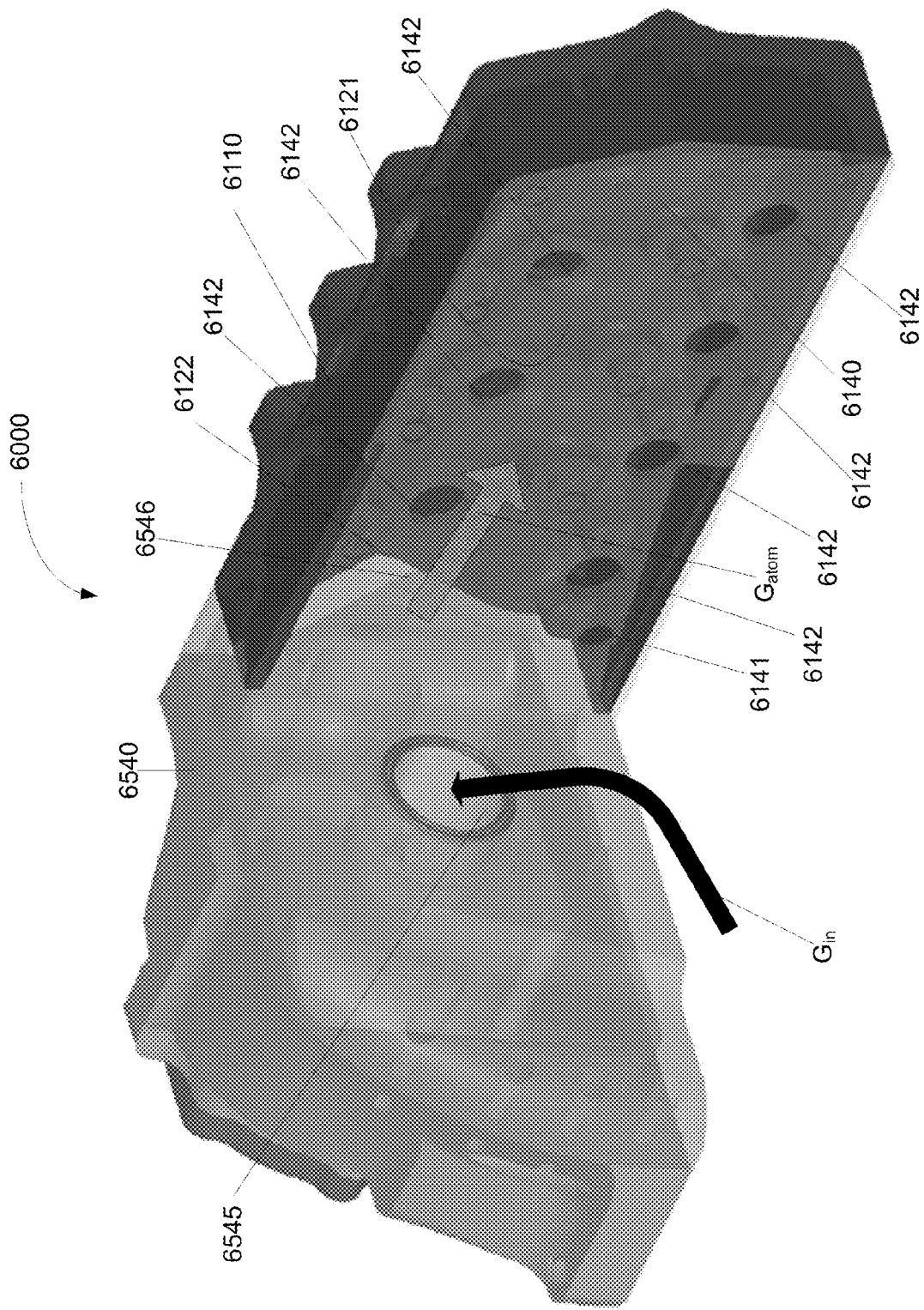
FIG. 16 is a perspective view of a portion of the processor system of FIG. 14.
Figure 17:
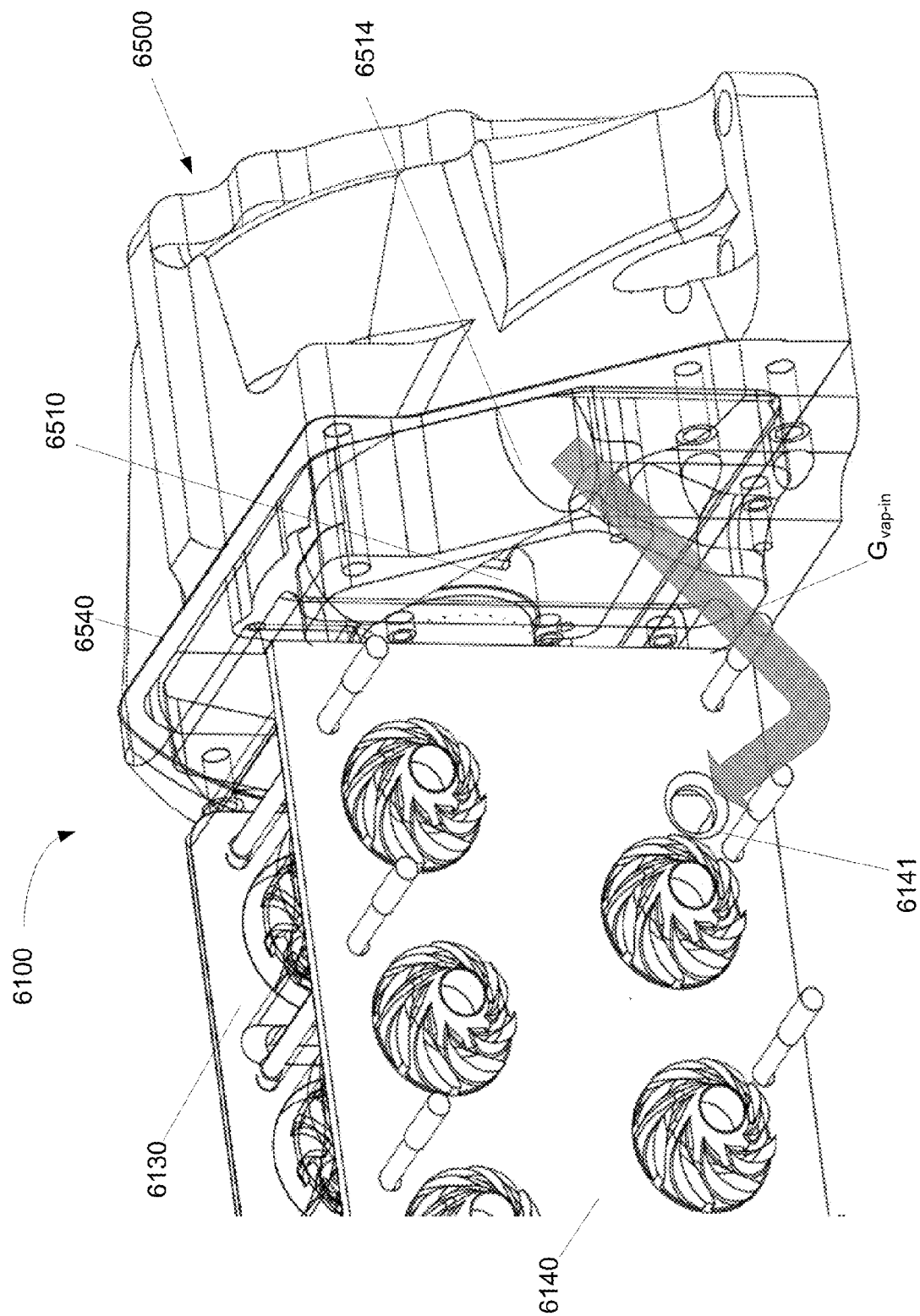
FIG. 17 is a perspective view of a portion of the processor system of FIG. 14.

In use, the inlet air $G_{in}$ enters the air blower 6510 and, upon exiting the air blower 6510, enters the first portion 6120 of the processor 6100 through the inlet opening 6122 (FIG. 15). The air $G_{in}$ can be delivered to the first portion 6120 at any suitable pressure, such as, for example, within the range of 3 p.s.i. and 10 p.s.i., and any suitable flow rate, such as, for example, within the range of 30 cubic feet per minute and 3000 cubic feet per minute. When the inlet air $G_{in}$ enters the inlet opening 6122 a first portion of the air $G_{atom}$ (see e.g., FIG. 16) flows within the interior volume 6121 defined by the first portion 6120 of the processor 6100. A second portion of the air $G_{vap-in}$ enters the second portion 6130 of the processor through a flow opening 6141 in the bulkhead 6140, as shown in FIG. 17. In this manner, the inlet air $G_{in}$ flows in parallel to the atomizers 6200 and the vaporizers 6270.

The characteristics (i.e., flow rate, pressure, volume, etc.) of the portion of the flow of air $G_{atom}$ within the first portion 6120 and the flow of air $G_{vap-in}$ within the second portion 6130 can be controlled by modifying the flow opening 6141 in the bulkhead 6140. For example, FIG. 18 shows the bulkhead 6140 defining a flow opening 6141 the is substantially oblong. Similarly stated, the flow opening 6141 is configured to be a slot in the bulkhead 6140, thereby allowing more air $G_{vap-in}$ to flow into the second portion 6130 of the processor 6100. Furthermore, the flow characteristics can be modified by the edges and/or contour of the flow opening 6141. For example, the edges and/or contour defined by flow opening 6141 can be rounded or beveled as shown in FIG. 17, thus producing a more laminar or uniform flow through the flow opening 6141. As shown in FIG. 18, the edges and/or contour defined by the flow opening 6141 can be substantially non-rounded producing a more turbulent flow through the flow opening 6141.

As shown in FIG. 22, the interior walls 6131 of the second portion 6130 define the flow path 6134 such that air $G_{vap-in}$ flows from the inlet opening 6136 to the inlet portion 6272 of the first vaporizer 6270. The air $G_{vap-in}$ then flows within the flow path 6134 through the first vaporizer 6270 and exits via the outlet portion 6282 of the first vaporizer 6270. As described in more detail below, the vaporizer 6270 receives the inlet air $G_{vap-in}$, having an initial humidity ratio of $\omega_{in}$ via the inlet portion 6272. The inlet gas $G_{vap-in}$ is mixed with the atomized solution $S_1$ produced by the first atomizer 6200 to produce a mixture $G_1$ of the gas $G_{vap-in}$ and the atomized solution $S_1$, having a humidity ratio $\omega_1$ that is greater than the initial humidity ratio $\omega_{in}$. Thus, as the air travels through the vaporizers, the humidity ratio of the air (i.e., the amount of water content in the air) is sequentially increased. The interior walls 6131 are configured such that the gas then flows within the flow path 6134 to the inlet portion 6272 of the next vaporizer 6270. The interior walls 6131 are configured such that the gas flows within the flow path 6134 through the second portion 6130 of the processor 6100 until reaching the outlet opening 6135, as shown in FIG. 22. The characteristics of the fluid within the flow path 6134 and the processes performed on the fluid are described in more detail herein.

Figure 24:
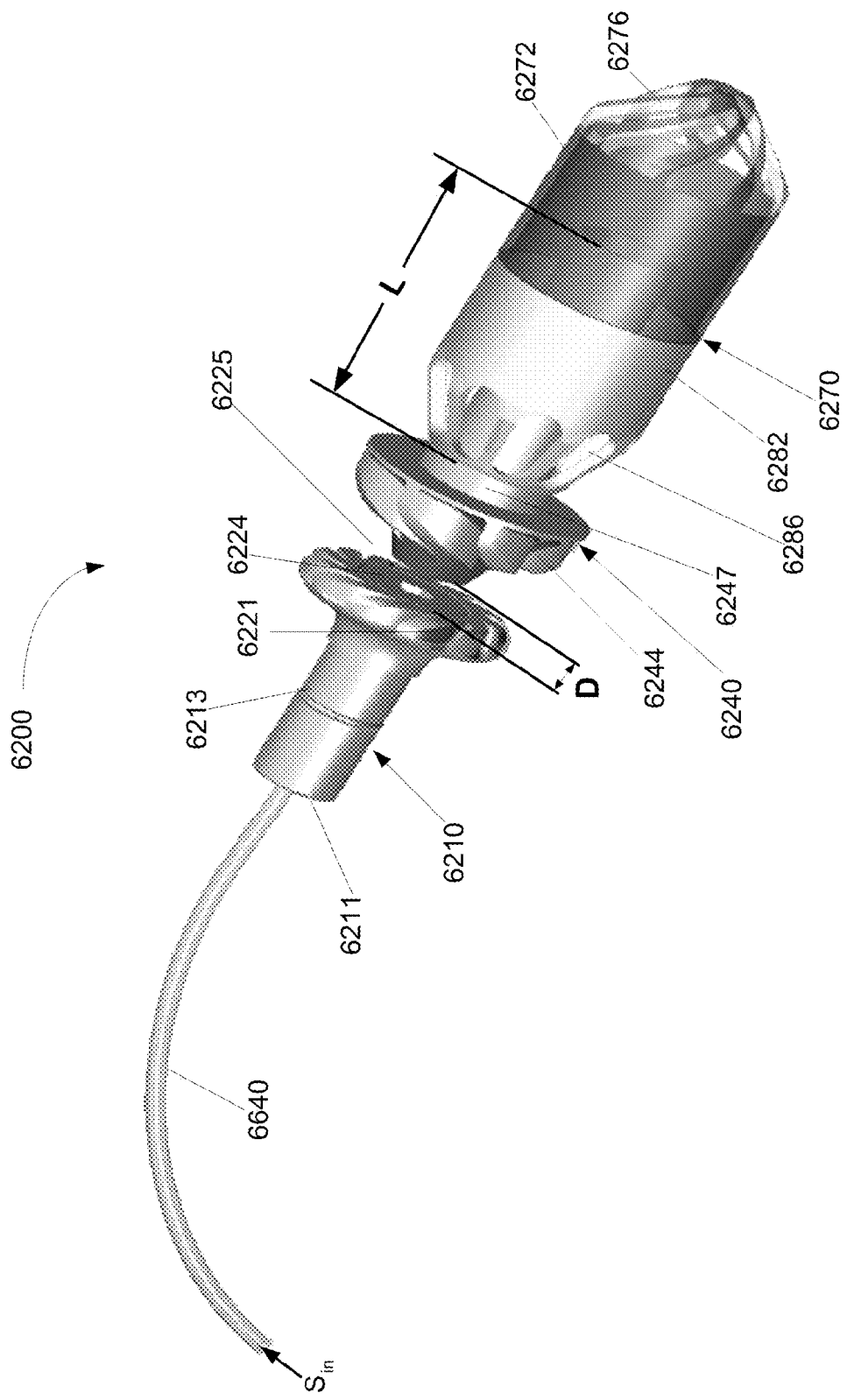
FIG. 24 is a perspective view of an atomizer and a vaporizer of the processor system of FIG. 14.
Figure 25:
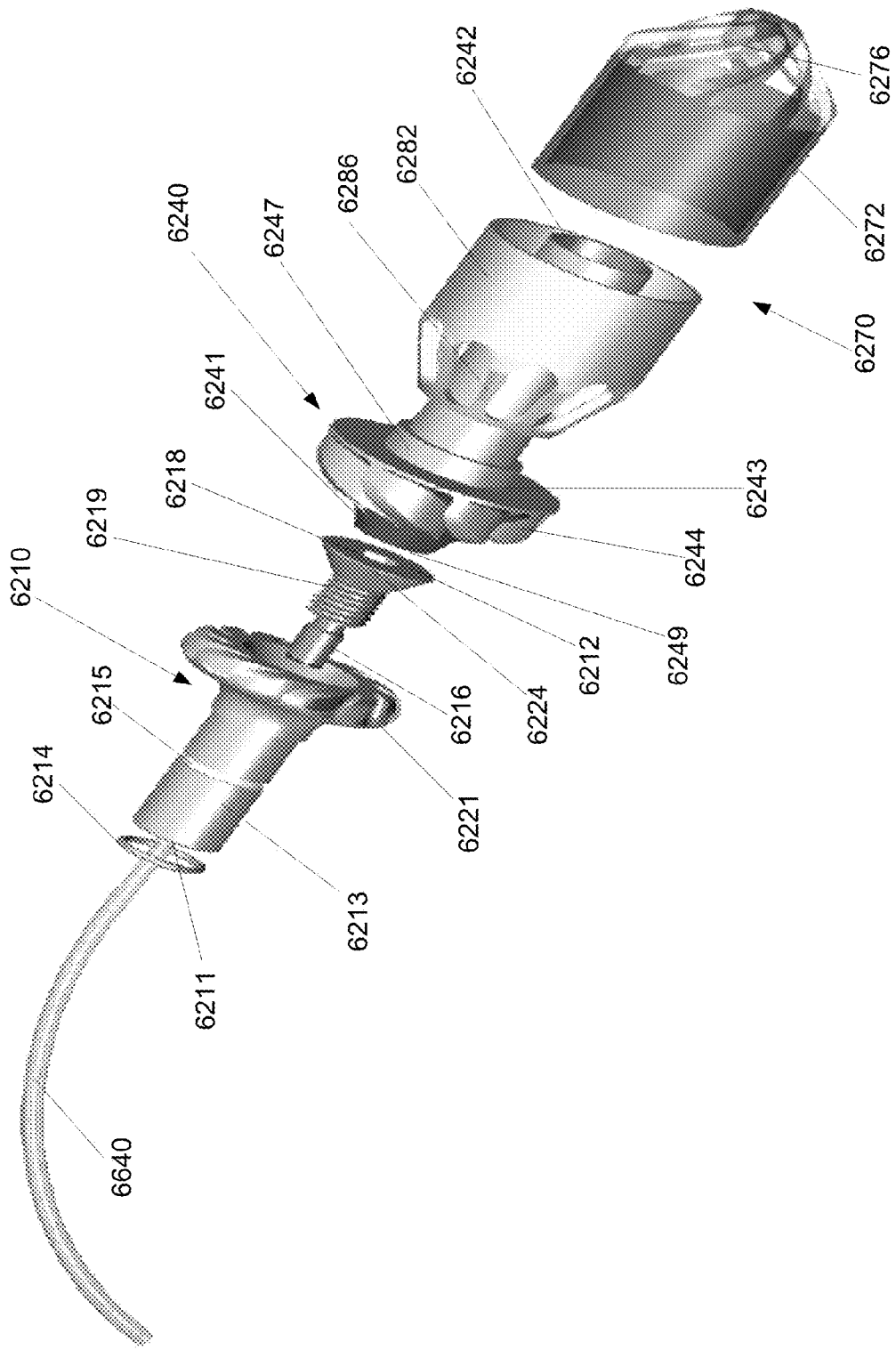
FIG. 25 is an exploded view of the atomizer and the vaporizer of FIG. 24.
Figure 29:
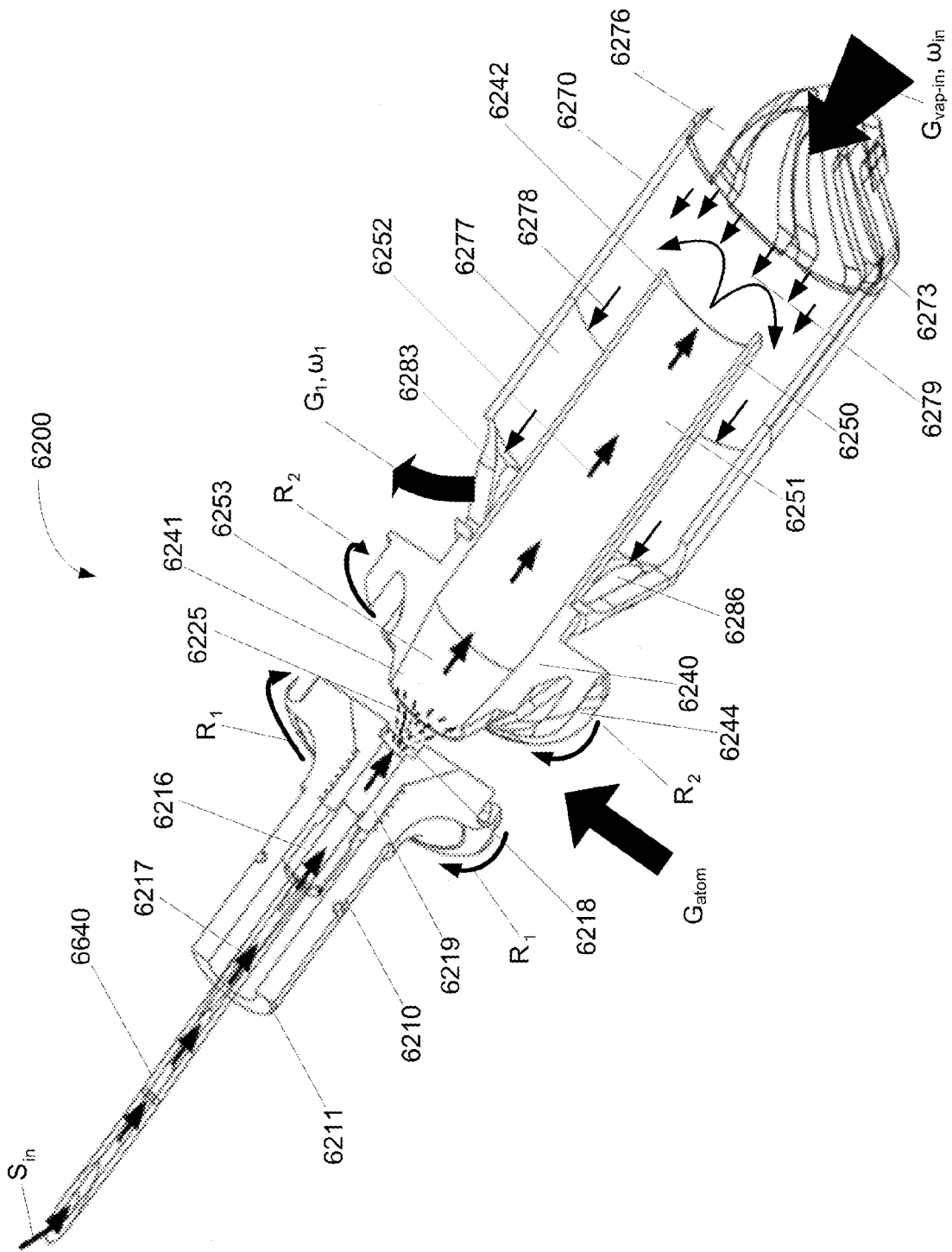
FIG. 29 is a cross-sectional of the atomizer and the vaporizer of FIG. 24.
Figure 30:
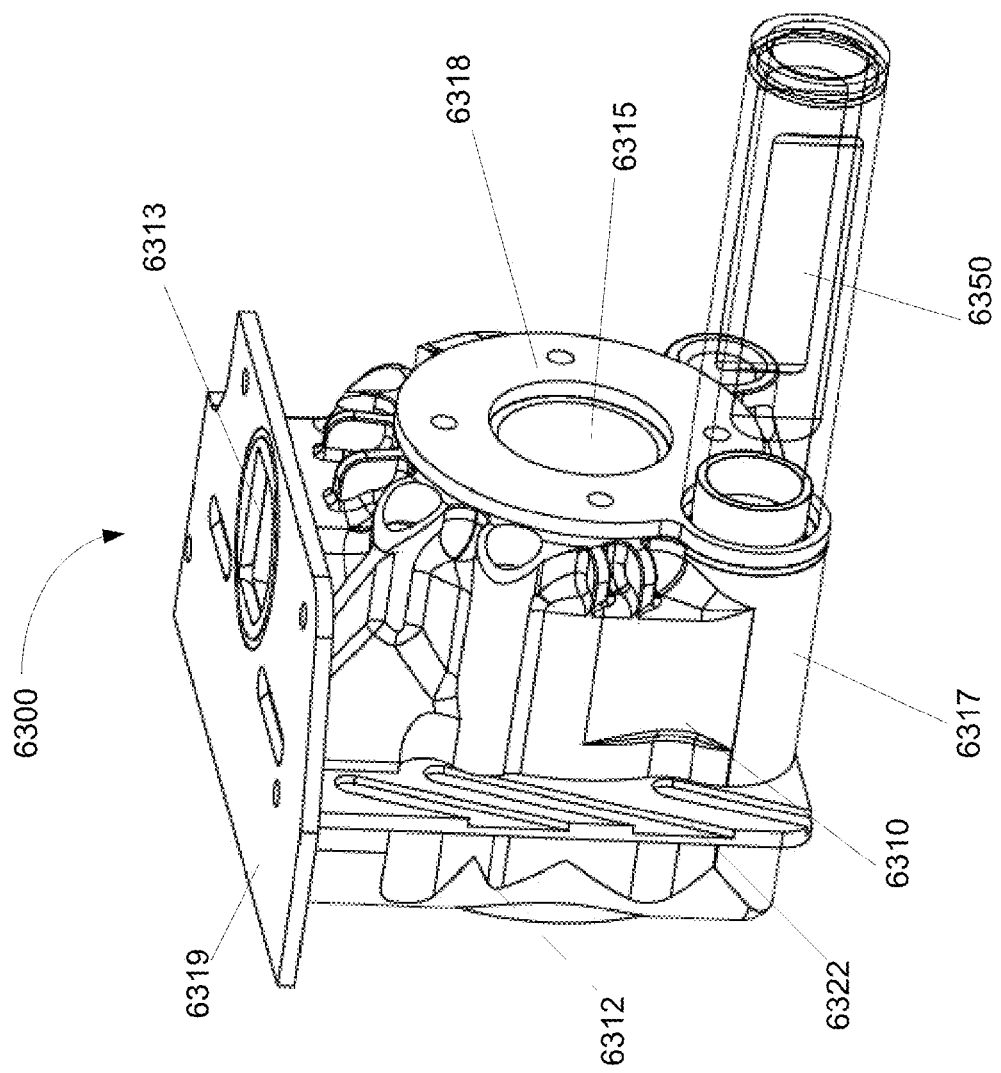
FIG. 30 is a perspective view of a separator of the water desalinization system of FIG. 6.

Each atomizer 6200 includes the injector portion 6210 and the nozzle portion 6240, as mentioned above. As shown in FIGS. 24, 25 and 29, the injector portion 6210 includes a first end portion 6211 and a second end portion 6212. The first end portion 6211 is configured to extend through and/or be accessible through the exterior wall 6123 of the housing 6110 (best shown in FIG. 15) to couple a supply line 6640 to the injector portion 6210 via the inlet line coupling 6216. The first end portion 6211 includes an outer surface 6213 that defines a sealing groove 6215. A sealing member 6214 (e.g., an O-ring) is configured to fit into the sealing groove 6215 to produce a substantially fluid-tight and/or hermetic seal with the exterior wall 6123 of the housing 6110. The injector portion 6210 of each atomizer 6200 is configured to receive the inlet flow of the solution $S_{in}$ via the supply line 6640, as mentioned above. The inlet flow of solution $S_{in}$ can be conveyed to the atomizers 6200 via any suitable mechanism, such as, for example, the methods described above in the water desalinization system 1000. The solution $S_{in}$ can be any suitable solution of a solvent containing a solute. For example, the solution can be a solution of water (the solvent) and salt, dissolved solids or the like (the solute). Similarly stated, in some embodiments, the solution can be seawater, brackish water or the like.

The second end portion 6212 of the injector portion 6210 is configured to receive and be coupled to an injector insert 6219. More particularly, the injector insert 6219 is disposed within the second end portion 6212 using a threaded coupling. The outer surface 6213 at the second end portion 6212 defines a set of helical grooves 6221, as shown in FIGS. 24 and 25. The helical grooves 6221 are configured to produce a rotational velocity component when the air $G_{atom}$ flows into the atomizer 6200, as described in more detail herein. The injector portion 6210 is disposed within the first portion 6120 of the housing 6110 such that the second end portion 6212 of the injector 6210 is spaced apart from a first end portion 6241 of the nozzle 6240 by a distance D. The distance D produces a first mixing volume 6225, as shown in FIG. 29, within which the inlet air $G_{atom}$ aids in the atomization of the solution $S_{in}$, as described herein. Expanding further, the distance D can be increased by modifying the placement of the injector 6210 in the housing 6110. Therefore, the concentration of the atomized solution $S_{in}$ per volume of the air $G_{atom}$ that enters the nozzle 6240 can be adjusted by adjusting the distance D between the injector 6210 and the nozzle 6240. For example, the distance D can be increased such that a lower concentration of the solution $S_{in}$ per volume of the air $G_{atom}$ enters the nozzle 6240.

The injector insert 6219 defines an end surface 6224 with a solution outlet orifice 6218 substantially in the center. The end surface 6224 is substantially flat and the solution outlet orifice 6218 is an extrusion (i.e., removal of material). The shape of the solution outlet orifice 6218 can be any suitable shape such that the solution outlet orifice 6218 can reduce the solution $S_{in}$ into an atomized flow (i.e., very small particles of the solution $S_{in}$).

The nozzle portion 6240 includes a first end portion 6241 and a second end portion 6242, as shown in FIGS. 25 and 29. The first end portion 6241 includes an end surface 6249 defining an opening configured to receive the atomized portion of the solution $S_{in}$. An outer surface 6243 of the first end portion 6241 of the nozzle portion 6240 defines a set of helical grooves 6244, as shown in FIGS. 24 and 25. The flow of the air $G_{atom}$ is configured to flow within the helical grooves 6244 and into the first mixing volume 6225 such that the helical grooves 6244 impart a rotational velocity component in the flow, as described in more detail herein. The outer surface 6243 also includes a mounting surface 6247 that protrudes from the outer surface 6243 (FIG. 25). The mounting surface 6247 provides a discontinuity in the outer surface 6247 that defines, along with the second end portion 6242, a length L that the second end portion 6242 of the nozzle 6240 protrudes into the vaporizer 6270. Furthermore, the mounting surface 6247 (i.e., the larger diameter) is configured to the fit within the mounting openings 6142 of the bulkhead 6140, as best shown in FIG. 18.

The second end portion 6242 of the nozzle portion 6240 includes an outer surface 6250 and an internal surface 6251. As described in more detail herein, the inner surface 6251 defines a flow path 6252 through which the atomized solution $S_1$ flow from the first mixing volume 6225 to the vaporizer 6270. Although the internal surface 6251 is shown as being tapered such that the nozzle portion 6240 acts as a diverging nozzle (i.e., a nozzle having an increased flow area), in other embodiments, the internal surface 6251 can have any suitable geometry.

Figure 26:
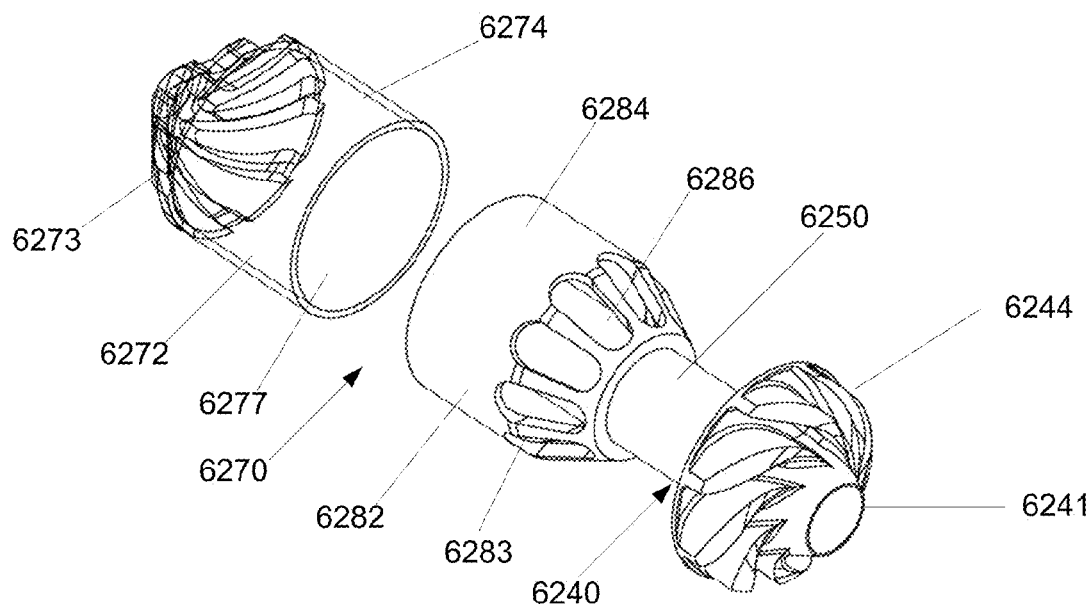
FIG. 26 is a perspective view of a nozzle and the vaporizer of the processor system of FIG. 14.
Figure 27:
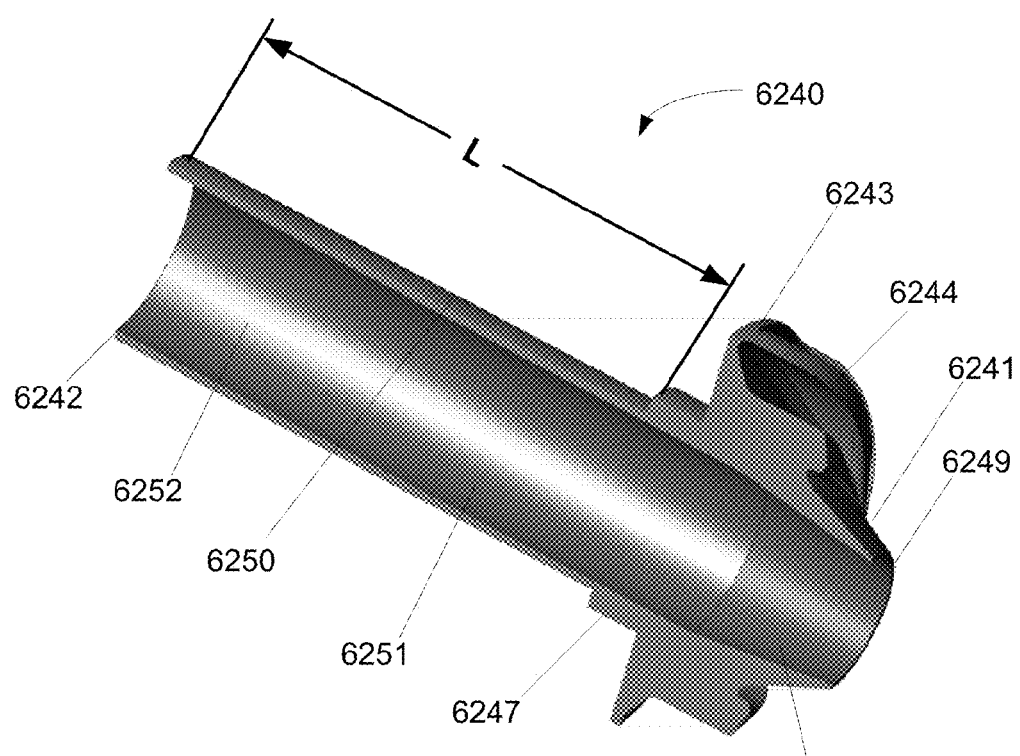
FIG. 27 is a cross-sectional view of the nozzle of FIG. 26.

The vaporizer 6270 includes the inlet portion 6272 and the outlet portion 6282. The outlet portion 6282 is configured to receive a portion of the nozzle 6240 of the atomizer 6200, as shown in FIGS. 25, 26 and 29, and described above. As shown in FIG. 29, a portion of the nozzle 6240 of the atomizer 6200 is disposed at least within the outlet portion 6282 such that the outer surface 6250 of the second end portion 6242 of the nozzle 6240 and the inner surface 6277 of the outlet portion define a flow path 6278. The outlet portion 6282 defines a set of outlet openings 6286 through which the flow exits the vaporizer 6270. The outlet openings 6286, as shown in FIG. 25, are substantially oblong openings, though in other embodiments, the openings can be any shape and or configuration. For example, the outlet openings 6286 could be in a helical configuration, similar to the inlet openings 6276 described below.

The inlet portion 6272 defines a set of inlet openings 6276 that are configured to receive a flow of inlet gas $G_{vap-in}$ therethrough. The helical shape of the inlet openings 6276 is configured to produce a rotational flow through the body of the vaporizer 6270. Moreover, the inlet portion 6272 and the second end portion 6242 of the nozzle 6240 define a second mixing volume 6279 (FIG. 29) within which the inlet gas $G_{vap-in}$ is mixed with the atomized solution $S_1$ from the first mixing volume 6225. The size, length and/or volume of the second mixing volume 6279 is inversely proportional to the length L of the nozzle 6240 protruding into the vaporizer 6270. For example, reducing the distance that the mounting surface 6247 extends from the first end portion 6241 increases the length L of the nozzle 6240 protruding into the vaporizer 6270, thus reducing the size of the second mixing volume 6279.

FIG. 29 is a cross-sectional view of the atomizer 6200 and the vaporizer 6270, and shows the flow of the solution $S_{in}$, the flow of the air $G_{atom}$, and the flow of the air $G_{vap-in}$. As mentioned above, the supply line 6640 is coupled to the injector portion 6210 of the atomizer. The solution $S_{in}$ flows within a liquid flow path 6217 in the supply line 6640 and enters the injector portion 6210 via the inlet line coupling 6216. The solution $S_{in}$ flows within the liquid flow path 6217 and enters the injector insert 6219 where the solution outlet orifice 6218 receives the solution $S_{in}$ and at least partially atomizes the flow as the solution $S_{in}$ exits the injector portion 6210 and enters the first mixing volume 6225. The solution outlet orifice 6218 can define any suitable shape such that the flow of the solution $S_{in}$ is atomized upon exiting. For example, in some embodiments the solution outlet orifice 6218 could create a conical spray of the atomized portion of the solution $S_1$, while in other embodiments, the atomized flow of the solution $S_1$ can be fanned (i.e., a substantially flat and wide flow).

As described above, a portion of the inlet airflow $G_{atom}$ flows within the helical grooves 6244 and into the first mixing volume 6225 such that the helical grooves 6244 impart a rotational velocity component in the flow, as indicated by arrow $R_1$. The air $G_{atom}$ mixes with the atomized portion of the solution $S_1$ in the first mixing volume 6225, such that the air $G_{atom}$ suspends and/or further atomizes the solution $S_1$. Similarly stated, the portion of the solution $S_1$ is reduced to small droplets, a fine spray and/or vapor, and is suspended in the air $G_{atom}$. By mixing the solution $S_1$ with the air $G_{atom}$, the surface area to volume ratio of the solution $S_1$ is increased aiding in mixing and eventual evaporation, as described herein. Expanding further, the rotation of the injector portion 6210 and the nozzle portion 6240 produces a rotational component in the flow of the solution $S_{in}$ and the atomized flow of the solution $S_1$. The rotation of the solution insures a more complete mixture with the air $G_{atom}$, described above, and the air $G_{vap-in}$, as described below.

In this manner, the atomizer 6200 produces a spray including small particles of the solution $S_{in}$. In particular, the atomized portion of the solution $S_{in}$ produced by the solution outlet orifice 6218 of the first atomizer 6200 is identified as $S_1$. Similarly, the atomized portion of the solution $S_{in}$ produced by the solution outlet orifice 6218 of the second atomizer 6200 is identified as $S_2$, and so on throughout the housing 6110 including all the atomizers 6200 of the water desalinization system 6000.

The atomized portion of the solution $S_1$ enters the nozzle portion 6240 via the inlet portion 6241. The atomized solution $S_1$ flows within the flow path 6252 defined by the internal surface 6251 of the nozzle portion 6240 with a given axial and rotational velocity. As described above, the tapered portion 6253 allows the atomized solution $S_1$ to expand within the interior surface 6251 and thus increases the surface area of the flow path 6252. The increase in surface area of the flow path 6252 can allow for a more complete mixing with the air $G_{vap-in}$. The air $G_{vap-in}$ enters the vaporizer 6270 through the inlet openings 6276 of the inlet portion 6273. The flow of the atomized solution $S_1$ exits the nozzle portion 6240 at the second end portion 6242 and mixes with the flow of the air $G_{vap-in}$ in the second mixing volume 6279.

As shown in FIG. 29, the vaporizer 6270 receives the inlet air $G_{vap-in}$, having an initial humidity ratio of $\omega_{in}$ via the inlet portion 6273. The inlet gas $G_{vap-in}$ is mixed with the atomized solution $S_1$ within the second mixing volume 6279 and/or the flow path 6278 to produce a mixture $G_1$ of the gas $G_{vap-in}$ and the atomized solution $S_1$. The mixture $G_1$ has a humidity ratio $\omega_1$ that is greater than the initial humidity ratio $\omega_{in}$. The mixture $G_1$ flows within the flow path 6278 defined by the inner surface 6277 of the vaporizer 6270 and the outer surface 6250 of the nozzle portion 6240. The mixture exits the vaporizer 6270 through the outlet openings 6286 and is conveyed within the flow path 6134 defined by the interior walls 6131 of the housing 6110 to the inlet portion of the next vaporizer in the series.

Figure 23:
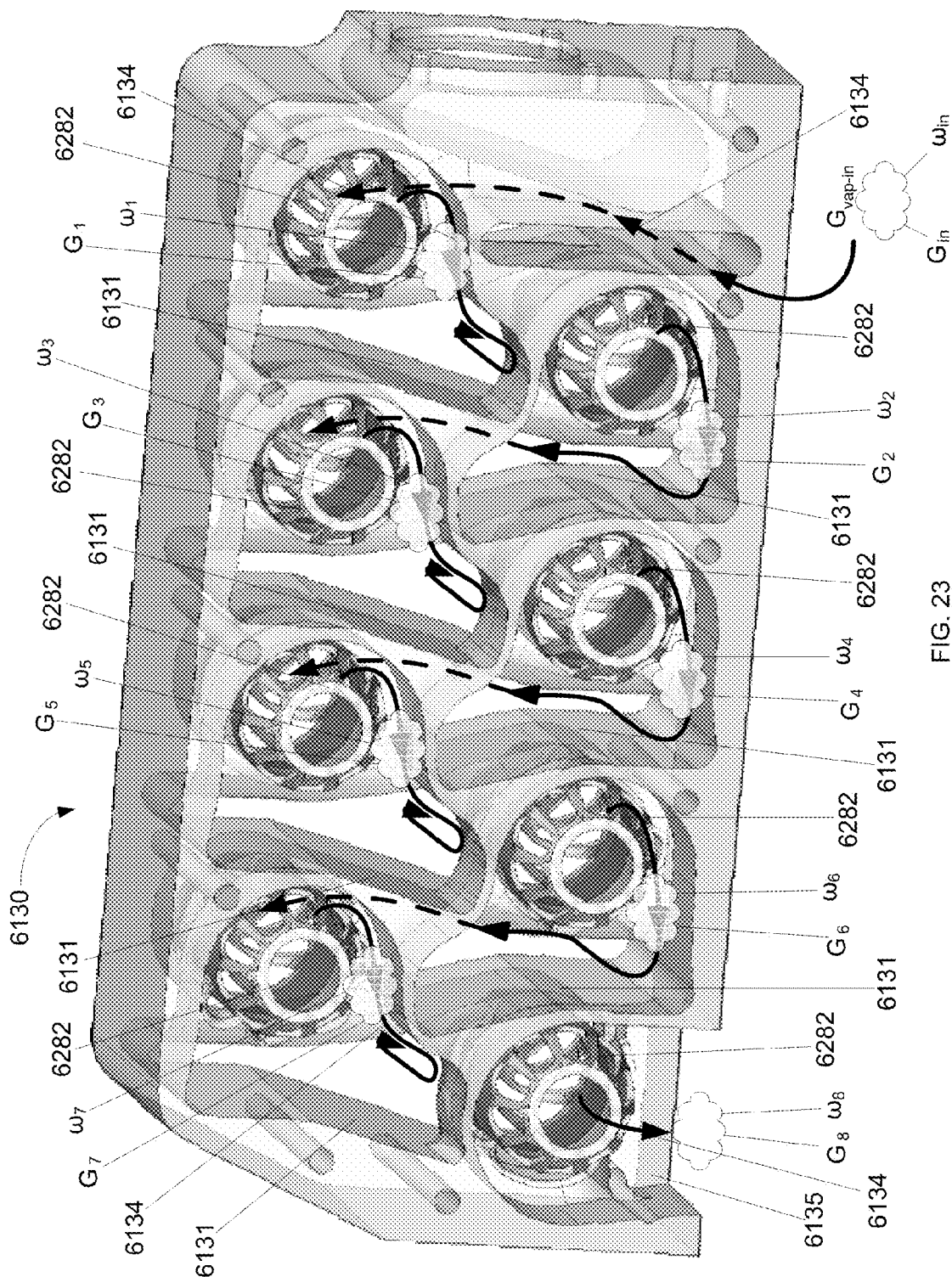
FIG. 23 is a left side view of the second portion of the housing showing the flow path defined by the second portion of the housing according to the processor system of FIG. 14.

FIG. 23 shows the second portion 6130 of the processor 6100 including arrows to illustrate the serial flow through each of the vaporizers 6270. As described above, the mixture $G_1$, having a humidity ratio of $\omega_1$, exits the vaporizer 6270 and enters the flow path 6134 defined by the interior walls 6131 of the housing 6110. The interior walls 6131 of the housing 6110 direct the flow to the second vaporizer and/or the outlet of the second atomizer 6200. More particularly, the shape and configuration of the interior walls 6131 of the housing 6110 define the flow path 6134 from the outlet portion 6282 of a specific vaporizer 6270 to the inlet portion (not shown in FIG. 23) of the successive vaporizer 6270. As described above for the first atomizer 6200, the second atomizer 6200 receives the solution $S_{in}$ and produces the atomized flow $S_2$. The interior walls 6131 of the housing 6110 direct the flow path 6134 of the mixture $G_1$ flows within the flow path 6134 to the second vaporizer 6270 via the inlet portion 6273. The solution $S_2$ is then mixed with the flow of the mixture $G_1$ within the second vaporizer 6270 producing a second mixture $G_2$ and having a humidity ratio $\omega_2$ that is greater than the humidity ratio $\omega_1$. Said a different way, the housing 6110, the atomizers 6200 and the vaporizers 6270 are collectively configured to sequentially mix the inlet gas $G_{vap-in}$ with atomized flow produced by each atomizer 6200 in series (i.e., at a different time and/or a different spatial location within the flow path 6134) such that the humidity ratio $\omega$ increases as the air solution mixture flows past the outlet of each successive atomizer 6200. In this manner, the inlet solution $S_{in}$ is mixed with and/or atomized into the inlet gas $G_{vap-in}$ flow to produce a mixture having a desired humidity ratio that is subsequently conveyed, via the outlet opening 6135 (FIG. 23), to the separator 6300, as described below.

FIGS. 31-35 show the separator 6300, which includes a housing 6310, a first separator member 6325 and a second separator member 6330 (see e.g., FIGS. 34 and 35), a waste outlet tube 6350, and a coupling member 6318. The separator 6300 is coupled to the housing 6110 of the processor 6100 such that an inlet opening 6313 receives a mixture $G_8$ (i.e., the mixture of the air $G_{vap-in}$ and the solution $S_{in}$ after exiting the eighth atomizer) from the outlet opening 6135 of the housing 6110 (shown in FIG. 35). More specifically, the separator 6300 includes a top flange member 6319 configured to be coupled in fluid communication with the outlet opening 6135 of the housing 6110. The top flange member 6319 includes a sealing groove 6320 that is configured to encircle the inlet opening 6313. A sealing member 6321 is configured to fit in the sealing groove 6320 and produce a substantially airtight seal when the separator 6300 is coupled to the processor 6100.

Figure 33:
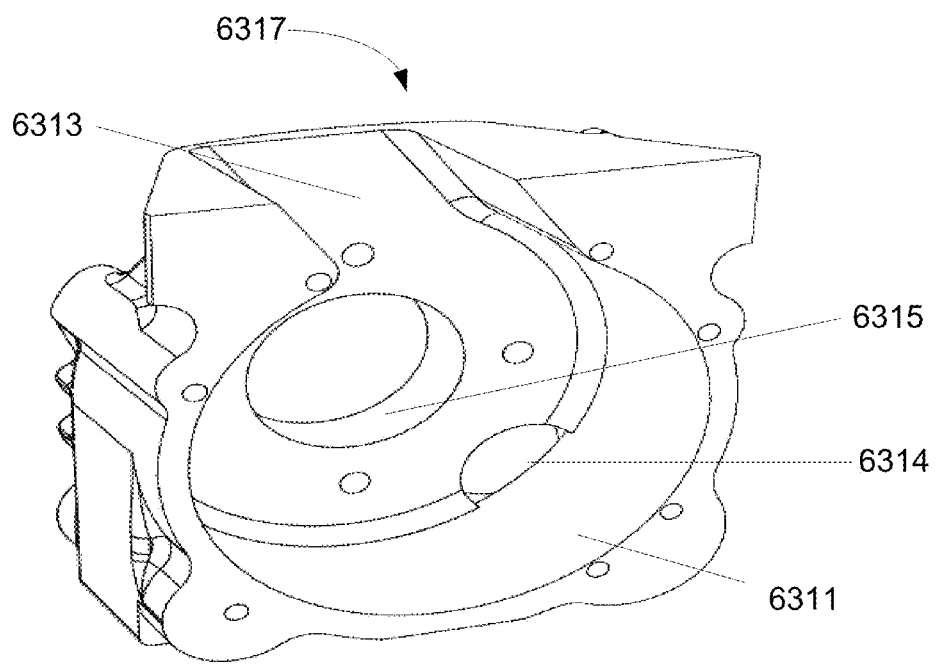
FIG. 33 is a rear perspective view of a front portion of the housing included in the separator of FIG. 30.
Figure 35:
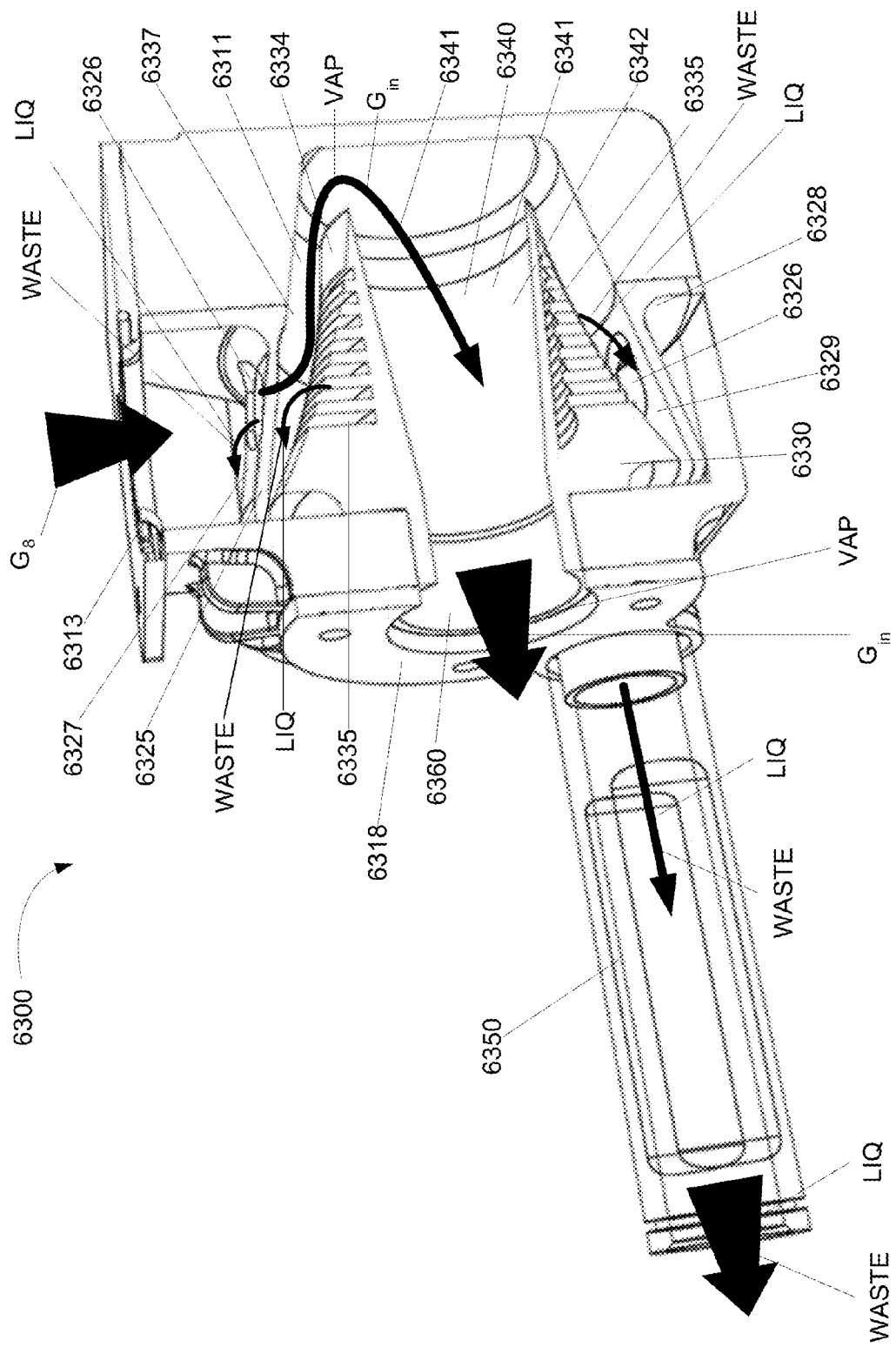
FIG. 35 is a cross-sectional view of the separator of FIG. 30.

The housing 6310 includes a first section 6317, a second section 6312, and a spacer member 6322 that, when coupled together, collectively define an internal volume within which the first separator member 6325 and the second separator member 6330 are disposed, as shown in FIG. 35. As shown in FIG. 33, the first section 6317 of the housing 6310 defines a vapor opening 6315 and a waste outlet opening 6314. As described herein, the first section 6317 is configured such that a first outlet flow (i.e., the vapor) can flow from the separator 6300 to a first volume substantially outside of the separator 6300 via the vapor opening 6315. The first section 6317 is configured such that a second outlet flow (i.e., the waste) can flow from the separator 6300 to a second volume substantially outside of the separator 6300 via the waste outlet opening 6314.

The first section 6315 further includes an interior wall 6311 that is tapered. Similarly stated, an area defined by the interior wall 6311 of the first section 6315 increases along an axis of the first section 6315. In this manner, the volume 6337 between the second separator member 6330 and the interior walls 6311 is reduced. This arrangement enhances the effectiveness of the second separator member 6330, as further described herein.

Figure 31:
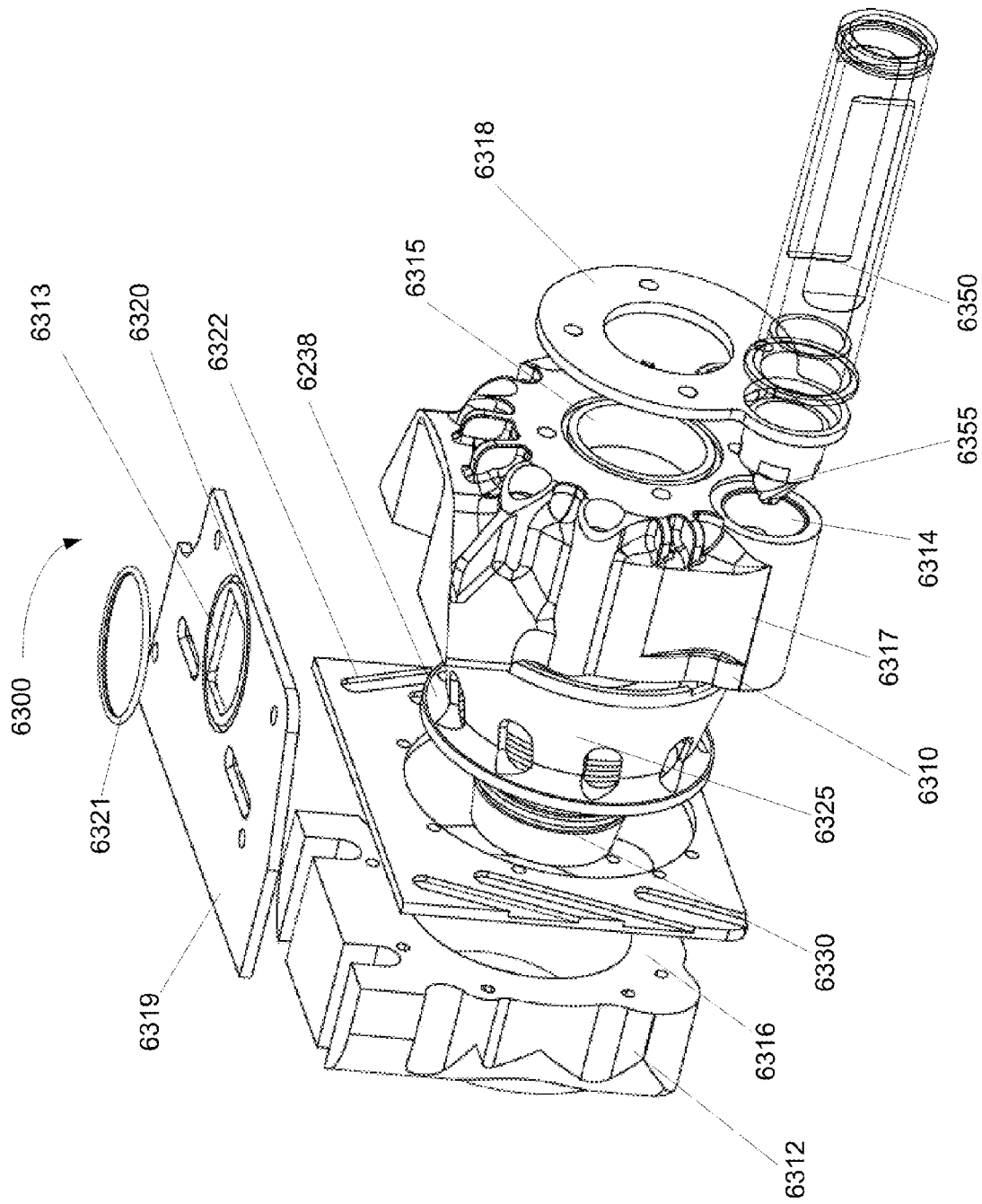
FIG. 31 is an exploded view of the separator of FIG. 30.
Figure 32:
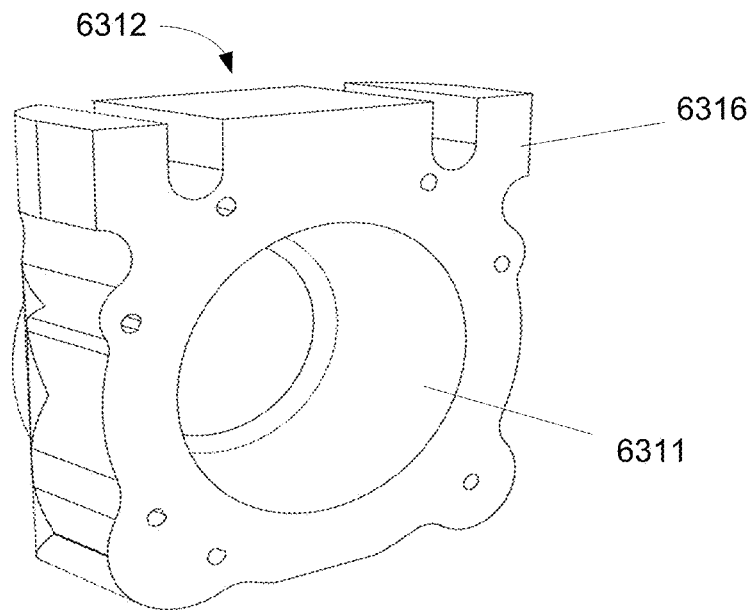
FIG. 32 is a front perspective view of a rear portion of a housing included in the separator of FIG. 30.
Figure 34:
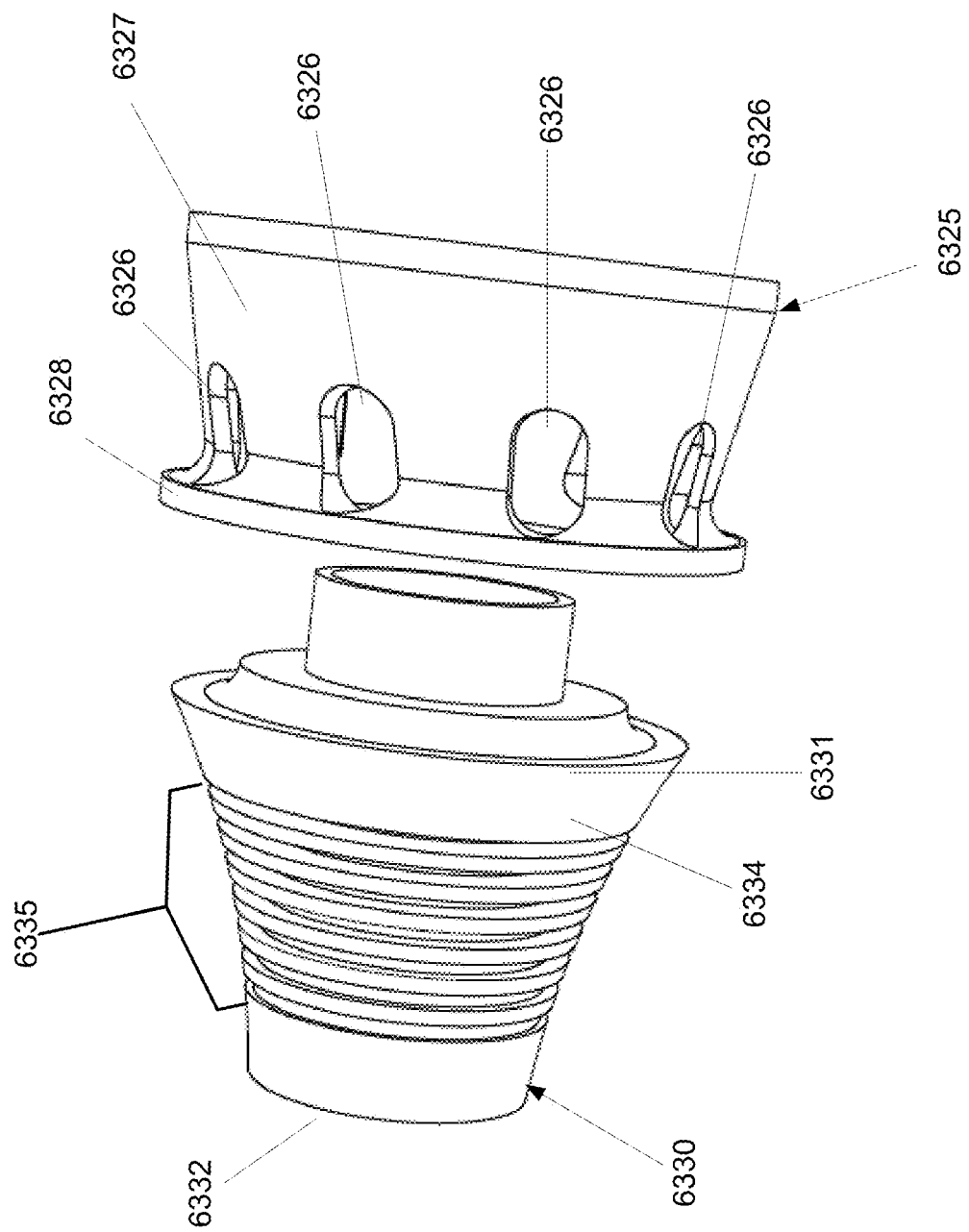
FIG. 34 is a side view of a first separator member and a second separator member of the separator of FIG. 30.

The first separator member 6325 includes an outer surface 6327 that includes a collector flange 6328, extending radially from the outer surface 6327, and defines a set of openings 6326. The set of openings 6326 are substantially oblong and are disposed on the first separator member 6325 at the base of the collector flange 6328, as shown in FIGS. 31 and 34. This arrangement produces a rotational motion of the mixture flowing through the openings, which results in the movement of the vaporized portion VAP of the solvent within the flow path 6341, as described below with reference to FIG. 35. Similarly stated, the outer surface 6327 of the first separator member 6325 is configured to impart and/or redirect a tangential velocity on the flow as it passes through the openings 6326. Although shown in FIG. 34 as substantially oblong, in some embodiments, the set of openings 6326 can be any suitable shape or size, for example, the set of openings 6326 can be round, square, rectangular, and/or a combination of any shapes and/or sizes. Furthermore, the set of openings 6326 can be disposed asymmetrically (e.g., unevenly spaced) along the outer surface 6327.

As described above, the collector flange 6328 extends radially from the first separator member 6325. When in use, the back of the collector flange 6328 mates to a mounting surface 6316 of the second section 6312 and a flange opening defined by the spacer member 6322 fits around the collector flange 6328. Therefore, when the first section 6317 and the second section 6312 are coupled, the spacer member 6322 provides a desired distance between the first section 6317 and the second section 6312 in which the collector flange 6328 is disposed, as implied in the exploded view FIG. 31.

The second separator member 6330 includes a first end portion 6331, a second end portion 6332, an outer surface 6334 that includes a set of grooves 6335, and an inner surface 6340, that defines a flow path 6341. The first end portion 6331 of the second separator member 6330 is configured to be disposed, at least partially, within the first separator member 6325. The outer surface 6334 that is tapered and configured to transition from a larger diameter of the first end portion 6331 to a smaller diameter of the second end portion 6332, as shown in FIG. 34. The tapered outer surface 6334 and the tapered interior walls 6311, described above, define a volume 6337. When in use, the interior walls 6311 and the outer surface 6334 compress the mixture $G_8$ such that a portion of the mixture $G_8$ is collected by the series of grooves 6335 as described herein. The portion of the mixture $G_8$ that is not collected by the series of grooves 6335 flows within the flow path 6341 and exits the separator through the vapor opening 6315.

Figure 28:
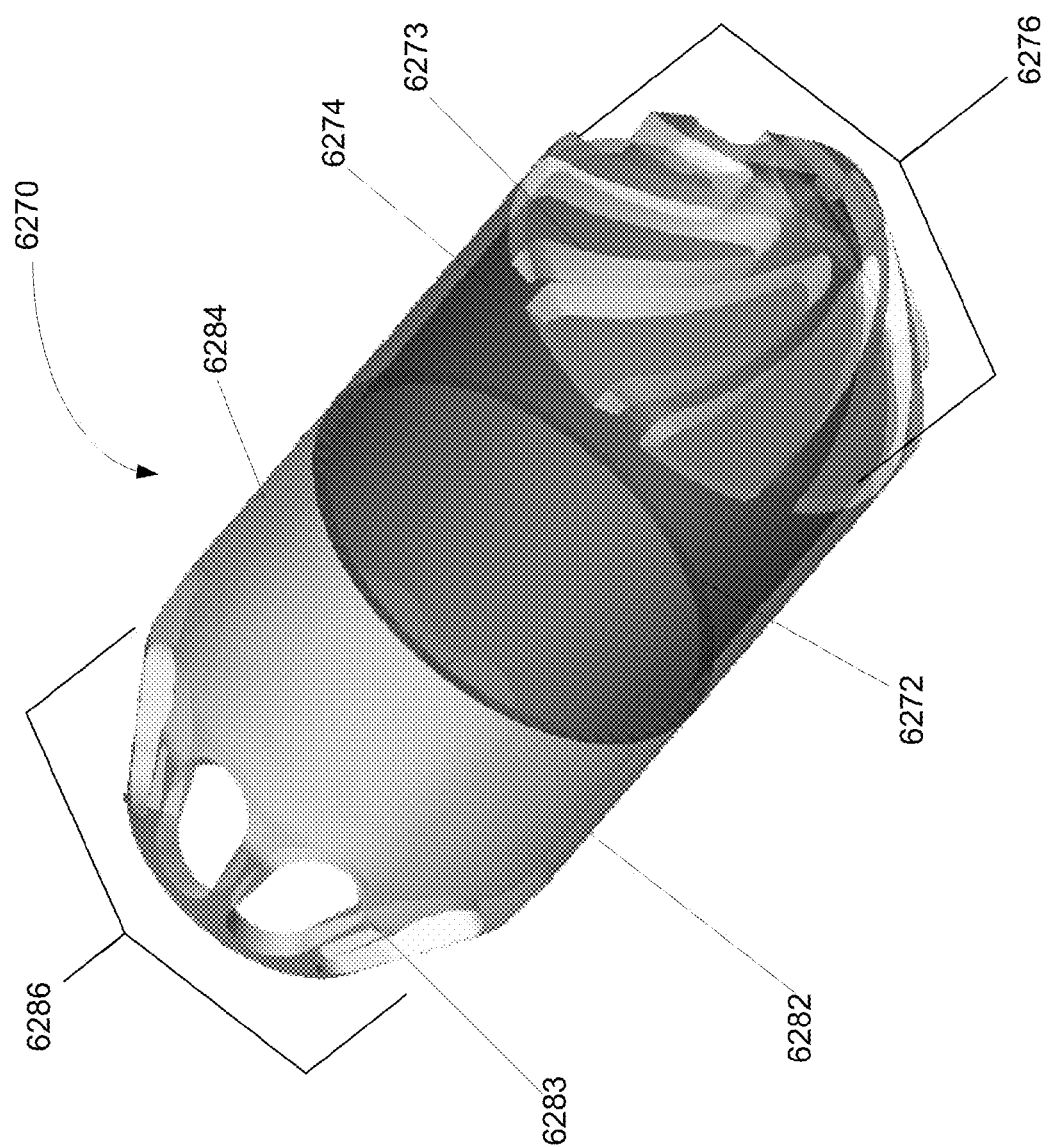
FIG. 28 is a perspective view of the vaporizer of FIG. 26.

FIG. 35 is a cross-sectional view of the separator 6300 that shows the flow of the mixture $G_8$ through the separator 6300. The mixture $G_8$ includes a portion of the air $G_{vap-in}$, a vaporized portion VAP of the solvent, a liquid portion LIQ of the solvent, and a solute WASTE (i.e., the solid waste) from the solution (e.g., the solution $S_{in}$). As the flow of the mixture $G_8$ contacts the outer surface 6327 of the first separator member 6325, a first portion of the mixture $G_8$ enters the set of openings 6326 (FIG. 28). A second portion of the mixture $G_8$ contacts the outer surface 6327 of the first separator member 6325 and continues to flow along the circumference of the first separator member 6325. More specifically, the second portion of the mixture $G_8$ is largely comprised of a portion of the liquid LIQ and the solute WASTE (i.e., the solid waste). The first portion of the mixture $G_8$ is largely comprised of a portion of the vaporized solvent VAP and the portion of the air $G_{vap-in}$, with substantially less amounts of the liquid LIQ and the solute WASTE. Expanding further, the properties (i.e., density and flow characteristics) of the liquid portion LIQ and the solute WASTE lead to a higher concentration of these portions collecting on the outer surface 6327 of the first separator member 6325 than the portions of the air $G_{vap-in}$ and the vaporized solvent VAP. Conversely, higher concentrations of the air $G_{vap-in}$ and the vaporized solvent VAP, relative to the portions of the liquid LIQ and the solute WASTE, flow through the set of openings 6326 due to their relative low density and less constrained flow characteristics. Similarly stated, the first separator member 6325 is configured to separate a portion of the mixture $G_8$ into two portions; the first portion being largely comprised of the liquid LIQ and the solute WASTE and the second portion being largely comprised of a portion of the air $G_{vap-in}$ and the vaporized solvent VAP.

Figure 36:
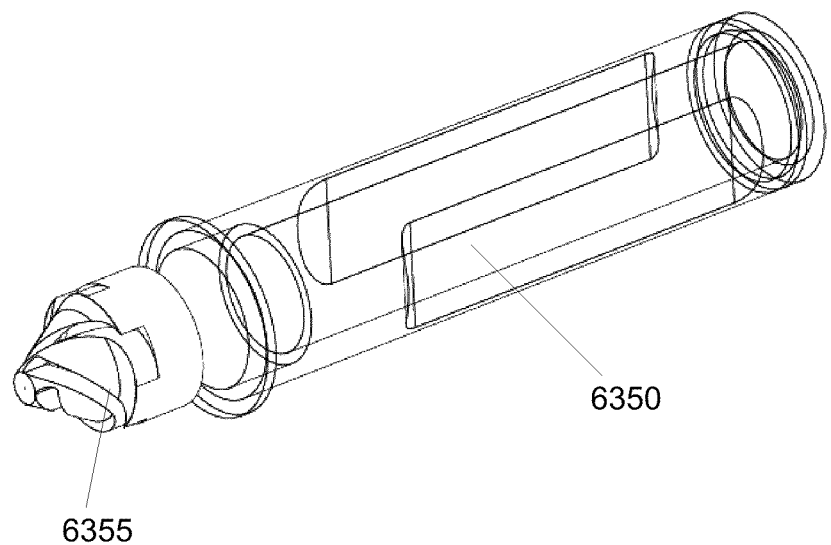
FIG. 36 is a perspective view of a waste outlet tube of the separator of FIG. 30.
Figure 37:
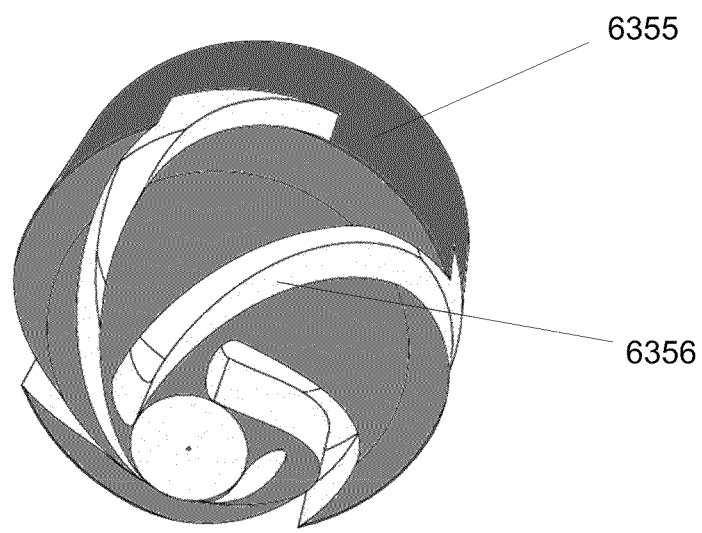
FIG. 37 is a perspective view of a waste inlet member included in the waste outlet tube of the separator of FIG. 30.
Figure 38:
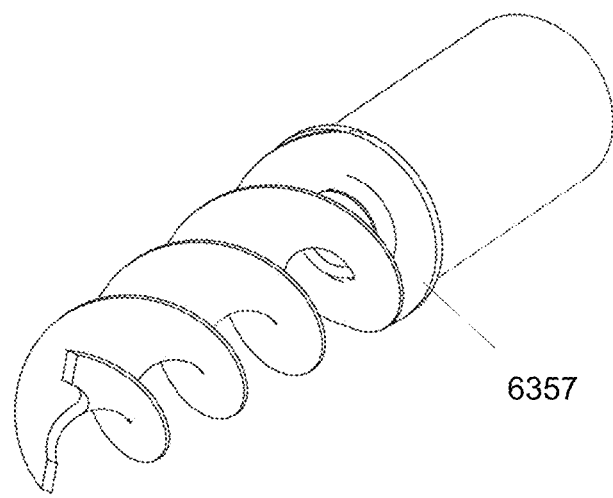
FIGS. 38 and 39 are perspective views of an auger that can be included in the waste outlet tube of FIG. 36.
Figure 39:
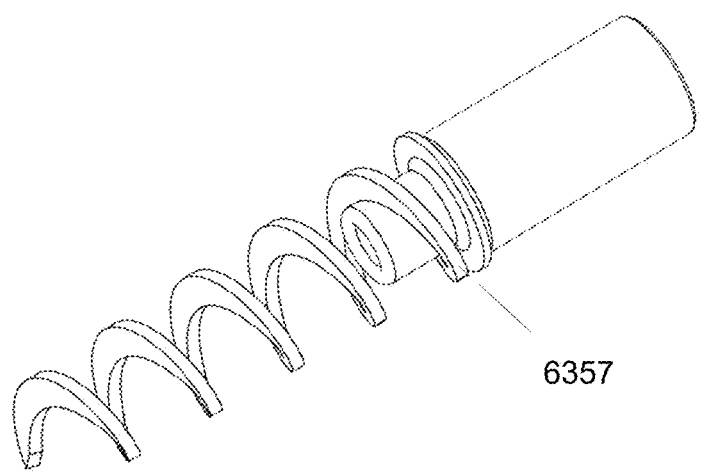

As mentioned above, the interior walls 6311 of the housing 6310 and the second separator member 6330 are tapered. This arrangement aids in the flow of the first portion of the mixture $G_8$ and reduces the volume 6337 between the interior walls 6311 and the second separation member 6330. As the first portion of the flow (comprised largely of the portion of the air $G_{vap-in}$ and the vaporized solvent VAP) enters the volume 6337, the flow is compressed, forcing the portions of the liquid LIQ and the solute WASTE toward the outer surface 6334 of the second separation member 6330. More specifically, as the flow is compressed, the greater density of the liquid LIQ and the solute WASTE causes these portions to be disposed below the flow of the portions of the air $G_{vap-in}$ and the vaporized solution VAP. The set of grooves 6335 are configured to collect the portions of the liquid LIQ and the solute WASTE such that these portions flow along the circumference of the outer surface 6334 and within the grooves 6335 until the bottom of the second separator member 6330, where they drop to the inner surface 6329 of the first separation member 6325. The liquid LIQ and the solute WASTE exit the first separation member 6325 via the set of openings 6326. The liquid LIQ and the solute WASTE flow within the housing 6310 to the waste opening 6314 (FIG. 33) where these portions flow, within the waste outlet tube 6350, to a volume substantially outside of the water desalinization system 6000 for disposal. As shown in FIG. 36, the waste outlet tube 6350 includes an waste inlet member 6355. The waste inlet member 6355, as shown in FIG. 37, includes a set of helical openings 6356 configured to accept the flow of the liquid LIQ and the solute WASTE. The use of the waste inlet member 6355 reduces clogging at the waste opening 6314. Furthermore the waste outlet tube 6350 can include an auger 6357 (see e.g., FIGS. 38 and 39). Similar to the waste inlet member 6355, the auger 6357 can reduce clogging within the waste outlet tube 6350 thereby, reducing the potential of downtime or mechanical failure due to clogging. Although shown as including a helical (or spiral) protrusion, the auger 6357 can be of any suitable shape and/or size.

The flow of the air $G_{vap-in}$ and the vaporized solvent VAP, substantially free from the liquid portion LIQ and the solute WASTE, flow within a flow path 6341 and enter an interior volume defined by an inner surface 6340 of the second separator member 6330. The inner surface 6340 is configured to taper 6342, with a larger diameter at the inlet portion and a smaller diameter at the outlet portion. This arrangement further compresses the air $G_{vap-in}$ and the vaporized solvent VAP and, as such, starts to condense the air $G_{vap-in}$ and the vaporized solvent VAP. The air $G_{vap-in}$ and the vaporized solvent VAP exit the separator 6300 at the vapor outlet 6360. The coupling member 6318 is configured to couple to any suitable transport system configured to transport the air $G_{vap-in}$ and the vaporized solvent VAP to a volume substantially outside the separator 6300 (not shown in FIG. 30-35). For example, the air $G_{vap-in}$ and the vaporized solvent VAP can be transported to a condenser as described in detail in the water desalinization system 1000 above.

Figure 40:
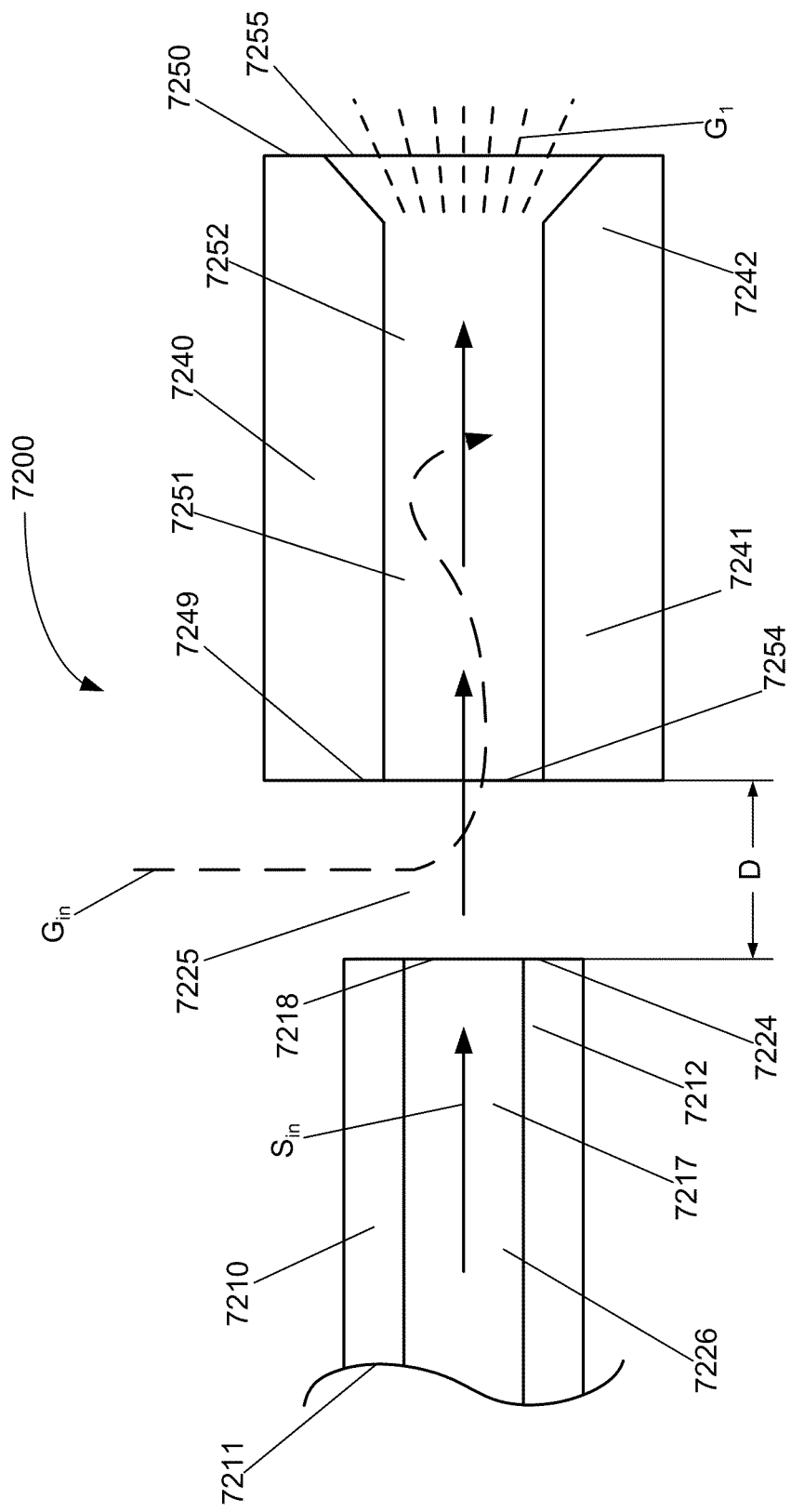
FIG. 40 is a schematic illustration of a cross-section of an atomizer, according to an embodiment.

While specific atomizers are described herein, the components and configurations of the atomizer can vary. For example, FIG. 40 is a schematic illustration of an atomizer assembly 7200 according to an embodiment. The atomizer includes an injector 7210 and a nozzle 7240. The injector 7210 includes a first end portion 7211 and a second end portion 7212, and includes a wall 7226. The first end portion 7211 can include any suitable interface, coupling, or inlet, configured to receive a portion of a solution $S_{in}$. For example, the first end portion 7211 can be coupled to an inlet supply line (not shown in FIG. 40). As described herein, the solution $S_{in}$ can be any solution of a solvent containing a solute such as seawater, saltwater, brackish water, and/or the like.

The wall 7226 of the injector 7210 defines a flow path 7217, such that the solution $S_{in}$ flows within the flow path 7217 between the first end portion 7211 and the second end portion 7212. Although shown in FIG. 40 as substantially smooth, the interior surface of the wall 7226 can include any suitable texture, groove, contour, and/or the like configured to induce a particular fluid flow characteristic. For example, the interior surface of the wall 7226 can define a series of helical grooves such as to produce a rotational component in the flow of the solution $S_{in}$ within the flow path 7217.

The second end portion 7212 includes an end surface 7224 that defines an outlet orifice 7218. The end surface 7224 can be any suitable shape or configuration. For example, the end surface 7224 can be substantially flat, while in other embodiments the end surface 7224 can include a raised outer edge, such as to define a volume therein. Similarly, the end surface 7224 can include contours, ridges, grooves, and/or the like configured to induce a particular fluid flow characteristic, as further described below. The outlet orifice 7218 can be any suitable orifice configured to produce an outlet flow (e.g., spray) that includes smaller particles of the solution $S_{in}$ than the inlet flow of the solution $S_{in}$. Similarly stated, the outlet orifice 7218 can be configured to produce at least a partially atomized flow of the solution $S_{in}$. Furthermore, the outlet orifice 7218 can be defined by the end surface 7224, as described above, and in other embodiments, the outlet orifice 7218 can be a threaded insert configured to couple to the injector 7210.

The nozzle 7240 includes a first end portion 7241 and a second end portion 7242 and wall 7251 therebetween. The first end portion 7241 includes an end surface 7249 that defines an inlet orifice 7254 configured to receive an inlet flow. The second end portion 7242 includes an end surface 7250 that defines an outlet orifice 7255. The flow into the nozzle 7240 can include of a portion of the outlet flow of the injector 7210 and a portion of an inlet gas $G_{in}$. More specifically, a mixing volume 7225 is defined by a volume between the end surface 7224 of the injector 7210 and the end surface 7249 of the nozzle 7240. The inlet gas $G_{in}$ mixes with the partially atomized outlet flow of the solution $S_{in}$, further atomizing (i.e., reducing into small particles) the solution $S_{in}$. The concentration of the atomized solution $S_{in}$ per volume of the air $G_{in}$ that enters the nozzle 7240 can be adjusted by adjusting the distance D between the injector 7210 and the nozzle 7240. For example, the distance D can be increased such that a lower concentration of the solution $S_{in}$ per volume of the air $G_{in}$ enters the nozzle 7240.

Similar to the end surface 7224 of the injector 7210 described above, the end surface 7249 of the nozzle 7240 can include contours, ridges, grooves, and/or the like, configured to induce a particular fluid flow characteristic. For example, the end surface 7224 of the injector 7210 and the end surface 7249 of the nozzle 7240 can include a set of helical grooves configured to produce a rotational component in the inlet flow of the gas $G_{in}$. In some embodiments, the end surface 7224 of the injector 7210 and the end surface 7249 of the nozzle 7240 can be substantially flat such that any rotational component of the inlet flow of the gas $G_{in}$ is inherent in the flow.

The inlet orifice 7254 of the nozzle 7240 receives the partially mixed combination of the solution $S_{in}$ and the inlet gas $G_{in}$ and can be any suitable size, shape, and/or configuration. Similar to the end surface 7224 and the end surface 7249, the surface of the wall 7251 that defines the inlet orifice 7254 can include contours, ridges, grooves, and/or the like such as to produce a particular flow characteristic (e.g., rotational flow) to aid in the mixture of the partially atomized solution $S_{in}$ and the inlet gas $G_{in}$. The interior surface of the wall 7251 of the nozzle 7240 defines a flow path 7252. The partially atomized solution $S_{in}$ and the inlet gas $G_{in}$ continue to mix within the flow path 7252 while flowing toward the outlet orifice 7250 of the second end portion 7242.

As described above, the second end portion 7242 includes the end surface 7250 that defines the outlet orifice 7255. Similar to the outlet orifice 7218 of the injector 7210, the outlet orifice 7255 can be any suitable orifice configured to produce an outlet flow G1 (i.e., spray) that includes smaller particles of the solution $S_{in}$ and the inlet gas $G_{in}$. In this manner, the atomizer 7200 can be considered as a two-stage atomizer 7200 such that the solution $S_{in}$ is partially atomized when exiting the injector 7210 and further atomized when mixed with the inlet gas $G_{in}$ within the mixing volume 7225 and the nozzle 7240 and produces an atomized mixture G1 of the solution $S_{in}$ and the inlet gas $G_{in}$.

Figure 41A:
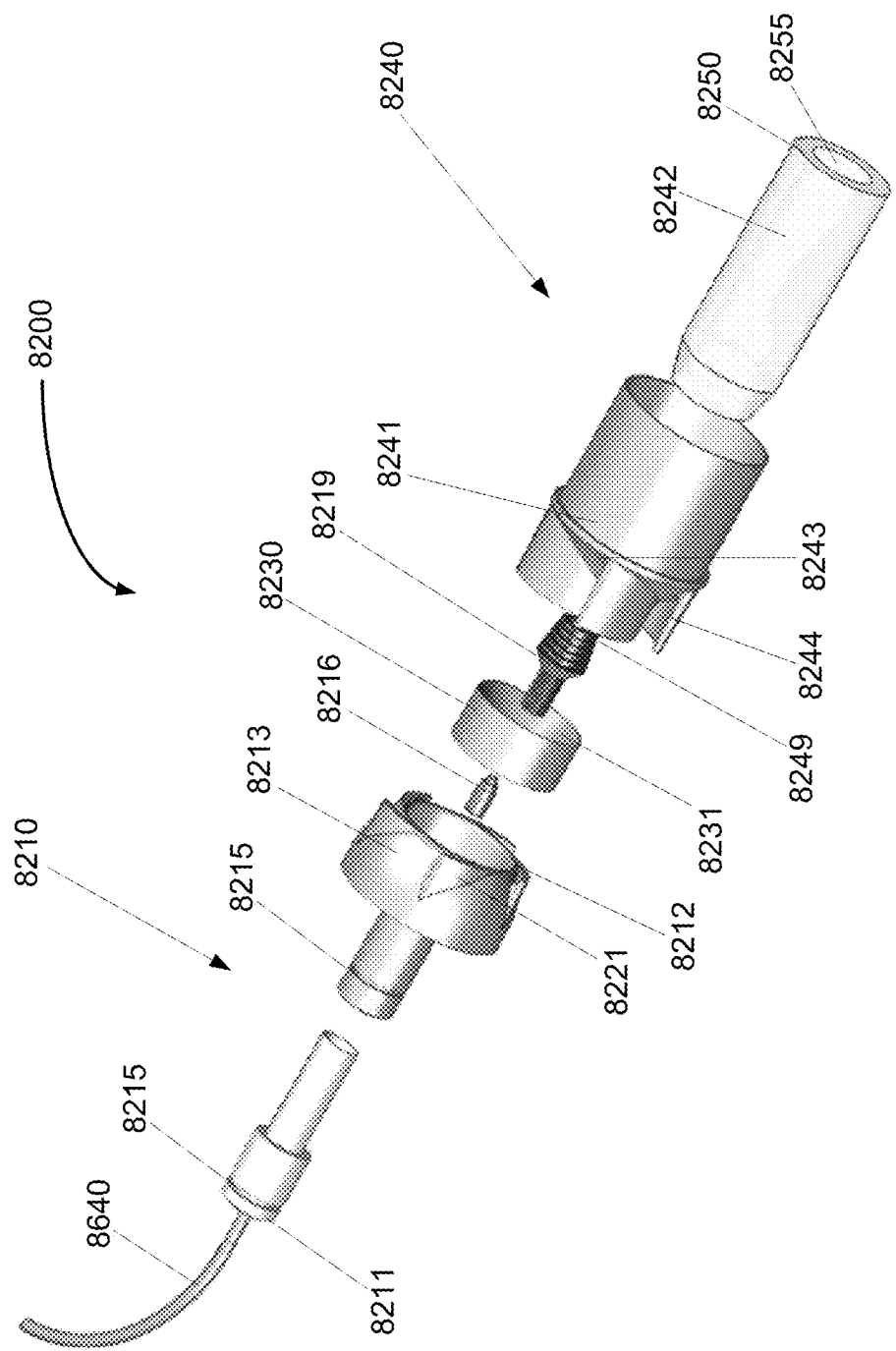
FIG. 41A is a perspective view of an atomizer according to an embodiment.

In some embodiments, an atomizer 8200 can include an injector 8210 and a nozzle 8240, as shown in FIG. 41A. The injector 8210 includes a first end portion 8211 and a second end portion 8212. The first end portion 8211 is configured to couple a supply line 8640 to the injector 8210 via the inlet line coupling 8216. The first end portion 8211 includes an outer surface 8213 that defines a sealing groove 8215. A sealing member (not shown in FIG. 41A) can be configured to fit into the sealing groove 8215 to produce a substantially fluid-tight and/or hermetic seal with a component of a given housing. The injector 8210 is configured to receive the inlet flow of the solution via the supply line 8640. The inlet flow of solution can be conveyed to the atomizer 8200 via any suitable mechanism, such as, for example, the methods described above in the water desalinization system 1000.

The second end portion 8212 of the injector portion 8210 is configured to receive and/or be coupled to an injector insert 8219 and a mixing insert 8230. More particularly, the injector insert 8219 is disposed within the second end portion 8212 using a threaded coupling. The outer surface 8213 at the second end portion 8212 defines a set of helical grooves 8221, as shown in FIG. 41A. The helical grooves 8221 are configured to produce a rotational velocity component when an inlet air flows into the atomizer 8200, as described in more detail herein. The mixing insert 8230 includes a conical end surface 8231 and an aperture 8232 configured to receive the injector insert 8219, as shown in FIG. 41B. The second end portion 8212 of the injector 8210 is spaced apart from a first end portion 8241 of the nozzle 8240 by a giving distance and defines a mixing volume between the conical end surface 8231 of the mixing insert 8230 and the first end portion 8241 of the nozzle 8240, similarly described above in the atomizer 7000.

The injector insert 8219 defines an end surface 8224 with a solution outlet orifice 8218 substantially in the center (FIG. 41C) and a set of smaller outlet orifices 8235 around the circumference of the injector insert 8219, as shown in FIG. 41D. The end surface 8224 is substantially flat and the solution outlet orifice 8218 is an extrusion (i.e., removal of material). The shape of the center outlet orifice 8218 and the set of outlet orifices 8235 can be any suitable shape such that the center outlet orifice 8218 and the set of outlet orifices 8235 can reduce the solution into an atomized flow (i.e., very small particles of the solution).

The nozzle portion 8240 includes a first end portion 8241 and a second end portion 8242, as shown in FIG. 41. The first end portion 8241 includes an end surface 8249 defining an opening configured to receive the atomized portion of the solution. An outer surface 8243 of the first end portion 8241 of the nozzle portion 8240 defines a set of helical grooves 8244. The flow of the air is configured to flow within the helical grooves 8244 and into the mixing volume, described above, such that the helical grooves 8244 impart a rotational velocity component in the flow. The second end portion 8242 of the nozzle portion 8240 includes an end surface 8250 and an outlet orifice 8255. Similar to the outlet orifice 8218 of the injector 8210, the outlet orifice 8255 is configured to produce an outlet flow (i.e., spray) that includes smaller particles of the solution the inlet air than the inlet flow of the solution and the inlet air. In this manner, the atomizer 8200 functions similar to the atomizer 7200 described above.

Figure 42:
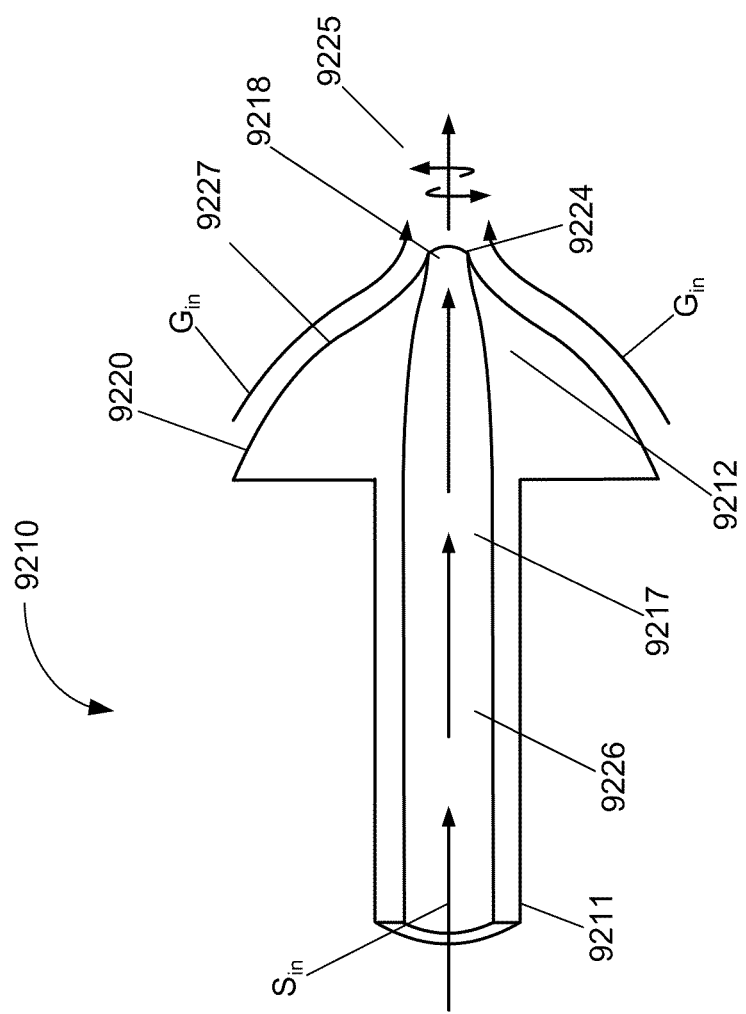
FIG. 42 is a schematic illustration of a cross-section of an injector, according to an embodiment.

FIG. 42 is a schematic illustration of an injector 9210 according to an embodiment. The injector 9210 includes a first end 9211 and a second end 9212, an inner wall 9226 and an outer wall 9220. The inner wall 9226 defines a first flow path 9217. The outer wall 9220 that defines a second flow path 9227.

The first end 9211 of the injector 9210 is configured to receive a solution $S_{in}$. The solution $S_{in}$ can be any suitable solution described herein (e.g., saltwater, brackish water, etc.). The solution $S_{in}$ can be conveyed to the injector 9210 using any suitable method, such as, for example, a supply line. The solution $S_{in}$ can flow within the first flow path 9217 defined by the inner wall 9226 from the first end portion 9211 toward the second end portion 9212. While indicated as forming a smooth cylindrical wall, the inner wall 9226 can form any shape with a suitable cross-sectional area. For example, in some embodiments the inner wall 9226 can form an oblong and/or non-circular cross-section. Similarly, while shown as tapering in FIG. 42, the inner wall 9226 can have a substantially constant cross-sectional area and/or size. In some embodiments, the inner wall 9226 can define a set of grooves, such as, for example, a set of helical grooves to induce a rotational velocity component to the flow of the solution $S_{in}$ flowing within the flow path 9217.

The outer wall 9220 of the second end portion 9212 includes an end surface 9224 that defines a solution outlet orifice 9218. The solution $S_{in}$ flowing within the flow path 9217 exits the injector 9210 via the solution outlet orifice 9218. The outlet orifice 9218 can be any suitable orifice configured to produce an outlet flow (i.e., spray) that includes smaller particles of the solution $S_{in}$ than the inlet flow of the solution $S_{in}$. Similarly stated, the outlet orifice 9218 can be configured to produce at least a partially atomized flow of the solution $S_{in}$. Furthermore, the outlet orifice 9218 can be defined by the end surface 9224, as described above, and in other embodiments, the outlet orifice 9218 can be a threaded insert configured to couple to the injector 9210.

As described above, the outer wall 9220 defines a second flow path 9227 such that an inlet air $G_{in}$ can flow within the flow path 9227 toward the end surface 9224. The outer wall 9220 can define a set of grooves, such as, for example, a set of helical grooves to induce a rotational velocity component to the secondary flow of the inlet air $G_{in}$ flowing within the second flow path 9227. In this manner, the injector 9210 is configured to mix the partially atomized outlet flow of the solution $S_{in}$ with the secondary flow of the inlet air $G_{in}$ in a mixing volume 9225. More specifically, the secondary flow of the inlet air $G_{in}$ converges with the partially atomized outlet flow of the solution $S_{in}$ at the mixing volume 9225, thereby further atomizing the flow.

Figure 52:
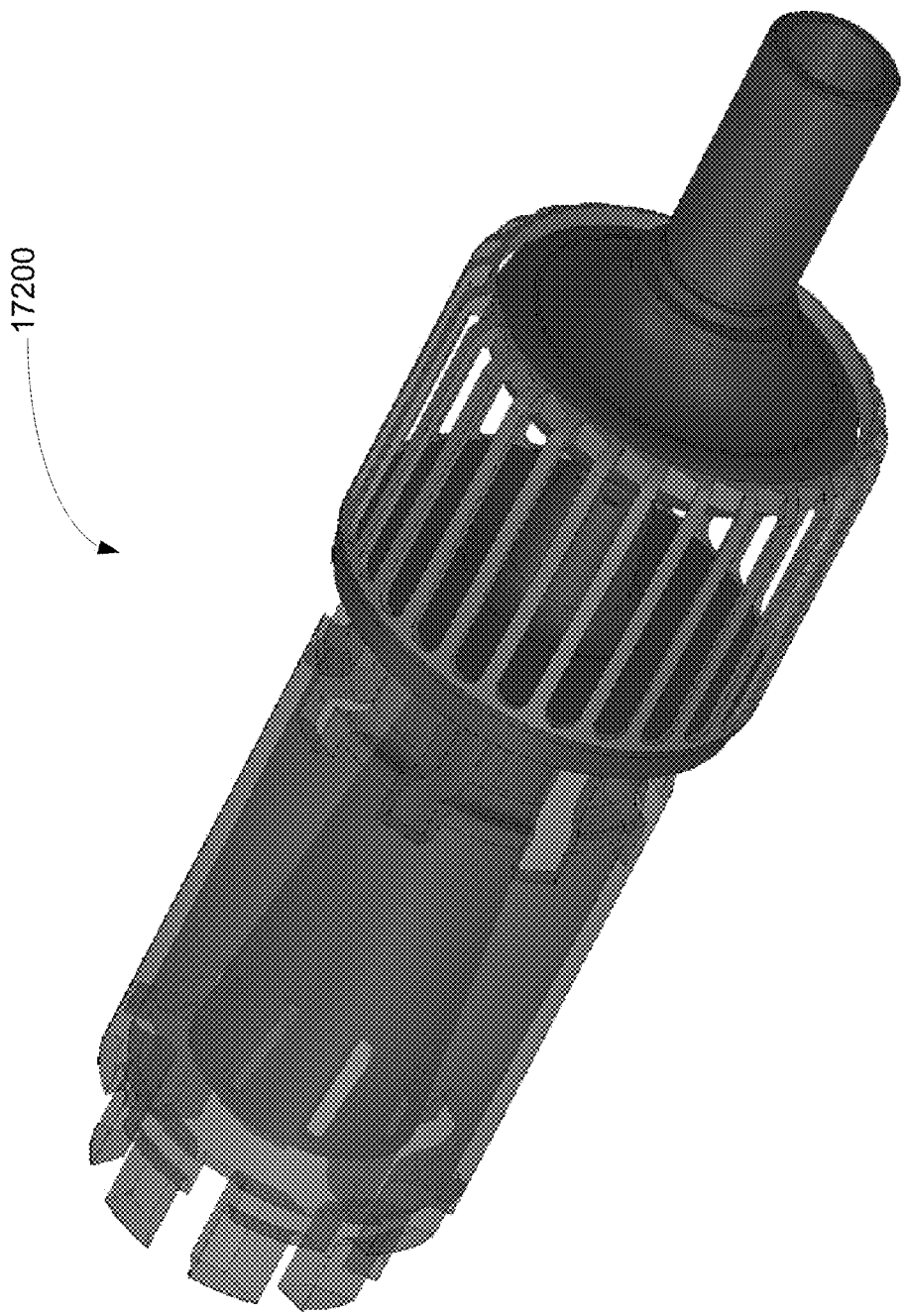
FIG. 52 is a perspective view of an atomizer, according to an embodiment.

While shown and described herein as having a specific shape and configuration, the injectors, injector portions, nozzles and/or nozzle portions of any of the atomizers shown herein can be of any suitable configuration. For example, as shown in FIG. 43, a nozzle portion 10210 can include a first end 10211, configured to produce a flow of atomized and/or vaporized solution (not shown in FIG. 43), and a second end 10212, configured to receive at least a partially atomized flow of the inlet solution from an injector (not shown in FIG. 43). For example, in some embodiments, the nozzle portion 10210 can be included within an atomizer similar to the atomizer 17200 shown and described with reference to FIG. 52. The walls 10213 of the nozzle portion 10210 can be tapered, with a larger diameter at the first end 10211 and a smaller diameter at the second end 10212. The second end 10212 of the injector 10210 can include an outer wall 10220 and define an outlet orifice 10218 and a set of outlet orifices 10235 disposed on the circumference of the outer wall 10220.

The walls 10213 of the first end 10211 can include a set of inlet openings 10236 configured through which a flow of solution exits the atomizer and flows into a vaporizer and/or separator (not shown in FIG. 43). In this manner, the first end 10211 of the injector 10210 can be configured to produce the inlet solution and the inlet air received from an injector via the orifice 10218 and the set of orifices 10235.

FIG. 44 is a perspective view of an injector 11210, according to another embodiment. The injector 11210 includes a first end 11211, configured to receive an inlet solution (not shown in FIG. 44), and a second end 11212, configured to produce at least a partially atomized flow of the inlet solution (not shown in FIG. 44). Similar to the injector 6210, the first end portion 11211 includes an outer wall 11213 that defines a groove 11215 that accepts a sealing member (not shown in FIG. 44) configured to create a fluid-tight or hermetic seal with a given housing.

The second end 11212 includes an end surface 11220 that defines a solution outlet orifice 11218. The end surface 11220 is substantially circular with rounded edges. As shown in FIG. 44, the solution outlet orifice 11218 is a small extrusion (i.e., removal of material) in the center of the end surface 11220 that produces the at least partially atomized flow of the solution. The solution outlet orifice 11218 is configured to have a substantially smaller diameter than the interior walls of the injector 11210, such that a pressure is created at the interior wall of the end surface 11220 (not shown in FIG. 44). In this manner, the solution is atomized as it exits the solution outlet orifice due to the large pressure drop upon exiting the injector.

FIG. 45 is a perspective view of an injector 12210, according to another embodiment. The injector 12210 includes a first end 12211, configured to receive an inlet solution (not shown in FIG. 45), and a second end 12212, configured to produce at least a partially atomized flow of the inlet solution (not shown in FIG. 45). Similar to the injector 11210, the first end portion 12211 includes an outer wall 12213 that defines a groove 12215 that accepts a sealing member (not shown in FIG. 45) configured to create a fluid-tight or hermetic seal with a given housing.

The second end 12212 includes a tapered portion 12233 and an end surface 12220 that defines a solution outlet orifice 12218. The tapered portion 12233 can be configured to direct a secondary flow (e.g., and airflow) toward the end surface 12220 to mix with the at least partially atomized flow of the solution. As shown in FIG. 45, the solution outlet orifice 12218 is configured and functions similarly to the solution outlet orifice of the injector 11210.

Figure 46:
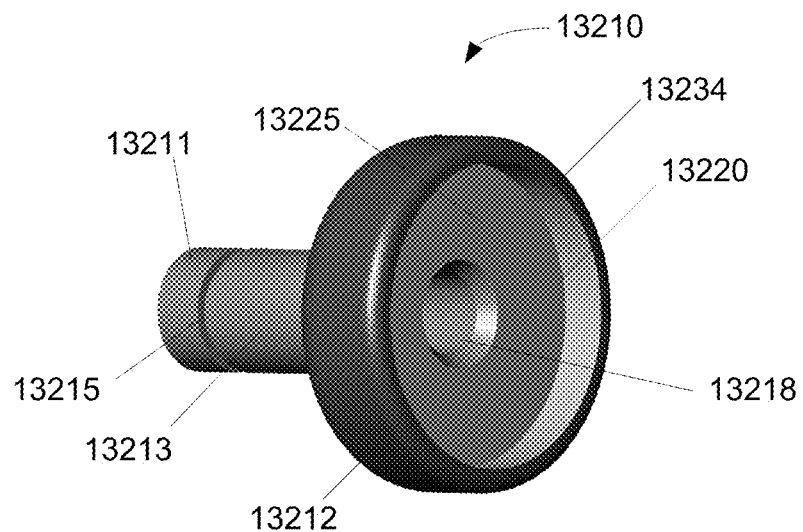
FIG. 46 is a perspective view of an injector according to an embodiment.

FIG. 46 is a perspective view of an injector 13210, according to another embodiment. The injector 13210 includes a first end 13211, configured to receive an inlet solution (not shown in FIG. 46), and a second end 13212, configured to produce at least a partially atomized flow of the inlet solution (not shown in FIG. 46). Similar to the injector 6210, the first end portion 13211 includes an outer wall 13213 that defines a groove 13215 that accepts a sealing member (not shown in FIG. 46) configured to create a fluid-tight or hermetic seal with a given housing.

The second end 13212 includes an end surface 13220 that defines a solution outlet orifice 13218 and includes a raised edge 13234, as shown in FIG. 46. The outlet orifice 13218 receives an injector insert (not shown in FIG. 46) that is configured to produce at least partially atomized flow of the solution. The injector insert can couple to the solution outlet orifice 13218 in any suitable way, such as, for example, a threaded coupling. The raised edge 13234 is configured to define, at least in part, a mixing volume 13225 for the at least partially atomized flow of the solution to mix with a secondary flow of an inlet air.

Figure 47:
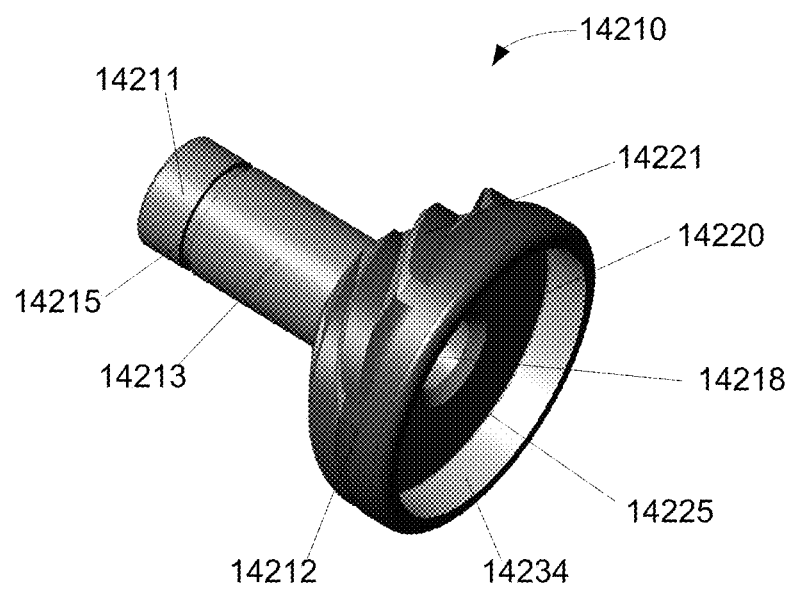
FIG. 47 is a perspective view of an injector according to an embodiment.

FIG. 47 is a perspective view of an injector 14210, according to another embodiment. The injector 14210 includes a first end 14211, configured to receive an inlet solution (not shown in FIG. 47), and a second end 14212, configured to produce at least a partially atomized flow of the inlet solution (not shown in FIG. 47). Similar to the injector 6210, the first end portion 14211 includes an outer wall 14213 that defines a groove 14215 that accepts a sealing member (not shown in FIG. 47) configured to create a fluid-tight or hermetic seal with a given housing.

The second end 14212 includes an end surface 14220, which defines a solution outlet orifice 14218 and includes a raised edge 14234, and defines a set of helical grooves 14221, as shown in FIG. 46. The outlet orifice 14218 receives an injector insert (not shown in FIG. 46) that is configured to produce at least a partially atomized flow of the solution. The injector insert can couple to the solution outlet orifice 14218 in any suitable way, such as, for example, a threaded coupling. The helical grooves 14221 are configured induce a rotational velocity component on a secondary flow of an inlet air. The raised edge 14234 is configured to create a mixing volume 14225 for the at least partially atomized flow of the solution to mix with the secondary flow of the inlet air. The rotational velocity of the flow of the inlet air facilitates the mixing of the inlet air with the partially atomized flow of the solution, thereby further atomizing the solution.

Figure 48:
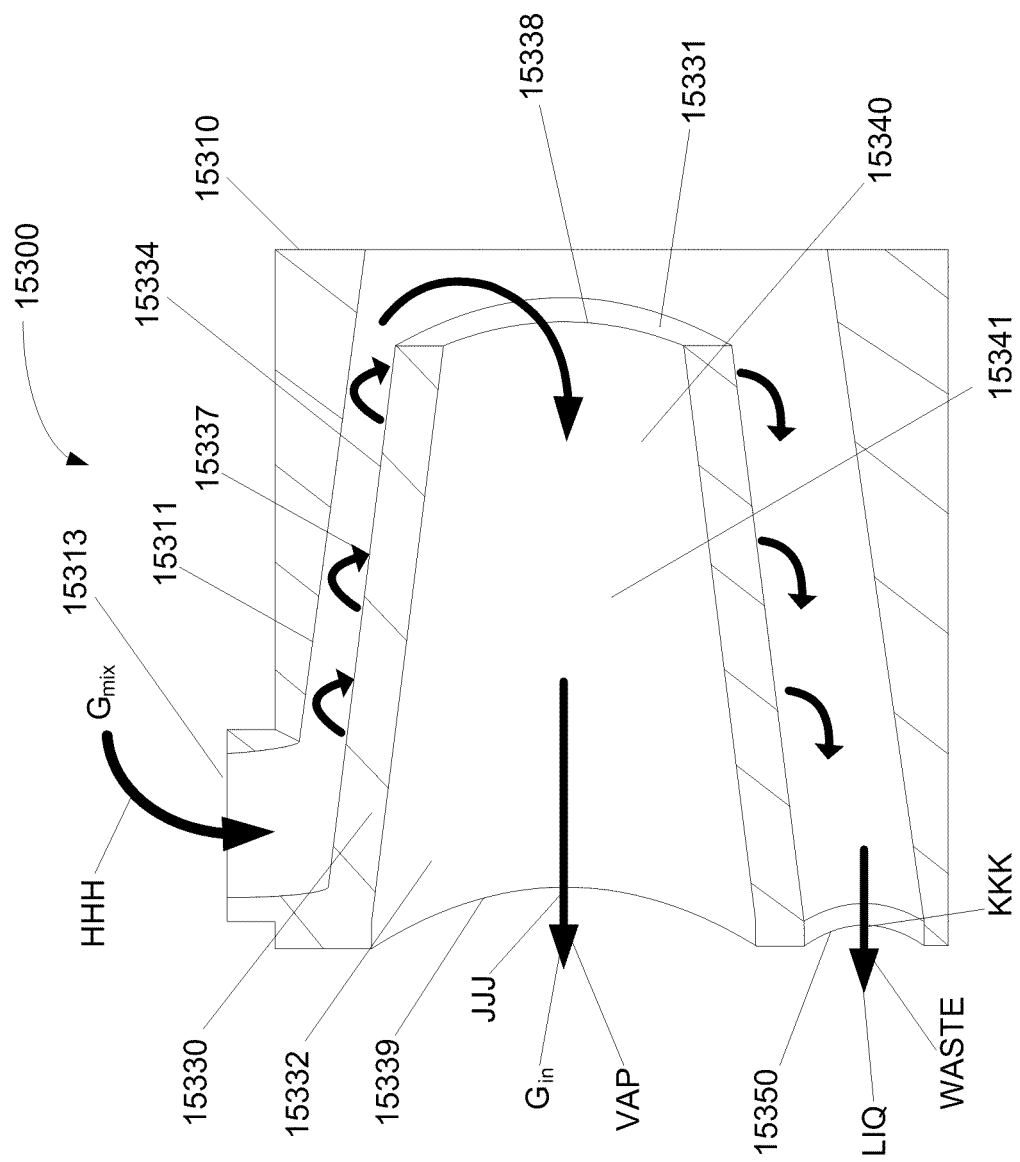
FIG. 48 is a schematic illustration of a cross-section of a separator, according to an embodiment.

While specific separators have been discussed herein, the systems shown and described herein can include any suitable separator. For example, FIG. 48 is a cross-sectional schematic illustration of a separator 15300, according to an embodiment. The separator 15300 includes a housing 15310, which can define an inlet opening 15313 and a waste outlet opening 15350, and a separator member 15330. The separator member 15330 includes a first end portion 15331, which defines an inlet opening 15338, and a second end portion 15332, which defines a vapor outlet opening 15339. The separator member 15330 can be configured such that an outer surface 15334 and an inner surface 15340 taper between the larger diameter of the second end portion 15332 and the smaller diameter of the first end portion 15331, as shown in FIG. 48.

The separator 15300 can be coupled to an outlet portion of an apparatus configured to produce a mixture $G_{mix}$ of a gas $G_{in}$, a liquid portion of a solvent LIQ, a substantially vaporized portion of a solvent VAP, and a solute WASTE, such as, for example, the processor 6100 included in a water desalinization unit 6000, as described herein. In this manner, the inlet opening 15313 receives the mixture $G_{mix}$, as indicated by arrow HHH. The housing 15310 includes an interior wall 15311 that can be configured to match the taper of the separator member 15330. The tapered outer surface 15334 of the separator member 15330 defines a flow path 15337 around the circumference of the separator member 15330, such that the more dense particles (i.e., the liquid portion of the solvent LIQ and the solute WASTE) collect on the outer surface 15334 and flow within the flow path 15337.

With the more dense particles flowing within the flow path 15337, the inlet opening 15338 of the separator member 15330 is configured to receive a portion of the gas $G_{in}$ and the vaporized portion of the solvent VAP. The gas $G_{in}$ and the vaporized portion of the solvent VAP flow within a flow path 15341 defined by the inner surface 15340 of the separator member 15330 toward the vapor outlet opening 15339. The vapor outlet flow, indicated by arrow JJJ in FIG. 48, includes a portion of the gas $G_{in}$ and a vaporized portion VAP of the solvent. The vapor outlet flow can be conveyed to any suitable condenser, such that heat is removed from the vapor outlet flow in order to produce a liquid flow substantially free from the solute WASTE.

The liquid portion of the solvent LIQ and the solute WASTE flow within the flow 15337 around the circumference of the outer surface 15334 of the separator member 15330 toward the waste outlet opening 15350. A second outlet flow includes a liquid portion LIQ of the solvent and the solute WASTE (i.e., the solid waste), indicated by arrow KKK in FIG. 48. In this manner, the separator 15300 separates the solute from the solution. Similarly stated, in embodiments in which the solution is seawater, the separator 15300 separates the salt and/or total dissolved solids from the water, thereby producing a substantially purified water vapor.

Figure 49:
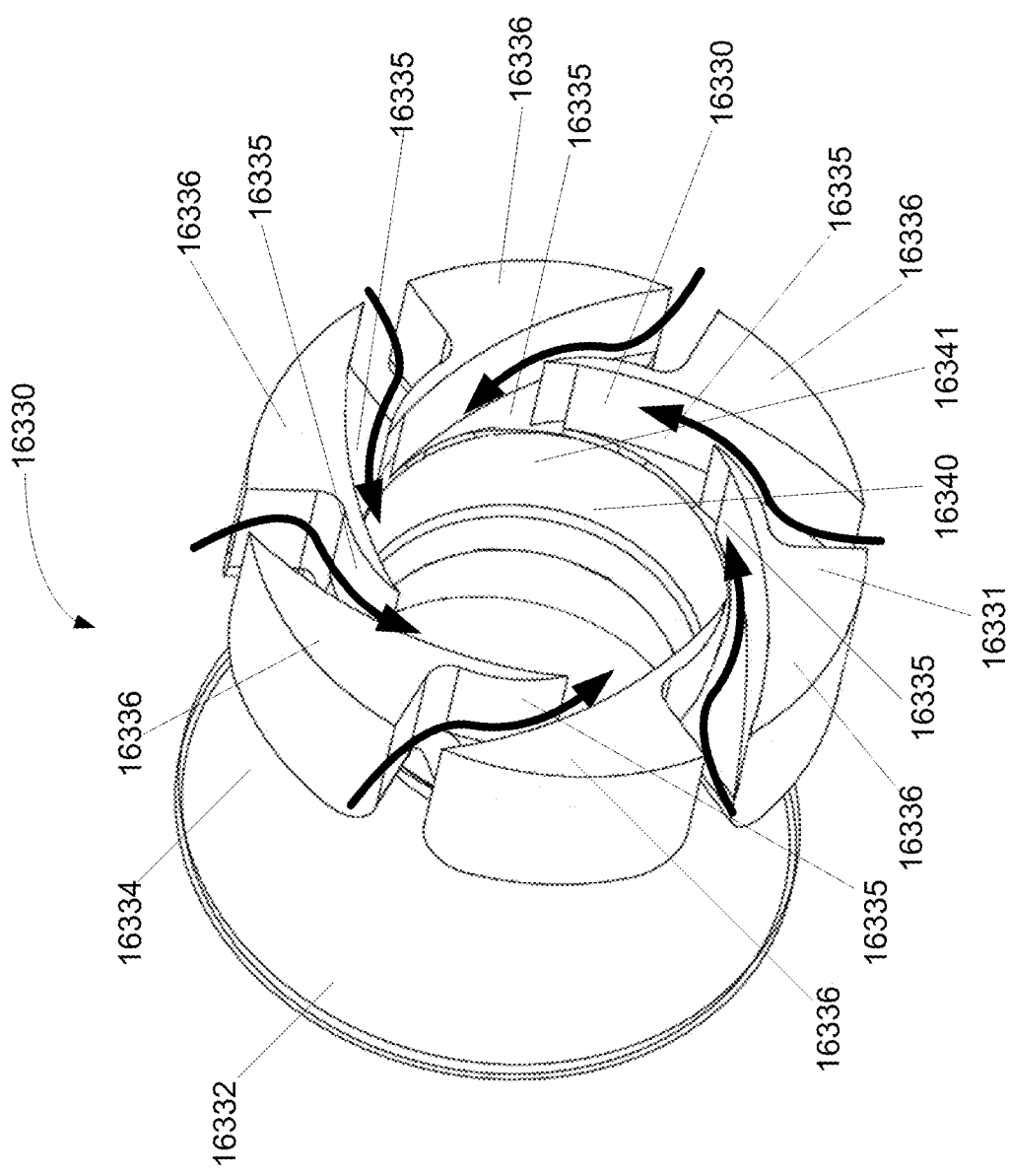
FIG. 49 is a rear perspective view of a separator member, according to an embodiment.
Figure 50B:
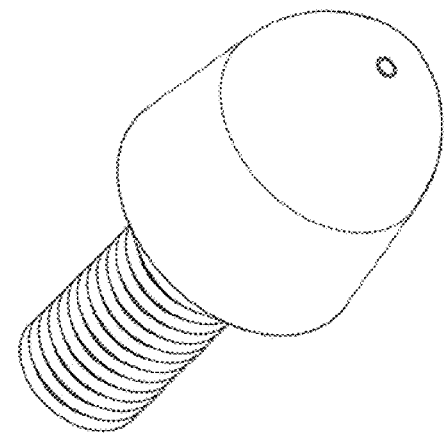
FIG. 50B is a perspective view of an injector insert, according to an embodiment.
Figure 50D:
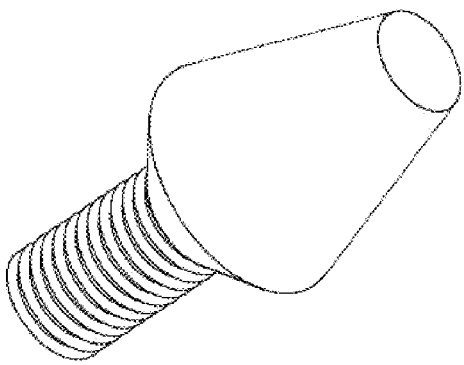
FIG. 50D is a perspective view of an injector insert, according to an embodiment.
Figure 50A:
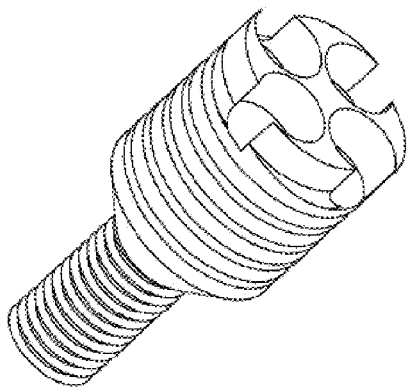
FIG. 50A is a perspective view of an injector insert, according to an embodiment.
Figure 50C:
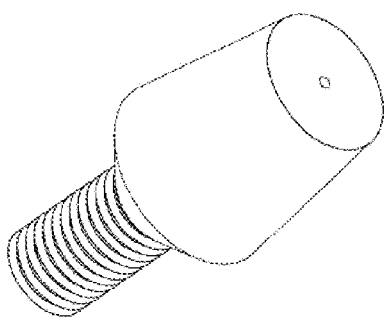
FIG. 50C is a perspective view of an injector insert, according to an embodiment.

The separator 15300 can use any suitable mechanism for separating the solute from the solution, such as a tortuous path, a filter, a rotating member, an electrically charged member and/or the like. For example, as shown in FIG. 49, any of the separators described herein can include a separator member 16330. The separator member 16330 includes a first end portion 16331 and a second end portion 16332. The separator member 16330 includes an outer surface 16334. The first end portion 16331 includes a set of protrusions 16336 that extend radially from the outer surface 16334 and define a series of channels 16335.

The series of grooves define a flow path 16341 with a substantial rotational velocity. A mixture, such as, for example the mixture $G_{mix}$ shown and described in FIG. 48, can flow within the flow path 16341 such that the more dense particles of the flow are forced against the interior walls 16340 of the separator member 16330 as the mixture flows within the flow path 16341 toward the second end portion 16332. Similarly stated, the separator member is configured to produce a centrifugal motion such that the flow within the flow path 16341 is separated between a less dense vapor portion and a more dense liquid portion. In this manner, the separator member 16330 separates the solute from the solvent, for example, if the solution is seawater, the separator member 16330 separates the salt and/or total dissolved solids from the water, thereby producing a substantially purified water vapor.

As described above with respect to FIGS. 43-47, the injectors can define an outlet orifice or can include an injector insert that defines an outlet orifice. For example, FIGS. 50A-50D are perspective views of various injector inserts, according to embodiments of the invention, respectively. The injector inserts can include a threaded base configured to couple the insert to the injector. The injector inserts can be any suitable size, shape, and/or configuration, such as, for example, those shown in FIGS. 50A-50D. The outlet orifice defined by the injector insert can be single aperture or multiple apertures and can be configured to produce a spray including small particles of a solution.

Figure 51:
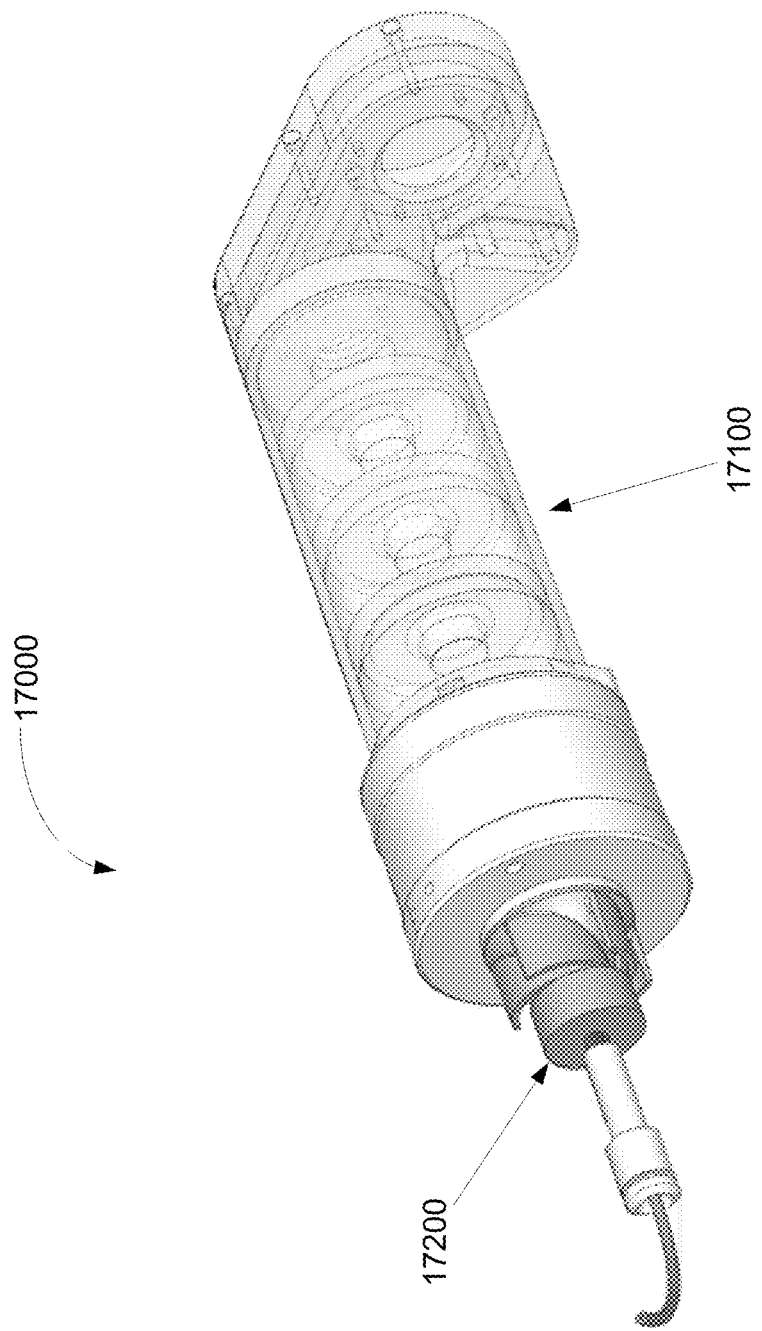
FIG. 51 is a perspective view of a portion of a water desalinization unit, according to an embodiment.

While shown an described herein as including multiple atomizers, in some embodiments a water desalinization unit can include a single atomizer and/or vaporizer component. More specifically, a water desalinization unit can include a processor assembly that is configured to be a single stage (i.e., including one atomizer and/or vaporizer) processor. For example, FIG. 51 is a perspective view of a portion of a water desalinization unit 17000. The water desalinization unit 17000 can include a processor assembly 17100 and an atomizer 17200. The atomizer 17200 can be any suitable atomizer of the types shown and described herein, and can be configured to reduce a flow of a solution into small particles (i.e., produce an atomized flow of the solution). In some embodiments, the water desalinization unit 17000 can include an atomizer similar to the atomizer 8200 shown and described above. In other embodiments, the water desalinization unit 17000 can include the atomizer 17200 shown in FIG. 52. The atomizer 17200 can function similarly to those described herein, and, as such, reduces the flow of the solution into small particles (i.e., atomized particles).

Figure 53B:
FIG. 53B is a perspective view of an injector, according to an embodiment.
Figure 53C:
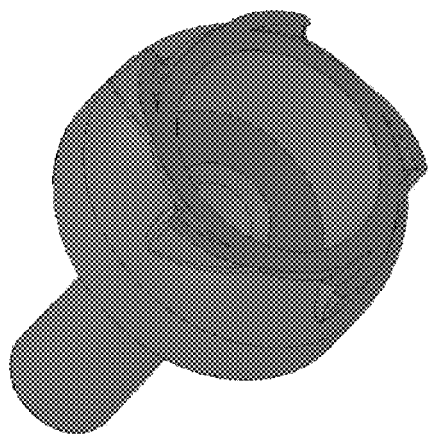
FIG. 53C is a perspective view of an injector, according to an embodiment.
Figure 53A:
FIG. 53A is an exploded perspective view of an injector, according to an embodiment.
Figure 54B:
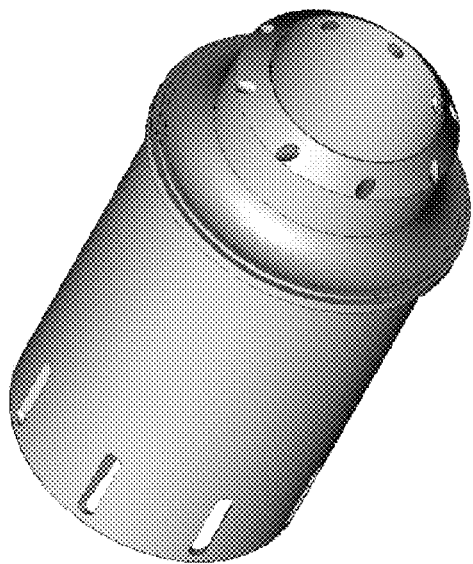
FIG. 54B is a perspective view of a nozzle, according to an embodiment.
Figure 54C:
FIG. 54C is a perspective view of a nozzle, according to an embodiment.
Figure 54A:
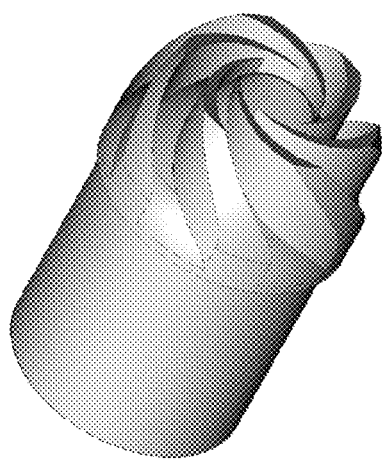
FIG. 54A is a perspective view of a nozzle, according to an embodiment.

The atomizer 17200 can include any suitable injector and/or nozzle, such as those described herein. In some embodiments, the atomizer 17200 can include an injector similar to the injectors shown, for example, with respect to FIGS. 53A-53C. Similarly, the atomizer 17200 can include a nozzle similar to the nozzles shown, for example, with respect to FIGS. 54A-54C. In this manner, the atomizer 17200 produces an atomized flow of the solution and conveys the atomized flow to the processor assembly 17100.

The processor assembly 17100 can include and/or employ any suitable parts, assemblies, methods, and/or the like described herein. Additionally, the processor assembly 17100 can be configured to couple to any suitable parts, assemblies, and/or the like described herein. For example, the processor assembly 17100 can be coupled to an air processing subsystem, similar in function to the air processing subsystem 6500 described with respect to FIGS. 10-13. Furthermore, the processor assembly 17100 can couple to a separator, similar in function to the separator 6300 described with respect to FIGS. 30-39.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. Additionally certain events may be performed concurrently in parallel processes when possible, as well as performed sequentially. While the embodiments have been particularly shown and described, it will be understood that various changes in form and details may be made.

Although the systems have been described primarily for use as water desalinization, the systems and elements thereof are not limited thereto. In some embodiments, any of the devices and/or components described herein can be used to separate a solute from any solution.

Although various embodiments have been described as having particular features and/or combinations of components, other embodiments are possible having a combination of any features and/or components from any of embodiments as discussed above.

For example, although the separator assembly 6300 is shown and described as including the first separator member 6325, in other embodiments, any of the separator assemblies described herein can include any suitable combination of separator members described herein. For example, in some embodiments, the separator assembly 6300 can include the separator member 16330 shown and described with reference to FIG. 49.

In some embodiments an apparatus includes an atomizer configured to mix a solution and a flow of an inlet gas to produce an atomized mixture of the solution and the inlet gas. The atomizer includes a flow member defining an outlet opening. An inner surface of the flow member defines a first flow path, and an outer surface of the flow member includes a flow structure defining at least a portion of a second flow path. The atomizer is configured to be fluidically coupled to a source of the solution such that the solution can be conveyed to from the source to the exit opening via the first flow path. The atomizer is configured such that the inlet gas can be conveyed into the first flow path via the second flow path. The flow structure configured to produce a rotational velocity component within the flow of the inlet gas when the inlet gas exits the second flow path.

In some embodiments, the flow area of the first flow path at a first location along a longitudinal axis of the flow member is different than a flow area of the first flow path at a second location along the longitudinal axis. Similarly stated, in some embodiments, the first flow path is a diverging and/or converging nozzle.

In some embodiments, the flow structure is a first vane of a set of vanes collectively configured to redirect a portion of the inlet gas within the second flow path.

In some embodiments, an apparatus includes an atomizer, a housing and a separator. The atomizer defines a liquid flow path and a gas flow path. The liquid flow path is configured to be fluidically coupled to a source of a solution such that a portion of the solution from the source of the solution can be conveyed to the atomizer via the liquid flow path. The gas flow path is configured to be fluidically coupled to a source of inlet gas such that a first portion of an inlet gas from the source of inlet gas can be conveyed to the atomizer via the gas flow path. The atomizer is configured to mix the portion of the solution and the first portion of the inlet gas to produce an atomized mixture of the solution and the first portion of the inlet gas. The housing has an inlet portion and an outlet portion, and defines a flow path between the inlet portion of the housing and the outlet portion of the housing. The inlet portion of the housing is configured to be fluidically coupled to the source of inlet gas such that a second portion of the inlet gas from the source of inlet gas can be conveyed into the flow path via the inlet portion of the housing. The atomizer is disposed at least partially within the housing such that the second portion of the inlet gas can be mixed with the atomized mixture. The separator is configured to be fluidically coupled to the outlet portion of the housing. The separator is configured to receive the mixture of the second portion of the inlet gas and the atomized mixture, and produce a first outlet flow and a second outlet flow. The first outlet flow includes a vaporized portion of a solvent from the solution. The second outlet flow includes a liquid portion of the solvent from the solution and a solute from the solution.

In some embodiments, the atomizer is one of a set of atomizers, each of which defines a liquid flow path and a gas flow path. The liquid flow path of each atomizer is configured to be fluidically coupled to the source of the solution such that the portion of the solution from the source of the solution can be conveyed in parallel to each atomizer via the liquid flow path. The gas flow path of each atomizer is configured to be fluidically coupled to the source of inlet gas such that the first portion of the inlet gas from the source of inlet gas can be conveyed in parallel to each atomizer via the gas flow path. Each atomizer is configured to mix the portion of the solution and the first portion of the inlet gas to produce an atomized mixture of the solution and the first portion of the inlet gas. Each atomizer is disposed at least partially within the housing such that the outlet portion of each atomizer is in fluid communication with the flow path. The housing is configured such that the second portion of the inlet gas can be sequentially mixed with the atomized mixture produced by each atomizer.

In some embodiments, the atomizer defines a mixing volume and is configured such that the portion of the solution is conveyed to the mixing volume via the liquid flow path and the first portion of the inlet gas is conveyed to the mixing volume via the gas flow path. A surface of the atomizer defines at least a portion of the gas flow path that is configured to produce a rotational velocity component within a flow of the first portion of the inlet gas when first portion of the inlet gas is conveyed into the mixing volume. In some embodiments, the atomizer includes an injection member and an outlet nozzle. The injection member defines a mixing volume such that the portion of the solution is conveyed to the mixing volume via the liquid flow path. The outlet nozzle is spaced apart from the injection member such that the outlet nozzle and the injection member collectively define the gas flow path. The first portion of the inlet gas is conveyed to the mixing volume via the gas flow path.

What is claimed is:

1. An apparatus, comprising:

an atomizer configured to mix a solution and a flow of an inlet gas to produce an atomized mixture of the solution and the inlet gas, the atomizer including a flow member defining an outlet opening, an inner surface of the flow member defining a first flow path, an outer surface of the flow member including a vane defining at least a portion of a second flow path, the atomizer configured to be fluidically coupled to a source of the solution such that the solution can be conveyed to the source to the outlet opening via the first flow path, the atomizer configured such that the inlet gas can be conveyed into the first flow path via the second flow path, the vane configured to redirect a portion of at least one of a tangential velocity component or a circumferential velocity component of the flow of the inlet gas when the inlet as flows within second flow path to produce a rotational velocity component within the flow of the inlet gas when the inlet gas exits the second flow path; and a separator configured to be fluidically coupled to the outlet opening of the atomizer, the separator configured to receive the mixture of the inlet gas and the solution, the separator configured to produce a first outlet flow and a second outlet flow, the first outlet flow including a vaporized portion of a solvent from the solution, the second outlet flow including a liquid portion of the solvent from the solution and a solute from the solution.

2. The apparatus of claim 1, wherein a flow area of the first flow path at a first location along a longitudinal axis of the flow member is different than a flow area of the first flow path at a second location along the longitudinal axis.

3. The apparatus of claim 1, wherein the first flow path diverges along a longitudinal axis of the flow member.

4. The apparatus of claim 1, wherein the flow member is a receiving nozzle, the apparatus further comprising:

an injector configured to produce a spray of the solution into the receiving nozzle, the injector defining a mixing volume within which the solution and the inlet gas are mixed.

5. The apparatus of claim 4, wherein an outlet portion of the injector is spaced apart from an inlet portion of the receiving nozzle.

6. The apparatus of claim 1, wherein the second flow path surrounds at least a portion of the first flow path.

7. The apparatus of claim 1, wherein the separator includes a separator member disposed within a housing, separator member defining a central opening and having an outer surface defining a plurality of grooves configured to direct the first outlet flow towards the central opening.

8. The apparatus of claim 7, wherein the housing defines a waste opening offset from the central opening, the plurality of grooves configured to configured to direct the second outlet flow towards the waste opening.

9. An apparatus, comprising:

an atomizer assembly configured to mix a solution and a flow of an inlet gas to produce an atomized mixture of the solution and the inlet gas, the atomizer assembly including a flow member, an inner surface of the flow member defining a first flow path, an outer surface of the flow member including a vane defining at least a portion of a second flow path, the atomizer assembly configured to be fluidically coupled to a source of the solution such that the solution can be conveyed to from the source via the first flow path, the atomizer configured such that the inlet gas can be conveyed into the first flow path via the second flow path, the vane configured to redirect a portion of at least one velocity component of the flow of the inlet gas when the inlet gas flows within second flow path to produce a rotational velocity component within the flow of the inlet gas when the inlet gas exits the second flow path; and a separator configured to be fluidically coupled to the outlet opening of the atomizer assembly such that the separator is configured to receive the mixture of the inlet gas and the solution and produce a first outlet flow and a second outlet flow, the first outlet flow including a vaporized portion of a solvent from the solution, the second outlet flow including a liquid portion of the solvent from the solution and a solute from the solution, the separator including a separator member disposed within a housing, separator member defining a central opening and having an outer surface defining a plurality of grooves configured to direct the first outlet flow towards the central opening.

10. The apparatus of claim 9, wherein the housing defines a waste opening offset from the central opening, the plurality of grooves configured to configured to direct the second outlet flow towards the waste opening.

11. The apparatus of claim 9, wherein the atomizer assembly includes an injector configured to produce a spray of the solution into the first flow path.

* * * * *